(12) United States Patent
Conrad

(10) Patent No.: US 11,161,275 B2
(45) Date of Patent: Nov. 2, 2021

(54) MODULAR EXTRUDER

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 258 days.

(21) Appl. No.: 16/366,867

(22) Filed: Mar. 27, 2019

(65) Prior Publication Data

US 2020/0307023 A1     Oct. 1, 2020

(51) Int. Cl.
| | |
|---|---|
| *B29B 7/42* | (2006.01) |
| *B29B 7/72* | (2006.01) |
| *B29C 48/25* | (2019.01) |
| *B29K 101/12* | (2006.01) |

(52) U.S. Cl.
CPC ............... *B29B 7/42* (2013.01); *B29B 7/72* (2013.01); *B29C 48/256* (2019.02); *B29C 48/2563* (2019.02); *B29K 2101/12* (2013.01)

(58) Field of Classification Search
CPC .. B29B 7/42; B29B 7/72; B29B 7/826; B29B 7/823; B29C 48/03; B29C 48/501; B29C 48/2563; B29C 48/2561; B29C 48/397; B29C 48/256–48/25686; B29K 2101/12
See application file for complete search history.

(56) References Cited

U.S. PATENT DOCUMENTS

| | | |
|---|---|---|
| 2,253,810 A | 8/1941 | Poux |
| 2,293,304 A | 8/1942 | Muller et al. |
| 2,332,678 A | 10/1943 | Tucker |
| 2,549,400 A * | 4/1951 | Ingvar ............... B29C 48/2564 425/190 |
| 3,339,240 A | 9/1967 | Corbett |

(Continued)

FOREIGN PATENT DOCUMENTS

| | | |
|---|---|---|
| CN | 2579643 | 10/2003 |
| CN | 203357855 U | 12/2013 |

(Continued)

OTHER PUBLICATIONS

English machine translation of CN203357855U, published on Dec. 25, 2013.

(Continued)

*Primary Examiner* — Charles Cooley
(74) *Attorney, Agent, or Firm* — Philip C. Mendes Da Costa; BERESKIN & PARR LLP/ S.E.N.C.R.L., s.r.l.

(57) ABSTRACT

An extruder includes an extruder barrel module, an extruder feeder module, a screw motor module, and an electronics module. The extruder barrel module includes an axially extending barrel in which an extruder barrel screw is removably receivable. The extruder feeder module is removably connectable to the extruder barrel module, and has an axially extending flow passage having a feedstock outlet end and a screw motor module mounting end. The screw motor module is removably connectable to the extruder feeder module, and has a motor drivingly connectable with a screw in the flow passage of the extruder feeder module. The electronics module is electrically connectable with the screw motor module and mechanically removably mounted as part of the extruder.

18 Claims, 42 Drawing Sheets

(56) References Cited

U.S. PATENT DOCUMENTS

| | | |
|---|---|---|
| 3,571,856 A | 3/1971 | Voelker |
| 3,728,058 A | 4/1973 | Wheeler |
| 3,733,059 A | 5/1973 | Pettit |
| 3,817,679 A | 6/1974 | Ruegg |
| 3,888,612 A | 6/1975 | Schrewe et al. |
| 3,924,991 A | 12/1975 | Melcher |
| 4,005,167 A | 1/1977 | Stern |
| 4,070,142 A | 1/1978 | Farrell |
| 4,094,940 A | 6/1978 | Hold |
| 4,290,986 A | 9/1981 | Koschmann |
| 4,356,140 A | 10/1982 | Kruder |
| 4,525,134 A | 6/1985 | McHenry et al. |
| 4,571,319 A | 2/1986 | Baluch et al. |
| 4,699,581 A | 10/1987 | Nagasaka et al. |
| 4,701,292 A | 10/1987 | Valyi |
| 4,717,326 A | 1/1988 | Takao et al. |
| 4,721,589 A | 1/1988 | Harris |
| 4,738,609 A | 4/1988 | Marchesani |
| 4,937,035 A | 6/1990 | Guenter |
| 4,994,220 A | 2/1991 | Gutjahr et al. |
| 5,074,772 A | 12/1991 | Gutjahr |
| 5,253,994 A | 10/1993 | Konrad et al. |
| 5,358,327 A | 10/1994 | Derezinski et al. |
| 5,368,457 A | 11/1994 | Noriko et al. |
| 5,601,773 A | 2/1997 | Schmidt et al. |
| 5,840,232 A | 11/1998 | La Belle |
| 5,922,363 A | 7/1999 | Beck et al. |
| 6,152,721 A | 11/2000 | Schad et al. |
| 6,287,491 B1 | 9/2001 | Kilim et al. |
| 6,679,696 B1 | 1/2004 | McConnell et al. |
| 7,399,442 B2 | 7/2008 | Sabin et al. |
| 7,544,057 B1 | 6/2009 | Wayts |
| 7,648,669 B2 | 1/2010 | Bemis et al. |
| 8,153,045 B2 | 4/2012 | Boor |
| 8,523,551 B2 | 9/2013 | Ashimoto et al. |
| 9,643,364 B2 | 5/2017 | Kiple et al. |
| 2003/0030166 A1 | 2/2003 | Eiva |
| 2005/0012243 A1 | 1/2005 | Saeki et al. |
| 2006/0040010 A1* | 2/2006 | Steiner ............... B29C 48/2562 425/192 R |
| 2006/0255498 A1 | 11/2006 | Ota |
| 2007/0045904 A1 | 3/2007 | Ulcej et al. |
| 2007/0058485 A1* | 3/2007 | Watanabe ........... B29C 48/2562 366/197 |
| 2008/0217817 A1 | 9/2008 | McCullough |
| 2010/0295199 A1 | 11/2010 | Zhang et al. |
| 2011/0086150 A1 | 4/2011 | Plattner et al. |
| 2016/0214300 A1 | 7/2016 | Bazzo |
| 2016/0243741 A1 | 8/2016 | Uchiyama |
| 2016/0279841 A1 | 9/2016 | Fitzpatrick |
| 2017/0291335 A1 | 10/2017 | Chen |
| 2017/0355116 A1 | 12/2017 | Sugahara |
| 2018/0236705 A1* | 8/2018 | Conrad .................. B29C 45/47 |
| 2019/0366281 A1 | 12/2019 | Rust |
| 2020/0114543 A1* | 4/2020 | Conrad .............. B29B 17/0412 |
| 2020/0307023 A1* | 10/2020 | Conrad ................ B29C 48/256 |
| 2020/0307046 A1* | 10/2020 | Conrad .................. B29C 45/18 |
| 2020/0307061 A1* | 10/2020 | Conrad ................ B29C 48/285 |

FOREIGN PATENT DOCUMENTS

| | | | |
|---|---|---|---|
| DE | 102007041486 A1 | 5/2008 | |
| DE | 102009014589 A1 * | 9/2010 | ............ B29C 48/41 |
| DE | 102010026535 A1 | 1/2012 | |
| EP | 0839631 A2 | 5/1998 | |
| JP | 57159634 A | 10/1982 | |
| JP | 59017916 U | 2/1984 | |
| JP | 63031731 A | 2/1988 | |
| JP | 63203313 A | 8/1988 | |
| JP | 01317736 A | 12/1989 | |
| JP | 2014184647 A | 10/2014 | |

OTHER PUBLICATIONS

English machine translation of JP01317736A, published on Dec. 22, 1989.
English machine translation of JP57159634A, published on Oct. 1, 1982.
English machine translation of JP59017916U, published on Feb. 3, 1984.
English machine translation of JP63031731A, published on Feb. 10, 1988.
English machine translation of JP63203313A, published on Aug. 23, 1988.
English machine translation of JP2014184647A, published on Oct. 2, 2014.
International Search Report and Written Opinion, received in connection to international patent application No. PCT/CA2019/050386, dated Jun. 25, 2020.
English machine translation of DE102010026535A1, published on Jan. 12, 2012.
English machine translation of DE102007041486A1, published on May 15, 2008.
English machine translation of CN2579643Y, published on Oct. 15, 2003.

* cited by examiner

MODULAR EXTRUDER

FIELD

This disclosure relates generally to extruders, and more specifically to extruders for extruding a plastic or thermoplastic material. This disclosure also relates to using one or more extruders to produce an extruded or molded plastic part.

INTRODUCTION

Extruders are typically used to heat and melt a solid input material (e.g. a plastic, or thermoplastic material) and extrude the material in a flowable, or melted state. The extruded, or output, material may be directed through a form or die while it cools and solidifies to form an elongate plastic component having a cross-sectional profile defined by the form or die. Alternatively, the output material may be directed into a mold where it is then cooled and solidifies to form a molded component having a shape defined by the mold.

One source of the heat provided to raise the temperature of the conveyed plastic material as it passes through the extrusion or injection barrel is mechanical shear heating. In shear heating, the plastic material is subjected to shearing or stretching between a rotating screw and a stationary barrel, often while under relatively high pressures (e.g. 2,000 pounds per square inch (psi), up to 30,000 psi or higher), causing heat to develop in the material. Typically, shear heating is a significant source of heat. For example, shear heating may provide about 70% or more (e.g., 80%, 90%) of the heat required to melt the plastic material.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one aspect of this disclosure, a feed block for an extruder is configured to promote an increased mass transport rate of feedstock material through the feed block and into the barrel of the extruder. An increased mass transfer rate through the feed block may allow more material to be transferred into the barrel for a given unit of time. Accordingly, more material per unit time can be output from the extruder.

In accordance with this aspect, the geometry of the feeder inlet of the feed block may be configured to promote compression, e.g. tangential compression, of the material as it is directed into and along the length of the feed flow passage. Accordingly, plastic material being conveyed through the feed block may be subjected to increasing pressures as it travels towards and into the extrusion barrel. An advantage of this design is that there may be less hold-up of material in the feed block and a more uniform flow of material into the extrusion barrel.

Optionally, the feed block may removably receive different feeder inserts. Providing a removable feeder insert may have one or more advantages. For example, a first feeder insert may have a first inlet passage and the second feeder insert may have a second inlet passage having a different configuration to the first inlet passage. Thus, a particular feeder insert may be selected based on the composition of the input material being extruded and/or based on operating parameters (e.g. temperature, screw RPM, barrel pressure) of the extrusion process.

In accordance with this broad aspect, there is provided a feeder for an extruder, the feeder comprising:
  (a) a feed flow passage, the feed flow passage extending in an axial direction from a feeder inlet to a feeder outlet;
  (b) an axially extending rotatable screw provided in the feed flow passage, wherein rotation of the screw draws a feedstock in a direction of flow to the feeder outlet; and,
  (c) the feeder inlet has an inlet passage that overlies the screw, the inlet passage has an upper end, a lower end adjacent the screw, a length in the axial direction, a width in a plane transverse to the axial direction, and a depth extending between the upper and lower ends of the inlet passage, wherein the width decreases in the direction of flow.

In some embodiments, the feeder may further comprise a hopper having a hopper outlet and the feeder inlet may be provided below the hopper outlet.

In some embodiments, the feeder may further comprise a cooling member.

In some embodiments, the cooling member may comprise cooling channels provided in thermal communication with the feed flow passage.

In some embodiments, the feeder may further comprise a feeder insert that may be removably mounted in a feed throat of the feeder, wherein the feeder insert has the inlet passage.

In some embodiments, the feeder may removably receive different feeder inserts, wherein a first feeder insert may have a first inlet passage and the second feeder insert may have a second inlet passage wherein the second inlet passage may have a different configuration to the first inlet passage.

In some embodiments, each inlet passage may have an upstream end in the direction of flow through the feed flow passage and a downstream end in the direction of flow through the feed flow passage and the second inlet passage may have a narrower width at the downstream end of the inlet passage than the first inlet passage.

In some embodiments, the lower end of the inlet passage may have an inner wall facing the screw and the inner wall may be spaced from the outer end of the screw by a distance, wherein the distance may decrease in the direction of rotation.

In some embodiments, the width may decrease at a constant rate in the direction of flow.

In some embodiments, the width may decrease at an increased rate in the direction of flow.

Additionally or alternatively, in accordance with this aspect, the geometry of an internal feed flow passage of the feed block may be configured to promote an increasing volumetric compression as material is directed into and along the length of the feed flow passage. Accordingly, plastic material being conveyed through the feed block may be subjected to increasing pressures as it travels towards and into the extrusion barrel.

In accordance with this broad aspect, there is provided a feeder for an extruder, the feeder comprising:
  (a) a feed flow passage, the feed flow passage extending in an axial direction from a feeder inlet to a feeder outlet;

(b) an axially extending rotatable screw provided in the feed flow passage, wherein rotation of the screw draws a feedstock in a direction of flow to the feeder outlet; and, (c) the feeder inlet has an inlet passage that overlies the screw, the inlet passage has an upper end, a lower end adjacent the screw, a length in the axial direction, a width in a plane transverse to the axial direction, and a depth extending between the upper and lower ends of the inlet passage, wherein the lower end of the inlet passage has an inner wall facing the screw and the inner wall is spaced from the outer end of the screw by a distance, wherein the distance decreases in the direction of rotation.

In some embodiments, the feeder may further comprise a hopper having a hopper outlet and the feeder inlet may be provided below the hopper outlet.

In some embodiments, the feeder may further comprise a cooling member.

In some embodiments, the cooling member may comprise cooling channels provided in thermal communication with the feed flow passage.

In some embodiments, the feeder may further comprise a feeder insert that may be removably mounted in a feed throat of the feeder, wherein the feeder insert may have the inlet passage.

In some embodiments, the feeder may removably receive different feeder inserts, wherein a first feeder insert may have a first inlet passage and the second feeder insert may have a second inlet passage wherein the second inlet passage may have a different configuration to the first inlet passage.

In some embodiments, the width may decrease in the direction of flow and each inlet passage may have an upstream end in the direction of flow through the feed flow passage and a downstream end in the direction of flow through the feed flow passage and the second inlet passage may have a narrower width at the downstream end of the inlet passage than the first inlet passage.

In some embodiments, the distance may decrease at a constant rate in the direction of flow.

In some embodiments, the distance may decrease at an increased rate in the direction of flow.

In accordance with another aspect of this disclosure, two or more extruders may be used to concurrently fill a mold in a molding process. Plastic material output from the extruders, which is in a flowable or melted state, is directed into a common mold, either directly or via a manifold or heated flow conduit connected to the mold and to at least some of the extruders.

By concurrently using the output from two or more extruders, a relatively large total flow rate of material may be provided to a mold without requiring an extruder with a relatively high operating pressure and/or flow rate. For example, a molding process using smaller, light weight extruders (e.g., bench top extruders each weighing under 500 lbs, 400 lbs, or 300 lbs) may be 'scaled up' to provide higher molding volumes (e.g. for use with molds for relatively large molded components) by providing more extruders, e.g. without having to 'scale up' the flow rate and/or operating pressure of any one extruder.

To facilitate the concurrent use of two or more extruders, in some embodiments it may be advantageous to provide apparatus in which the feed inlets of two or more extruders are not axially aligned with each other. For example, two or more of a plurality of extruders may have a different respective axial length. Additionally, or alternatively, one or more extension conduits may be provided between the output nozzle of at least one of the extruders and the common mold. Alternatively, or in addition, the outlet nozzles of two or more extruders may be provided at staggered locations axially along the length of a flow conduit, which is optionally heated, in communication with a mold.

In accordance with this broad aspect, there is provided a molding apparatus comprising:

(a) a plurality of axially extending extruders wherein each of the extruders is fluidly connectable with a common mold whereby the mold is concurrently filled from each of the extruders; and, (b) each of the extruders has a feed inlet, wherein the feed inlets are axially spaced from each other.

In some embodiments, at least two of the extruders may have different axial lengths.

In some embodiments, the extruders may feed into a common manifold and the manifold may be connectable to the mold.

In some embodiments, the plurality of axially extending extruders may comprise two extruders that have a common axial length, each extruder may have a nozzle outlet and one of the two extruders may further comprise a conduit extending from the nozzle outlet to the manifold.

In some embodiments, the at least two of the extruders may further comprise an axially extending conduit extending from the extruder to the manifold and the conduits may have differing axial lengths.

In some embodiments, the molding apparatus may further comprise a plurality of hoppers in flow communication with the feed inlets.

In some embodiments, each extruder may have a hopper.

In some embodiments, a common hopper may be provided for at least two of the extruders.

In some embodiments, a first extruder may be provided with an additive and the common manifold may further comprise a mechanical member for blending the output of the first extruder with the output of at least one other of the extruders.

In another broad aspect, to facilitate the concurrent use of two or more extruders, a common manifold or conduit may be provided between each of a plurality of extruders and a common mold. Optionally, such a conduit is heated to maintain the flowable plastic material within the conduit at an elevated temperature so that the plastic material remains in a flowable state until it exits the conduit.

In accordance with this broad aspect, there is provided a molding apparatus comprising:

(a) a plurality of axially extending extruders, each extruder having longitudinally extending axis; and, (b) a heated conduit in flow communication with the plurality of extruders, wherein the heated conduit is connectable to a mold, whereby the mold is concurrently fillable from each of the extruders.

In some embodiments, the heated conduit may have a length extending in a direction of flow from an upstream end of the heated conduit to a downstream end of the heated conduit and at least some of the extruders are in flow communication with the heated conduit at different locations along the length of the heated conduit.

In some embodiments, the axis of at least some of the extruders may extend at an angle to the direction of flow in the heated conduit.

In some embodiments, an included angle located between the axis of at least some of the extruders and the direction of flow in the heated conduit may be up to 90°.

In some embodiments, an included angle located between the axis of at least some of the extruders and the direction of flow in the heated conduit may be an acute angle, such as between 15-75° or 30-60°.

In some embodiments, the molding apparatus may further comprise a plurality of hoppers in flow communication with the extruders wherein at least some of the hoppers may be spaced apart from each other along the direction of flow.

In some embodiments, each extruder may have a hopper.

In some embodiments, the molding apparatus may further comprise a common hopper in flow communication with at least two of the extruders.

In some embodiments, a first extruder may be provided with an additive and the heated conduit may further comprise a mechanical member for blending the output of the first extruder with the output of at least one other of the extruders.

In some embodiments, the heated conduit may be provided with a feedstock ejection assist member.

In some embodiments, the feedstock ejection assist member may comprise a plunger at an upstream end of the heated conduit.

In another broad aspect, an extruder may have a modular design, which may allow an extruder to be assembled from (and preferably disassembled into) a relatively low number of parts or modules. The modular design may enable the modules to be connected together without the need of skilled tradespeople. For example, the modules may be designed to be connected to each other by inserting bolts provided on one module into mating holes provided in another mating module and securing the modules together using the bolts and nuts.

A modular extruder design may have one or more advantages. For example, assembly of such an extruder may be relatively simple, which may reduce time and/or cost required to install the extruder on site. Also, a modular design may allow one or more modular components to be provided in different variations, which may allow a large number of extruder configurations to be provided by selecting desired combinations of modular components.

A further advantage is that an extruder may be able to be repaired by detaching a broken module and inserting a new or refurbished module, which may be shipped e.g., by commercial courier. For example, each module may weigh under 175 lbs, 150 lbs, 135 lbs, or 100 lbs. Accordingly, the modules may be shipped by commercial courier. Further, they may be manipulatable by a few people without the need of heavy equipment, such as a forklift.

In accordance with this broad aspect, there is provided an extruder comprising:
(a) an axially extending extruder barrel module having a feedstock inlet end and a feedstock outlet end axially spaced from the feedstock inlet end in a direction of flow through the extruder barrel module, the extruder barrel module comprising an axially extending barrel in which an extruder barrel screw is removably receivable;
(b) an axially extending extruder feeder module removably connectable to the feedstock inlet end of the extruder barrel module, the extruder feeder module having an axially extending flow passage aligned with the direction of flow when the extruder feeder module is connected to the barrel module, the axially extending flow passage having a feedstock outlet end and a screw motor module mounting end axially spaced from the feedstock outlet end of the extruder feeder module in a direction of flow through the axially extending flow passage;
(c) a screw motor module removably connectable to the screw motor module mounting end of the extruder feeder module, the screw motor module having a motor drivingly connectable with a screw in the flow passage of the extruder feeder module; and,
(d) an electronics module electrically connectable with the screw motor module and mechanically removably mounted as part of the extruder.

In some embodiments, each module may be shippable by a commercial courier company.

In some embodiments, each module may weigh under 175 lbs, 150 lbs, 135 lbs, or 100 lbs.

In some embodiments, the screw in the flow passage may be drivingly connectable with the extruder barrel screw when the extruder is assembled.

In some embodiments, the screw in the flow passage and the extruder barrel screw may comprise a single integrally formed screw.

In some embodiments, the screw in the flow passage and the extruder barrel screw may be removable as a unitary member from the extruder barrel module and the extruder feeder module.

In some embodiments, the electronics module may be also electrically connectable with the extruder barrel module.

In some embodiments, the electronics module may be also electrically connectable with the extruder feeder module.

In some embodiments, the electronics module may be automatically electrically connectable with the screw motor module when the electronics module is mounted as part of the extruder.

Also in accordance with this broad aspect, there is provided an extruder comprising:
(a) an axially extending extruder barrel module having a feedstock inlet end and a feedstock outlet end axially spaced from the feedstock inlet end in a direction of flow through the extruder barrel module, the extruder barrel module comprising an axially extending barrel in which an extruder barrel screw is removably receivable;
(b) an axially extending extruder feeder module removably connectable in flow communication with the feedstock inlet end of the extruder barrel module, the extruder feeder module having an axially extending flow passage aligned with the direction of flow when the extruder feeder module is connected in flow communication with the barrel module, the axially extending flow passage having a feedstock outlet end and a screw motor module end axially spaced from the feedstock outlet end of the extruder feeder module in a direction of flow through the axially extending flow passage;
(c) a screw motor module removably drivingly connectable to an end of a screw located at the screw motor module end of the extruder feeder module; and,
(d) an electronics module electrically connectable with the screw motor module and mechanically removably mounted as part of the extruder.

In some embodiments, each module may weigh under 175 lbs, 150 lbs, 135 lbs, or 100 lbs.

In some embodiments, the screw in the flow passage may be drivingly connectable with the extruder barrel screw when the extruder is assembled.

In some embodiments, the screw in the flow passage and the extruder barrel screw may comprise a single integrally formed screw.

In some embodiments, the screw in the flow passage and the extruder barrel screw may be removable as a unitary member from the extruder barrel module and the extruder feeder module.

In some embodiments, the electronics module may be also electrically connectable with the extruder barrel module.

In some embodiments, the electronics module may be also electrically connectable with the extruder feeder module.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
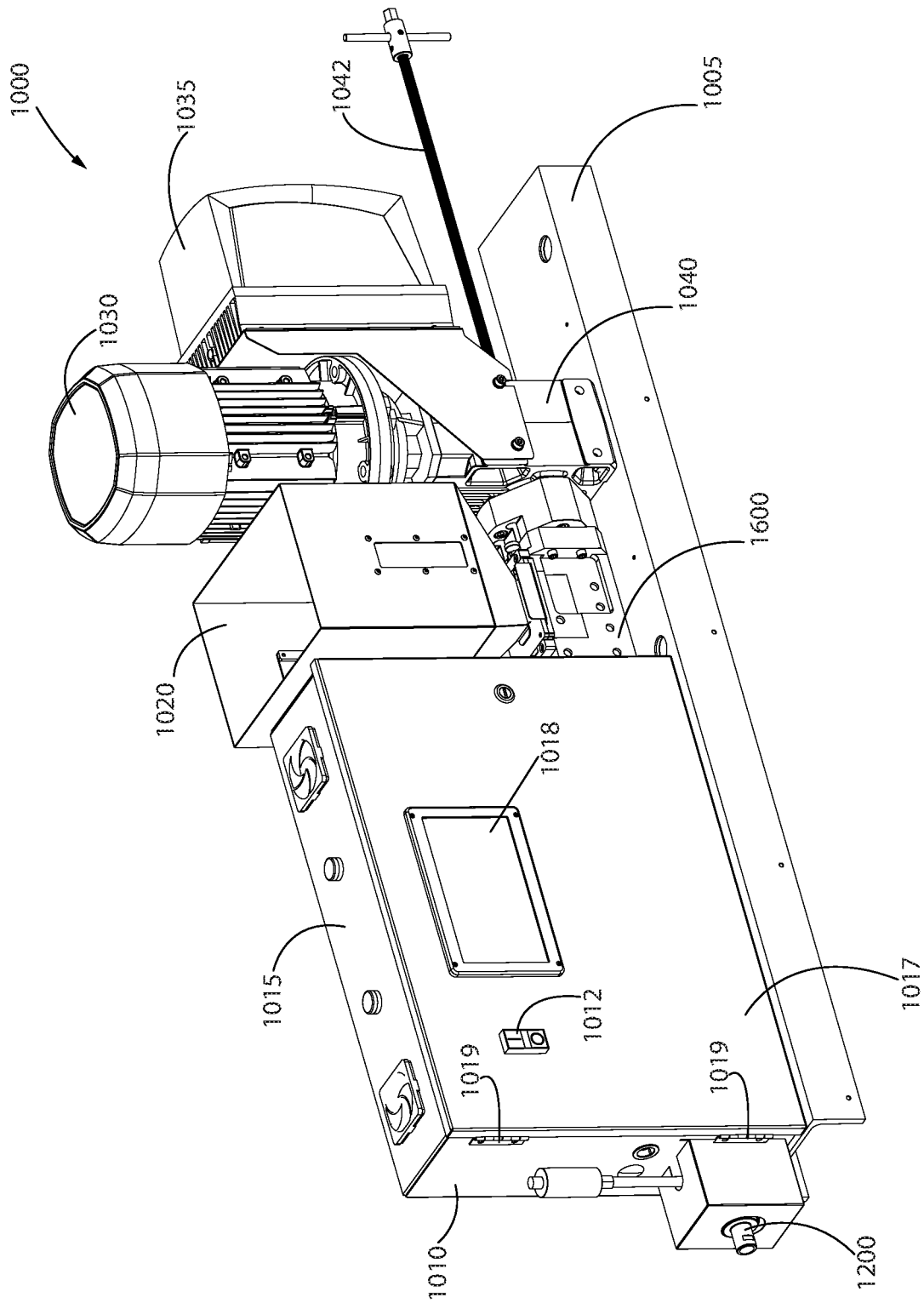
FIG. 1 is a perspective view of an extruder in accordance with one embodiment.
Figure 2:
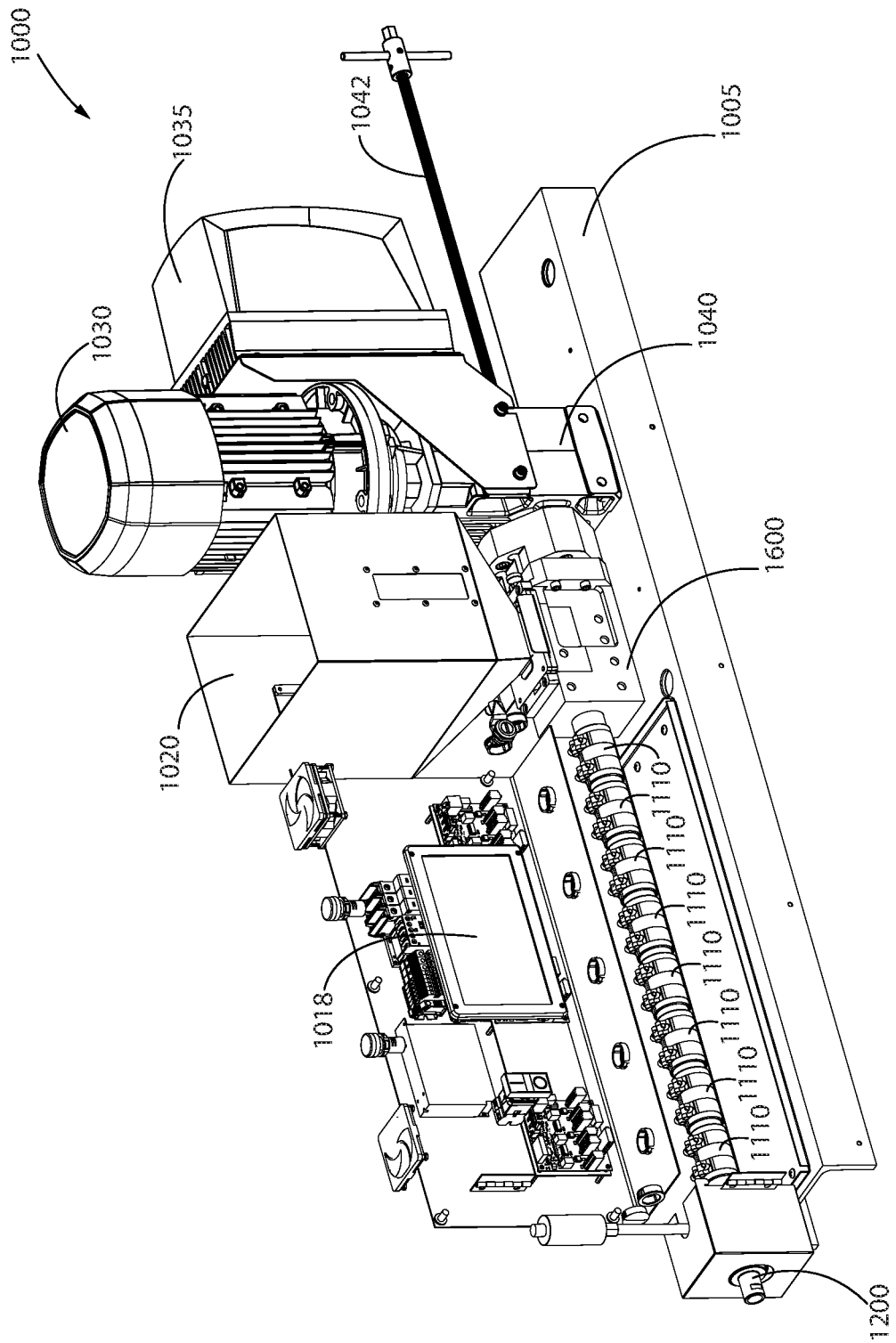
FIG. 2 is a perspective view of the extruder of FIG. 1, with portions of a controller housing removed.
Figure 3:
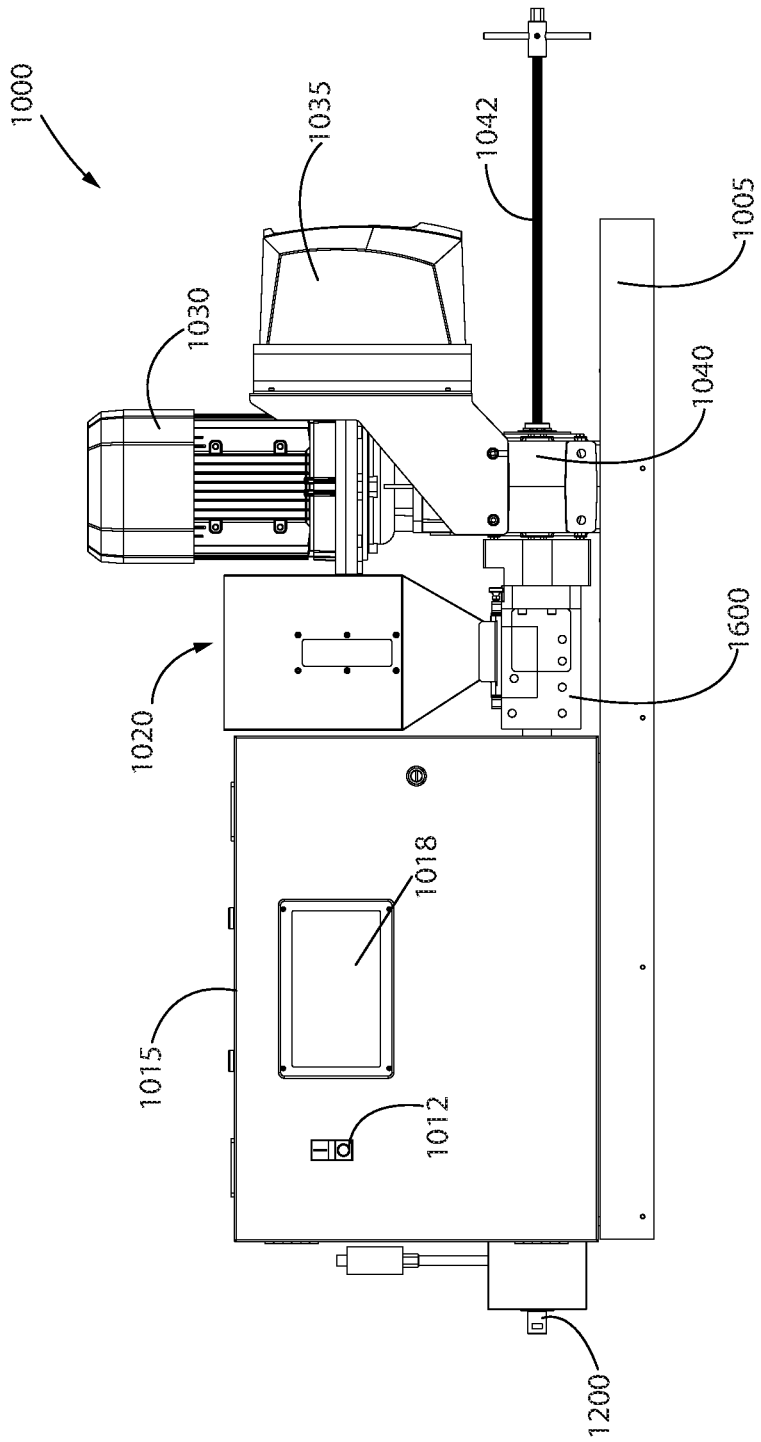
FIG. 3 is a front view of the extruder of FIG. 1.
Figure 4:
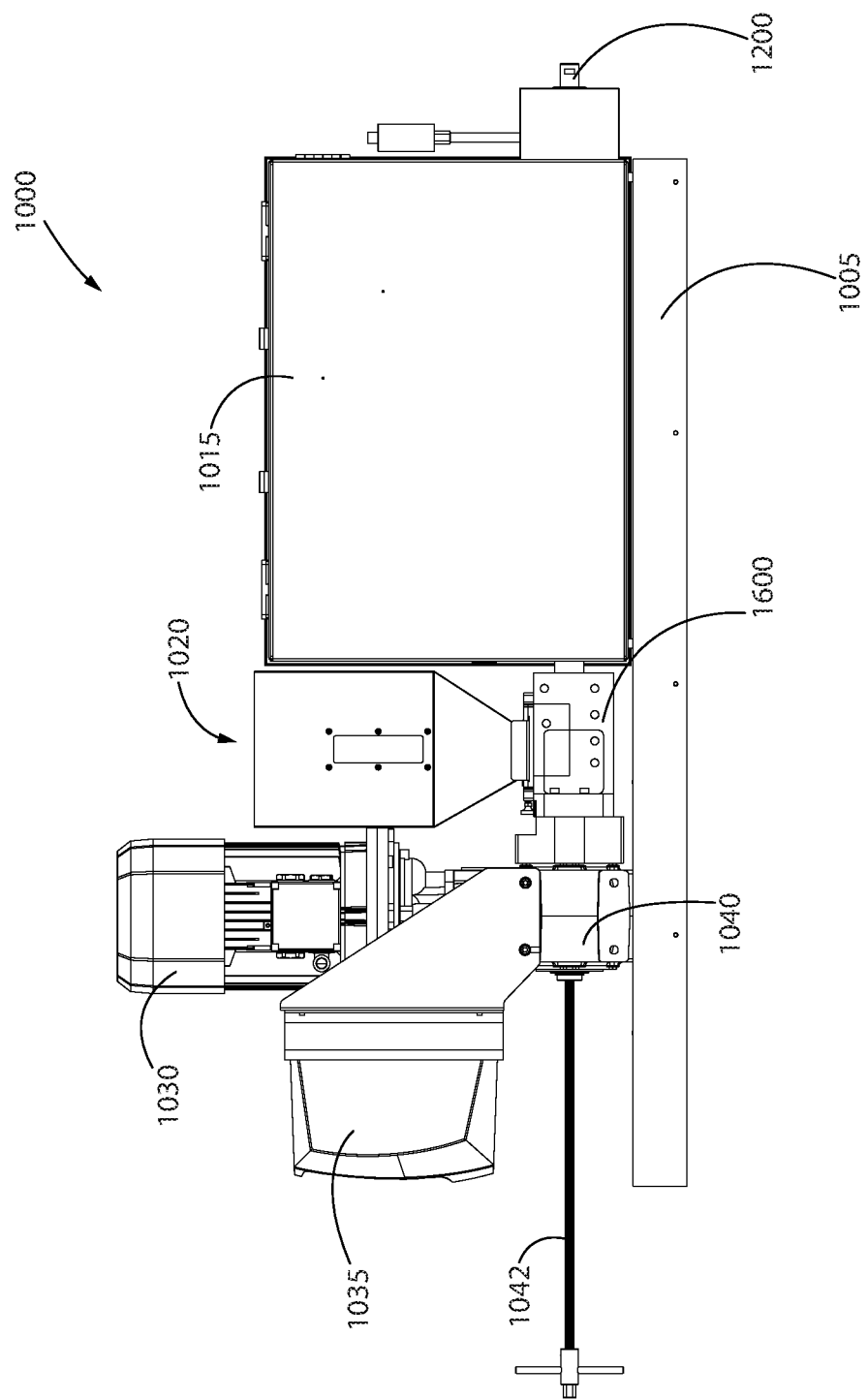
FIG. 4 is a rear view of the extruder of FIG. 1.
Figure 5:
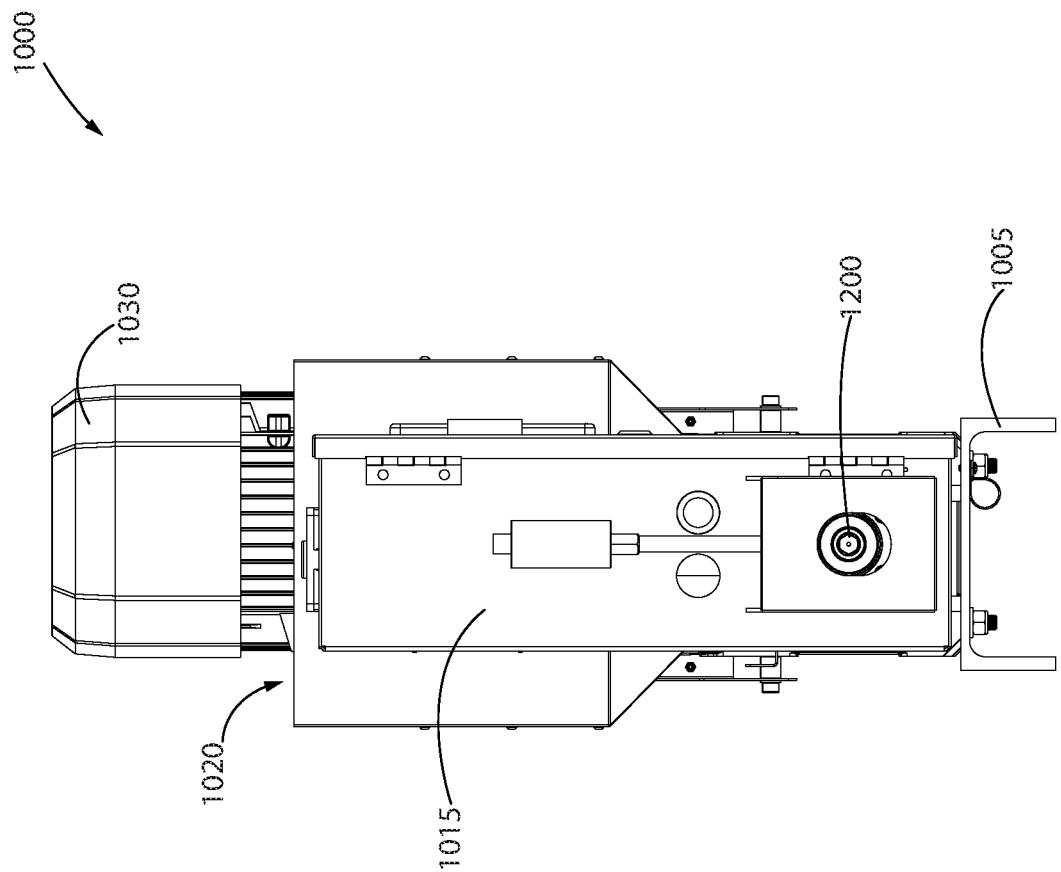
FIG. 5 is an end view of the output end of the extruder of FIG. 1.
Figure 6:
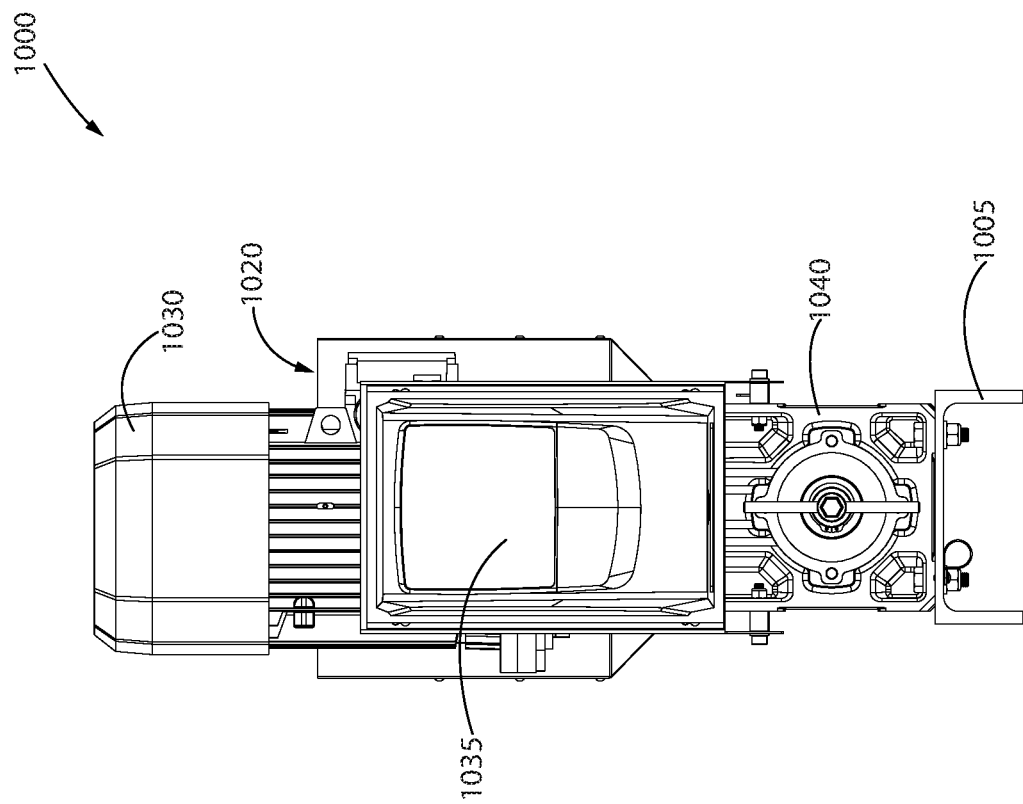
FIG. 6 is an end view of the end longitudinally opposed to the output end of the extruder of FIG. 1.
Figure 7:
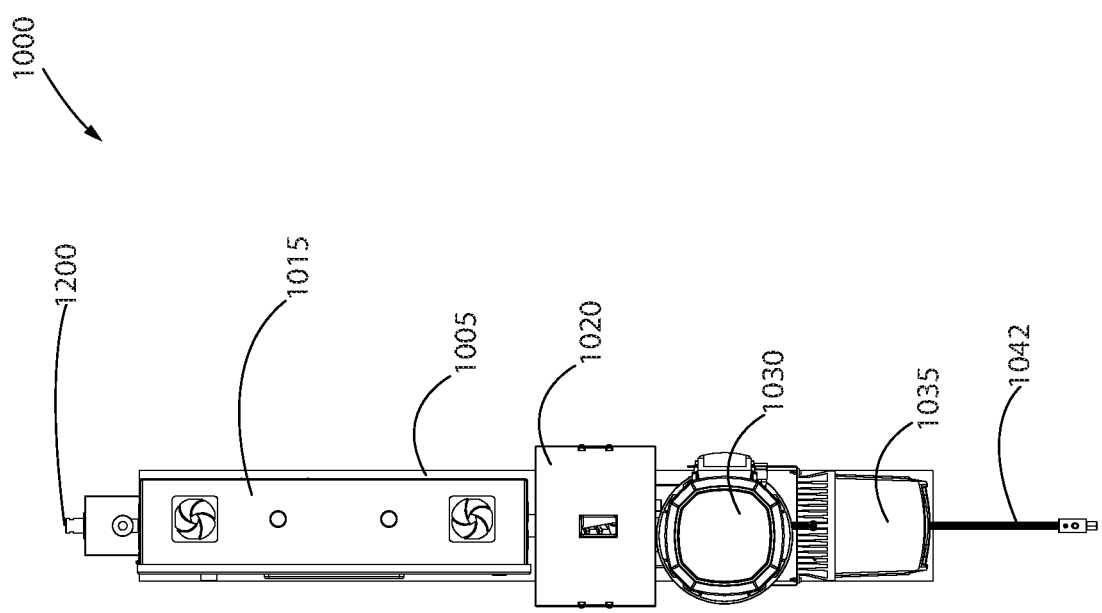
FIG. 7 is a top view of the extruder of FIG. 1.
Figure 8:
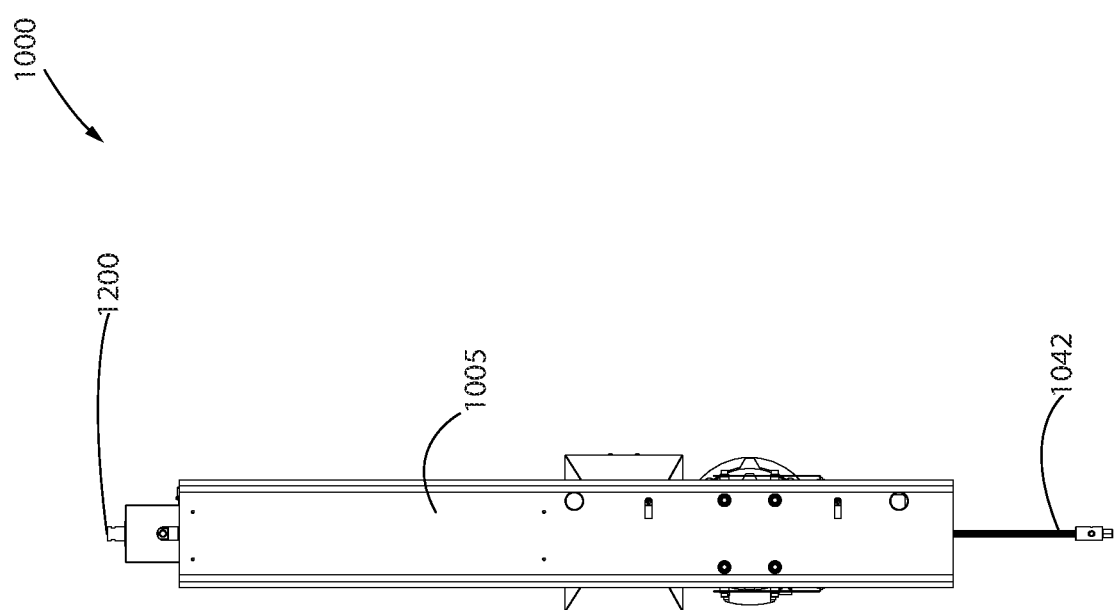
FIG. 8 is a bottom view of the extruder of FIG. 1.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The apparatuses, methods and compositions may be used to extrude and/or mold various materials, such as a plastic material and optionally a thermoplastic material. The thermoplastic material may be one or more of acrylonitrile butadiene styrene (ABS), polyvinyl chloride (PVC), chlorinated polyvinyl chloride (CPVC), polyethylene (PE), low molecular weight PE, high density PE, ultra high molecular weight PE, polyethylene terephthalate (PET), polystyrene (PS), polycarbonate (PC), acrylic, polypropylene (PP), polybutylene terephthalate (PBT), polyvinyl acetate, ethylene-vinyl acetate (EVA), or the like. Optionally, the thermoplastic material is one or more of PVC and CPVC.

General Description of Preferred Embodiments Utilizing Combinations of Various Aspects FIGS. 1 to 9 exemplify an extruder, referred to generally as 1000. Extruder 1000 may be used to heat and melt an input material (e.g. a plastic, or thermoplastic material which may be solid) and extrude the material in a flowable, or melted state. The extruded, or output, material may be used to fill a mold in a molding process, as will be discussed further subsequently, or with an extrusion die. It will be appreciated that extruder 1000 may receive any input material known in the extruder art.

Extruder 1000 may include one or more user input devices that allow a user to initiate and/or control the operation of the extruder. For example, user input devices may include one or more of power switches 1012, which may be a main on/off switch, and a display 1018, which may be a touch screen display for enabling user input. Extruder 1000 may also include one or more user output devices that allows a user to monitor the operation of the extruder. For example, the user output device may be display 1018, and/or one or more audio and/or visual output devices, such as lights, buzzers, speakers, and the like (not shown).

As shown in FIGS. 1 to 9, at least some of the user input devices and/or control electronics of extruder 1000 may be enclosed in a control housing or cabinet 1010, which in the illustrated embodiment includes a plurality of solid panels 1015 and an access door 1017 secured via, e.g., hinges 1019 to provide access to components inside the cabinet. It will be appreciated that the housing may be made from any suitable material (e.g. metal, plastic, and the like), and that in alternate embodiments the cabinet may be formed of more or fewer panels. In some embodiments, a control cabinet may not be provide.

Extruder 1000 also includes an input member for introducing the material into the extruder. The input member may be an input hopper 1020 for receiving the input material (e.g. a solid pelletized plastic). As perhaps best seen in FIG. 11, material received in hopper 1020 is directed through a feed throat 1062 in a feed block 1600 where it is introduced into the channels of an extrusion screw 1300. Rotation of the screw 1300 advances or conveys the pelletized input material from a first, or input, end 1302 of the extrusion screw towards a second, or output, end 1304 of the extrusion screw 1300, thereby conveying the material through an extrusion barrel 1100 from a first, or input, end 1102 of the barrel to a second, or output, end 1104 of the barrel.

As the material is conveyed through the extrusion barrel 1100 by the screw 1300, heat from one or more (e.g., a plurality of) heating elements 1110 positioned about the outer surface 1108 of the extrusion barrel 1100 is transferred through the extrusion barrel wall to the conveyed material via the inner barrel surface 1106, raising the temperature of the material and thereby causing the material to transition to a flowable, or melted state. It will be appreciated that heating elements 1100 may be positioned along a portion of, or all of, the length of the barrel. Each heating element may surround a portion of the outer perimeter of the barrel or they may surround most or all of the outer surface of the barrel. In the example illustrated in FIGS. 1 to 9, eight spaced apart heating elements 1110, each of which is annular and surrounds the outer surface of the barrel, are shown. In the example illustrated in FIG. 11, five heating elements 1110 are shown. It will be appreciated that more or fewer heating elements 1110 may be provided in alternative embodiments.

The input material continues to be conveyed by the extrusion screw 1300 towards the output end 1104 of the extrusion barrel 1100, where it is ejected as a flowable liquid material. In the example illustrated in FIGS. 1 to 9, the material is ejected from the extruder via an ejection nozzle 1200. More specifically, the flowable material exits the output end 1104 of the extruder barrel 1100 and enters the input end 1202 of the nozzle 1200, flows through the nozzle, and is ejected from the output end 1204 of the nozzle.

Optionally, a nozzle heating element (not shown) may also be positioned about the outer surface of output nozzle 1200. Heat from such a nozzle heating element may be transferred through the nozzle body to the conveyed material via the inner nozzle surfaces, and may be used to control the temperature of the material flowing within the output nozzle 1200. It will be appreciated that zero, one, or two or more nozzle heating elements may be provided in alternative embodiments.

The extrusion screw 1300 is rotated by screw drive motor 1030. Screw drive motor 1030 is preferably an electric motor, such as an alternating current (AC) motor (asynchronous or synchronous), a direct current (DC) motor, and the like. In the illustrated example, electric motor 1030 is driven by an adjustable-speed drive 1035, such as a variable-frequency drive (VFD), adjustable-frequency drive (AFD), variable-voltage/variable-frequency (VVVF) drive, and the like.

The screw drive motor 1030 may be drivingly coupled to the extrusion screw directly or via a drive transmission member, e.g., an optional gearbox 1040, which is preferably a reduction gearbox. The use of a reduction gearbox may allow the use of a higher-speed, lower power motor, which may be more efficient and/or less expensive to purchase and/or operate than a lower speed, higher power motor.

In the example illustrated in FIGS. 1 to 9, the input and output to gearbox 1040 are at right angles, allowing motor 1030 to be positioned at an angle to extrusion screw 1300. Alternatively, the input and output to gearbox 1040 may be on opposite sides of the gearbox, allowing motor 1030 to be positioned generally in-line with extrusion screw 1300. Alternatively, the input and output to gearbox 1040 may be at right angles, but motor 1030 may be positioned beside or below extrusion screw 1300. It will be appreciated that gearbox 1040 and/or one or more mechanical or viscous couplings may be provided to allow any suitable relative position of motor 1030 and extrusion screw 1300.

Extrusion screw 1300 may be rotationally supported within extrusion barrel 1100 by the gearbox 1040 (or motor 1030, if a gearbox is not provided) and/or by one or more bearings. For example, at least one end thrust bearing configured to allow rotation of screw 1300, and to resist the expected axial forces exerted on screw 1300 in a direction towards the input end 1302 of the extrusion screw (e.g. due to backpressure of the material being conveyed by screw 1300, and/or a partial or complete obstruction of output nozzle 1200) may be provided.

As exemplified, extrusion screw 1300 may be substantially solid. Alternatively, the extrusion screw may be partially or substantially hollow. In the illustrated example, the output end 1304 of extrusion screw 1300 is provided with a nose cone 1310 (see for example FIG. 11). Nose cone 1310 may assist with directing the output material from the output end 1104 of the extruder barrel 1100 to the input 1202 of nozzle 1200. Nose cone 1310 may optionally be mounted to extrusion screw 1300 in a manner that allows it to be axially advanced and retracted relative to screw 1300, e.g. using an optional knockout rod 1042 that extends through a hollow extrusion screw. The ability to axially advance nose cone 1310 using knockout rod 1042 may be useful when clearing a blockage of output material (e.g. when removing a clogged nozzle 1200).

Extrusion Barrel

Extrusion barrel 1100 preferably has a relatively thin wall thickness, particularly in comparison to barrels used in typical extrusion or injection molding machines. For example, extrusion barrel 1100 may have a wall thickness of from between 0.015 to 0.375 inches, or from between 0.04 to 0.25 inches, or from between 0.08 to 0.1875 inches.

Providing a relatively thin-walled extrusion barrel may have one or more advantages. For example, the rate of heat transfer through the extrusion barrel wall may be proportional to the wall thickness of the barrel, such that a decrease in the barrel wall thickness results in a higher heat transfer rate through the barrel wall. An extrusion barrel 1100 having a relatively high heat transfer rate through the barrel wall may have one or more advantages. For example, an increased thermal transfer rate allows more heat to be transferred through the barrel wall for a given unit of time. Accordingly, more heat per unit time can be transferred to the plastic material being conveyed through the extrusion barrel. Thus, it follows that the plastic material needs to spend less time in the extrusion barrel to have the necessary amount of heat transferred to it to melt the plastic material and/or less shear heating is required. As a consequence, if the material is liquefied or the feed material is of a size that seats within the threads of a screw, the extrusion screw 1300 may be rotated at a higher speed (i.e. a higher RPM) to convey the material through the extrusion barrel in a shorter amount of time without incurring excessive pressures that may inhibit the use of thinner walled barrels.

Extrusion barrel 1100 is optionally made from a material that has a relatively high thermal conductivity, such as copper or aluminum. Using such a material may further increase the heat transfer rate through the barrel wall, which may provide or enhance one or more of the advantages noted above.

Melting Plastic

As discussed previously, in typical extrusion or injection molding machines, the heat provided to raise the temperature of the conveyed plastic material as it passes through the extrusion or injection barrel is provided primarily by mechanical shear heating. Further, the barrel wall thickness required to contain the operating pressures required for significant shear heating may reduce the maximum heat transfer rate through the barrel wall, reducing the amount of energy that can be conveyed to the plastic material via barrel heaters. For example, in some prior art machines, approximately 90% of the total energy supplied to operate the machine may be supplied to the drive motor, with the remaining 10% being supplied to one or more barrel heaters.

In contrast, during the operation of extruder 1000, a majority, and preferably a substantial majority, of the heat provided to raise the temperature of the conveyed plastic material as it passes through the extrusion barrel may be provided by non-mechanical heat sources.

For example, extruder 1000 preferably includes an extrusion barrel 1100 having relatively high heat transfer rate through the barrel wall, which increases the amount of heat barrel heaters 1110 can provide to the plastic material in a given amount of time. This may allow barrel heaters 1110 to provide at least 60%, 65%, 70%, 75%, 80%, 85%, 90%, or at least 95% of the total amount of heat provided to the conveyed material during its time in the extrusion barrel 1100, with the remaining heat being provided as a result of mechanical shear heating.

Feed Block

In accordance with an aspect of this disclosure, various different features of a feed block for an extruder are provided. The shape of the flow passage into and through the feeder may be adjusted. For example, the width of the inlet passage to the screw in the feed block (in a direction transverse to the screw axis) may decrease along part or all of the length of the inlet in the axial direction, the height of the feed flow passage may decrease along part or all of the inlet passage, and the decrease in height may be constant or it may occur in downward steps and/or the shape of the outlet of the feeder in a vertical plane located at the interface of the feeder and the barrel may be adjusted to provide a reduced clearance between the screw and the outlet along a downstream portion of the upper end of the outlet. Alternatively, or in addition, a removable feeder block may be provided. One or more of these features of the feed block may be used in a feed block, and any such feed block may be used by itself or in any combination or sub-combination with any other feature or features described herein.

In accordance with this aspect, a feed block, which may also be referred to as a feeder, includes a feed flow passage, a rotatable screw positioned in the passage, and a feed block inlet that overlies at least a portion of the screw. By rotating the screw, a feedstock (e.g. a pelletized input material) may be drawn towards a feed block outlet, and from there the feedstock may pass into an extrusion barrel of the extruder.

Figure 10:
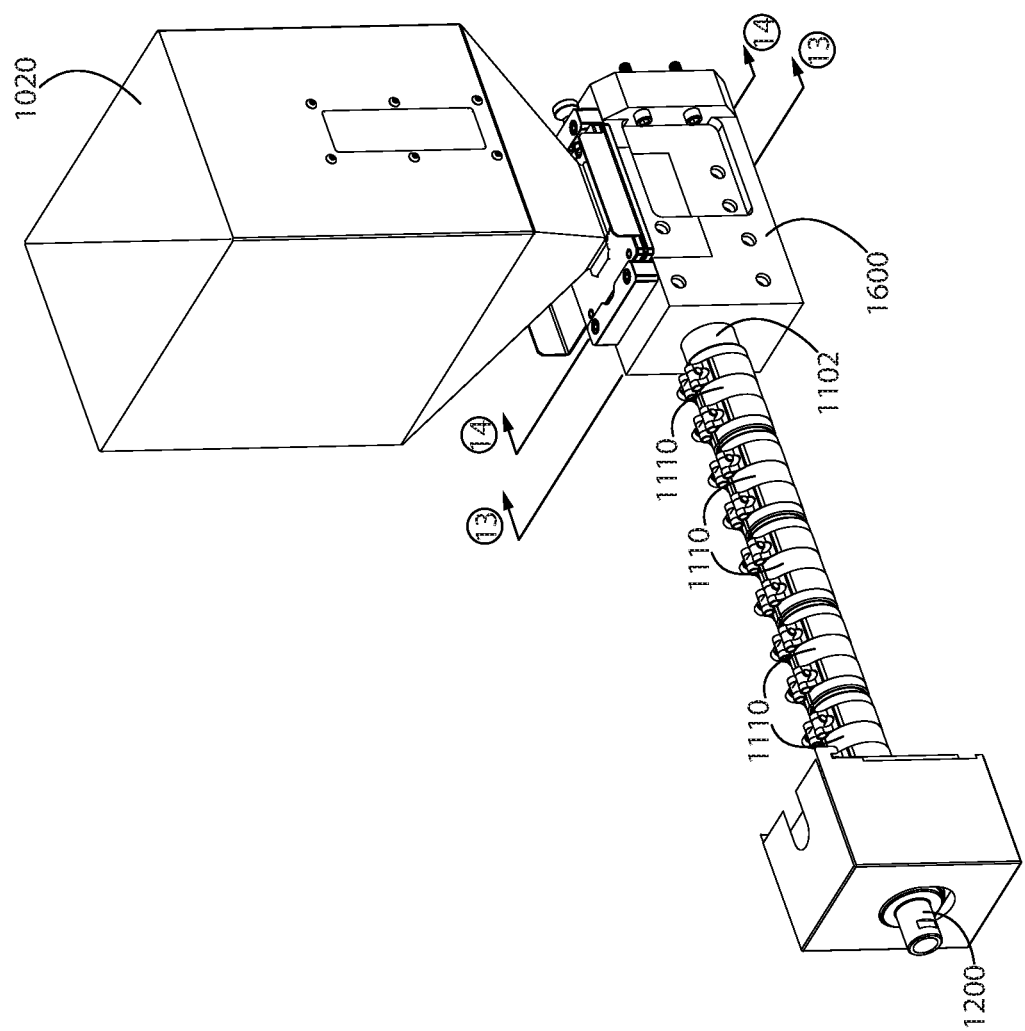
FIG. 10 is a perspective view of an extruder barrel, feed block, hopper, and output nozzle of the extruder of FIG. 1.

An example of a feed block 1600 will be discussed with reference primarily to the examples illustrated in FIGS. 10 to 22. FIG. 10 illustrates a feed block 1600 connected to an extruder barrel 1100, and to an optional feed hopper 1020.

Figure 11:
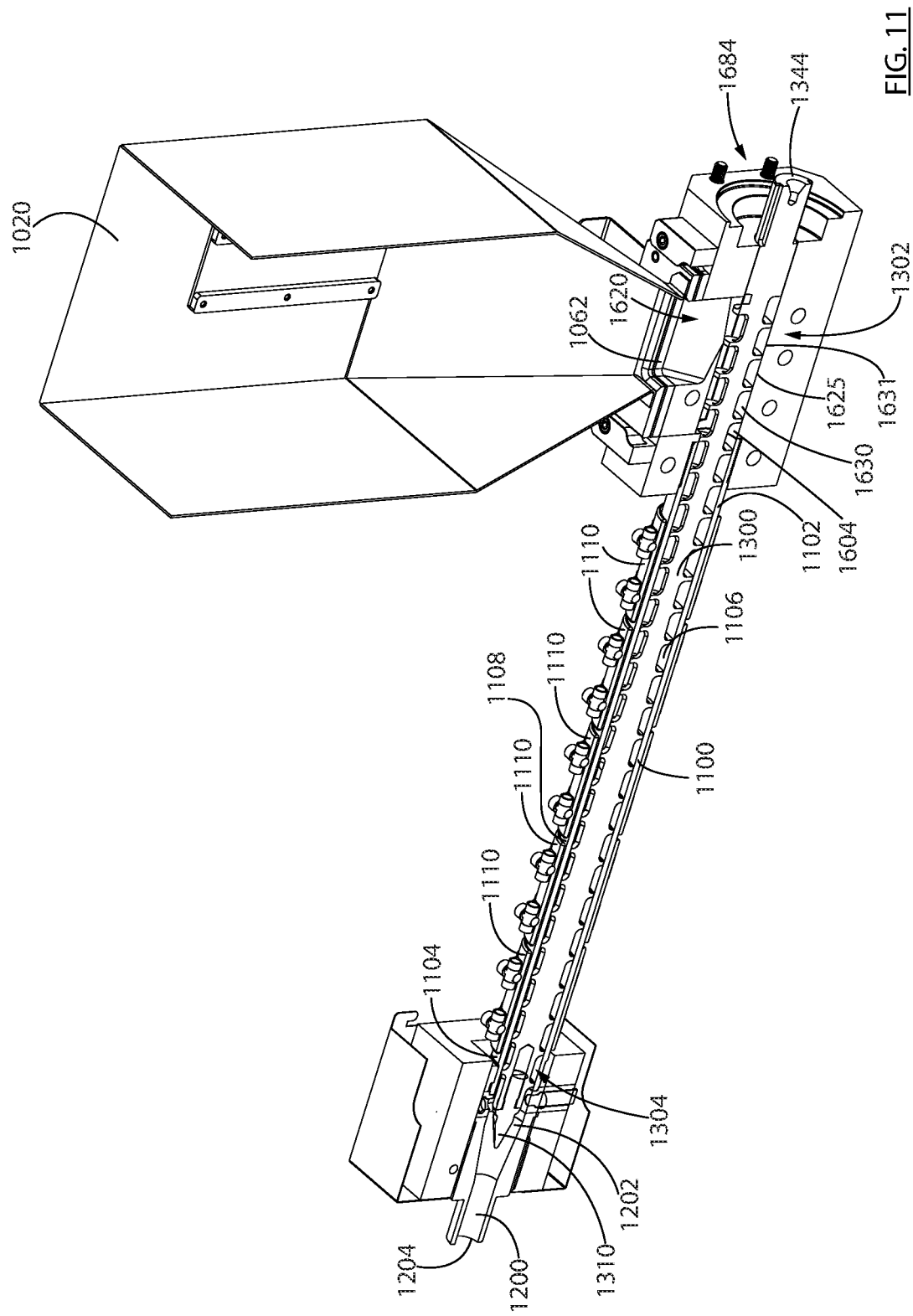
FIG. 11 is a perspective cross-section view of the extruder barrel, feed block, hopper, and output nozzle of the extruder of FIG. 10.

With reference to FIG. 11, feed hopper 1020 is optionally positioned above and in communication with the feed block inlet 1620, so that as feedstock in a feed flow passage 1630 is drawn towards the feed block outlet 1604 in the direction of flow 1625, feedstock (e.g. a pelletized input material) loaded in the hopper may be gravity fed into the feed flow passage 1630 via the inlet passage 1620.

Figure 21:
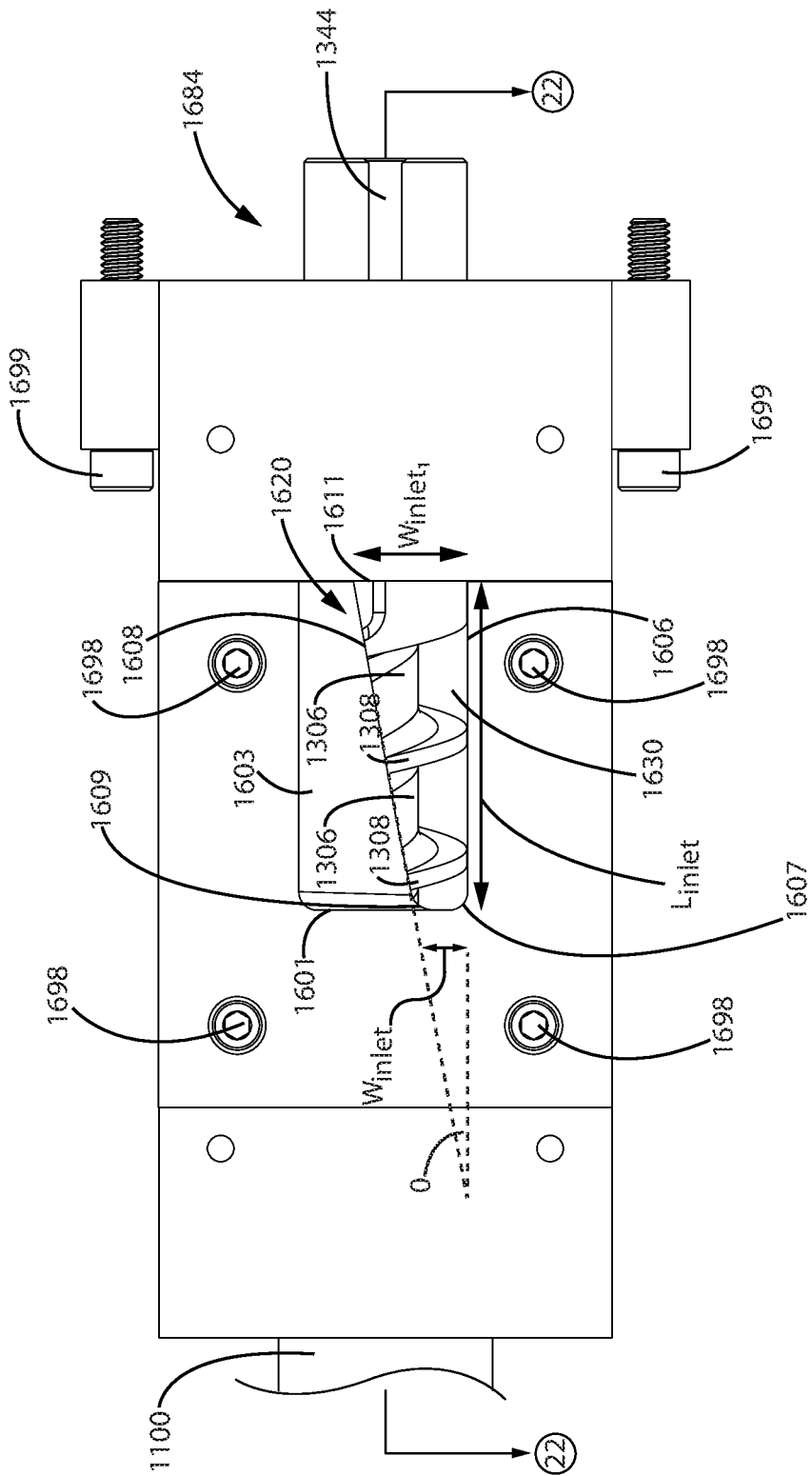
FIG. 21 is a top view of the feed block, feed block insert, extruder barrel, and extrusion screw of FIG. 16.

Referring to FIG. 21, viewed from above inlet passage 1620 has a length $L_{inlet}$ in a direction generally parallel to the axis of screw 1300, which may also be referred to as an axial direction 1625 of the feed flow passage 1630. Inlet passage 1620 also has a width $W_{inlet}$ in a direction generally perpendicular to the axial direction. As exemplified, the width $W_{inlet}$ of the inlet passage may decrease along the length of the inlet in the axial direction (i.e. $W_{inlet_1} > W_{inlet_2}$). The width may decrease at a constant rate or the width may decrease at an increased rate in the direction of flow 1625.

In the illustrated example, viewed from above a first side 1606 of the inlet passage is generally parallel to the axial direction 1625, and most of the opposite side 1608 is at an angle ø to the first side. Notably, the width of the inlet passage 1620 decreases along the length of the inlet in the axial direction at a substantially constant rate, with the exception being at the 'narrow' end of the inlet passage 1620 (e.g. proximate $W_{inlet_2}$), where the sides 1606, 1608 of the inlet passage 1620 converge towards each other at an increasing rate (due to the rounding of corners 1607 and 1609). Alternatively, corners 1607 and/or 1609 may not be rounded, and the width of the inlet passage 1620 may decrease along the entire length of the inlet in the axial direction at a constant rate.

As a further alternative, the width of the inlet passage may decrease along the length of the inlet in the axial direction at an increasing rate. For example, side 1606 of the inlet passage may be generally linear, and the opposite side 1608 of the inlet passage may have a substantially arcuate or parabolic shape, when viewed from above.

An advantage of this design is that the inlet passage may preferentially direct feedstock material towards one side of the feed flow passage, with this preference increasing in the feed flow direction 1625. Preferably, the side of the feed flow passage towards which feedstock is preferentially directed is the side at which the feed screw 1300 is moving downward when the crew is rotated. For example, referring to FIG. 13, when feed screw 1300 is rotated in direction 1325, feedstock material from hopper 1020 will be directed by surface 1603 preferentially towards downwardly-travelling portions of screw 1300. This may advantageously facilitate a greater portion of feedstock material passing through the inlet 1620 to be directed and preferably compressed into the volume between the flights 1308 of the screw and the outer surface of screw shaft 1306. For example, feedstock material may undergo radially inward (e.g. tangential) compaction and/or compression towards the outer surface of the screw shaft 1306 between the screw flights 1308 at the region proximate the side of the feed flow passage and the rotating screw 1300 (see e.g. FIG. 15).

Figure 14:
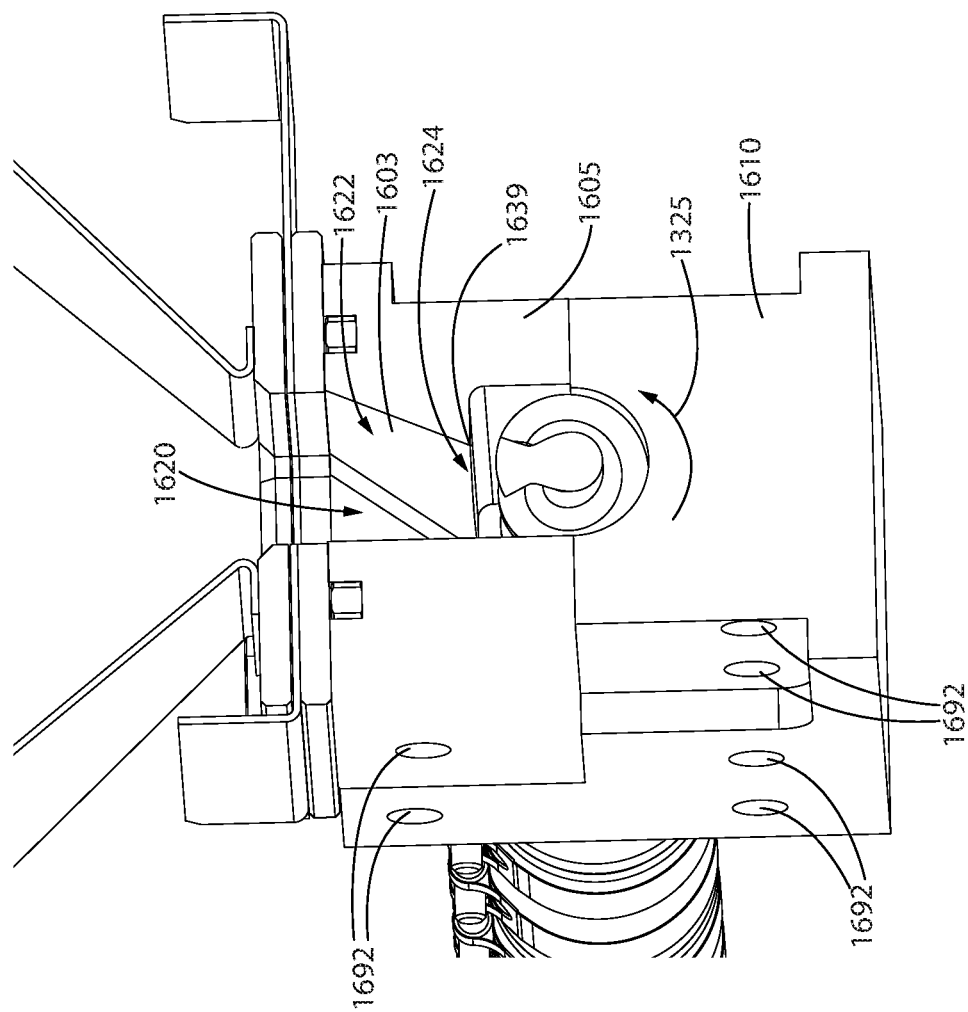
FIG. 14 is a perspective section view of the extruder barrel, feed block, and hopper of the extruder of FIG. 10, taken along line 14-14 in FIG. 10.
Figure 15:
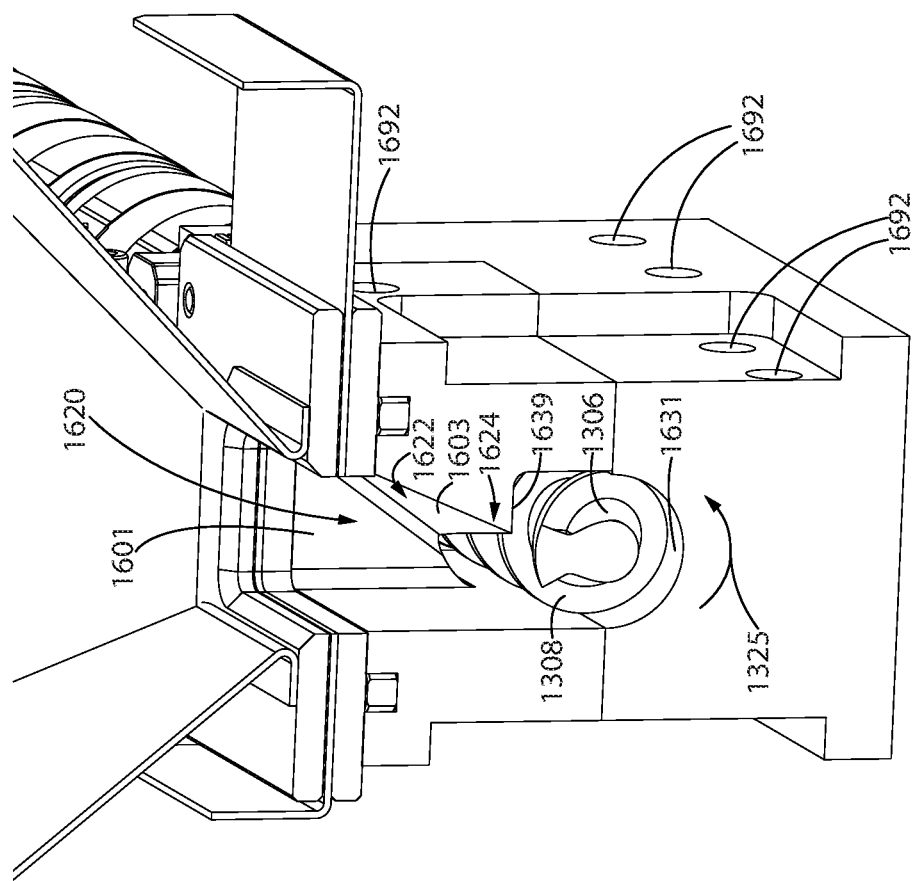
FIG. 15 is another perspective section view of the extruder barrel, feed block, and hopper of the extruder of FIG. 10, taken along line 14-14 in FIG. 10.
Figure 16:
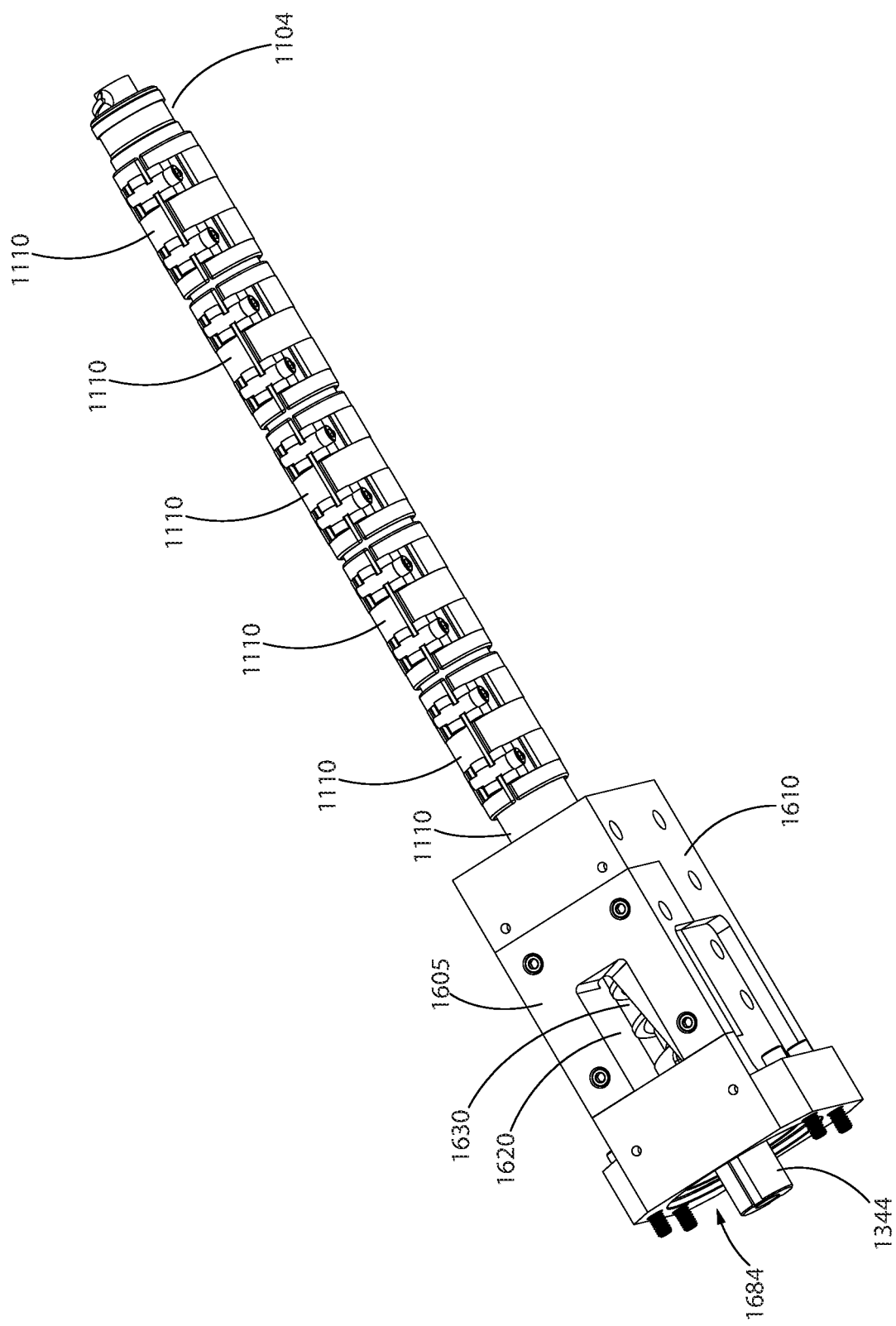
FIG. 16 is a rear perspective view of the extruder barrel, feed block, feed block insert, and extrusion screw of the extruder of FIG. 1

Additionally, as the width of the inlet passage 1620 decreases along the length of the inlet in the axial direction 1625, a greater portion of the feed flow passage 1630 may be covered. With reference to FIG. 14, lower surface 1639 is positioned over upwardly-travelling portions of screw 1300. This inner surface 1639 of feed flow passage 1630 may inhibit or prevent material from exiting from between the flights 1308 of screw 1300, and/or may inhibit or prevent de-compaction and/or decompression of material between the flights of screw 1300. Advantageously, this may result in a greater mass of material being introduced and/or retained between the screw flights, which may result in a greater mass flow rate of material in the feed flow direction for a given rate of rotation (e.g. RPM) of screw 1300.

Figure 12:
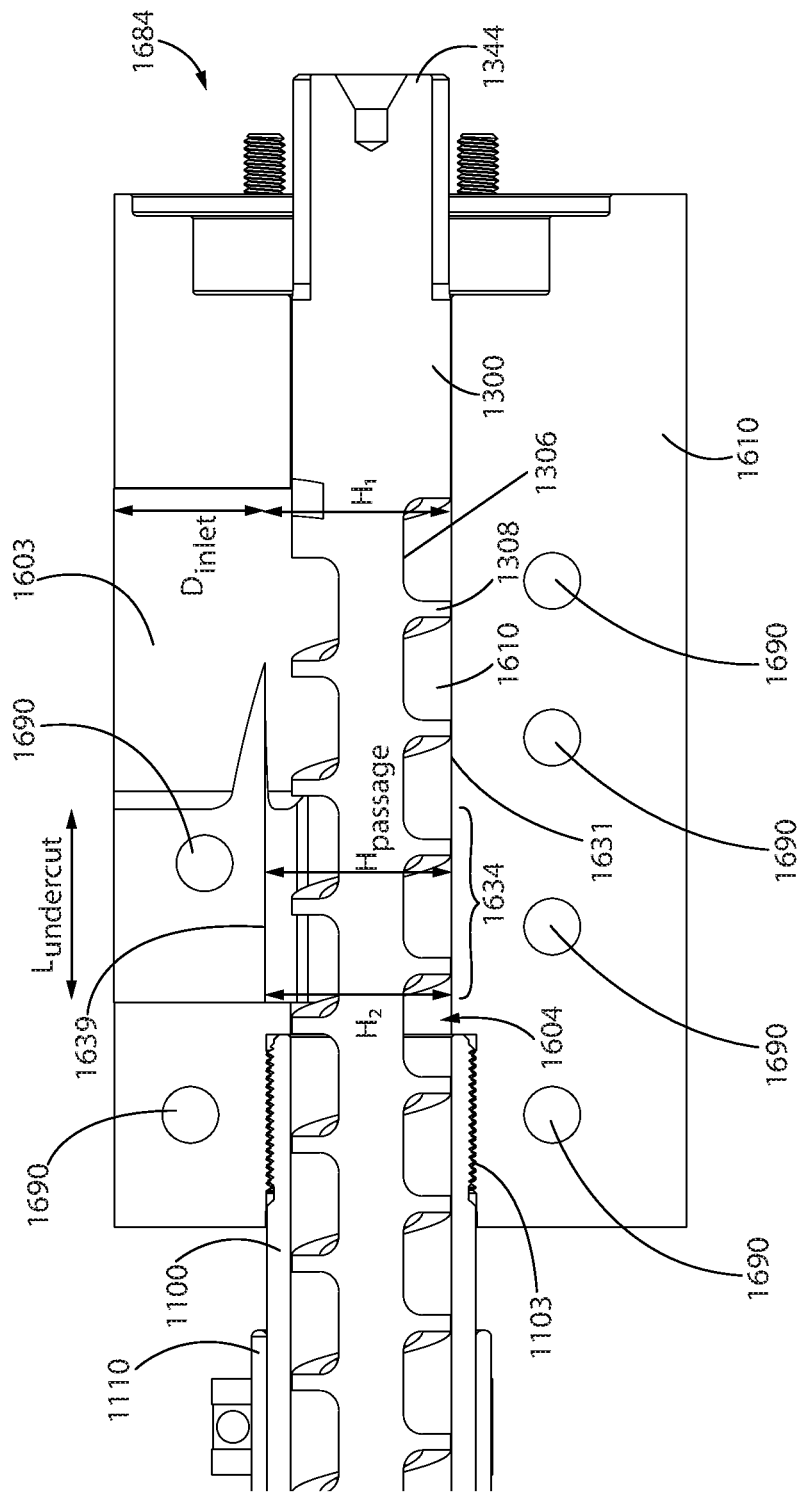
FIG. 12 is a cross-section view of the feed block of the extruder of FIG. 10 in a vertical plane through the feed block.

Referring to FIG. 12, in addition to portions of the feed block overlying the feed flow passage along the axial length $L_{inlet}$ of the inlet 1620, an inner surface 1639 of the feed block downstream of the inlet 1620 in the direction of flow 1625 may completely overlie the screw 1300 to define a downstream or undercut portion 1634 of the feed flow passage 1630.

Alternatively, or in addition to reducing the width of the passage, the height of the feed flow passage 1630 may be reduced in the downstream direction.

As exemplified in FIG. 12, the height of the feed flow passage may remain constant as the width decreases. As exemplified, surface 1639 extends longitudinally generally parallel to the axis of feed screw 1300, and generally parallel to the lower surface 1631 of feed flow passage 1630, resulting in the downstream portion 1634 having a generally constant volume per unit length in the direction of flow 1625, until a step 1637 proximate the inlet end 1102 of barrel 1100.

Alternatively, or additionally, the height of the feed flow passage may decrease along part or all of the inlet passage, and the decrease in height may be constant or it may occur in downward steps. The height of the passage may be reduced, with or without reducing the width. For example, the surface 1639 may be angled downwardly towards the lower surface 1631 of feed flow passage 1630. As exemplified in FIG. 12B, the height of the feed flow passage $H_{passage}$ decreases along the length of the feed flow passage in the axial direction 1625 from $H_1$ at the inlet end to $H_2$ towards the outlet end. Decreasing the height of the feedflow passage 1630 in the axial direction 1625 results in the downstream portion 1634 having a decreasing volume per unit length in the direction of flow 1625, which may result in increased compaction and/or compression of material as it is drawn by screw 1300 towards the feed block outlet 1604.

This increased compaction and/or compression may advantageously result in a greater mass of (e.g. pelletized) input material being introduced and/or retained between the screw flights, which may result in a greater mass flow rate of material in the feed flow direction for a given rate of rotation (e.g. RPM) of screw 1300.

Figure 12B:
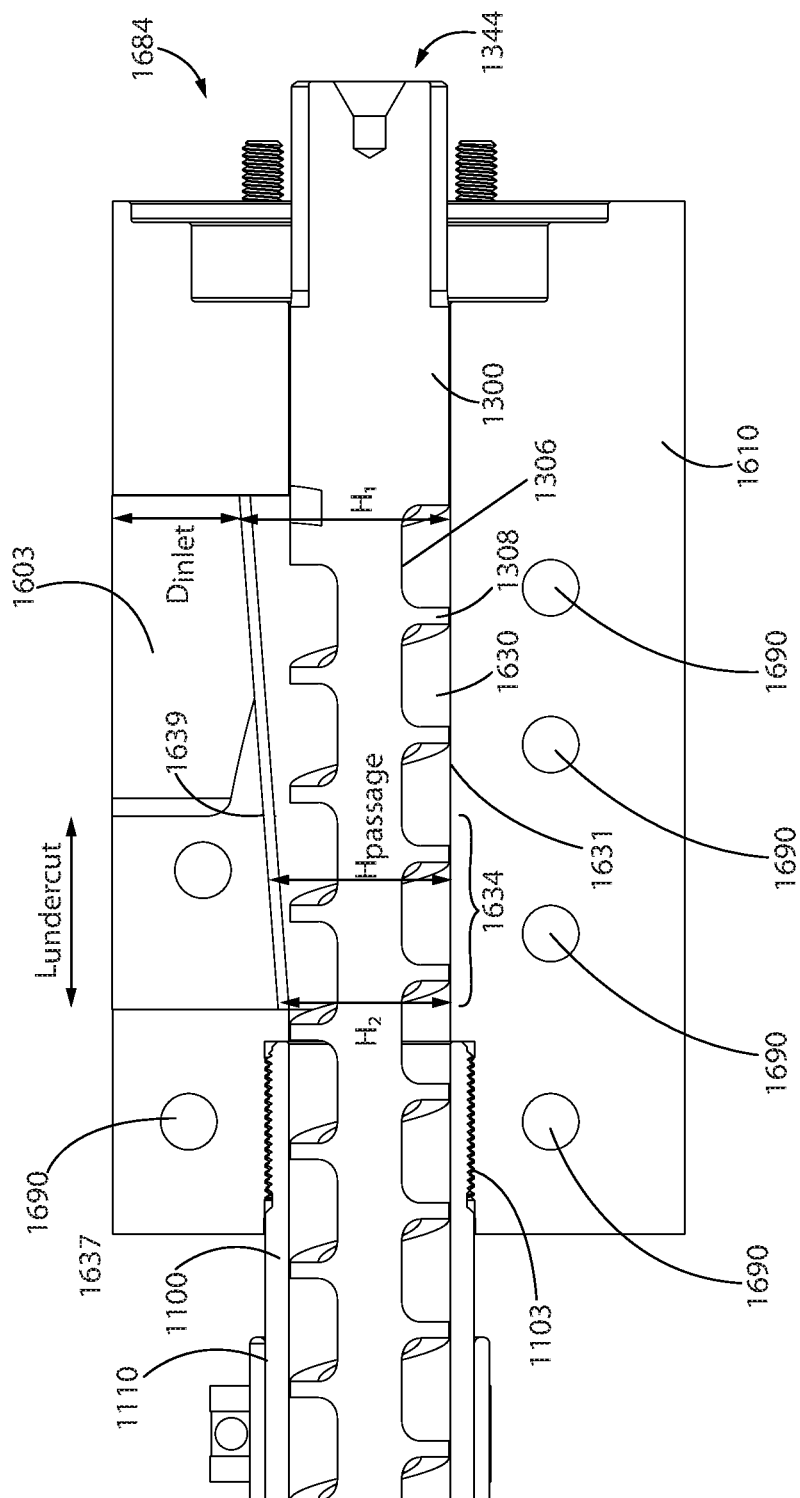
FIG. 12B is a cross-section view of an alternative embodiment of an extruder feed block in a vertical plane through the feed block.
Figure 13:
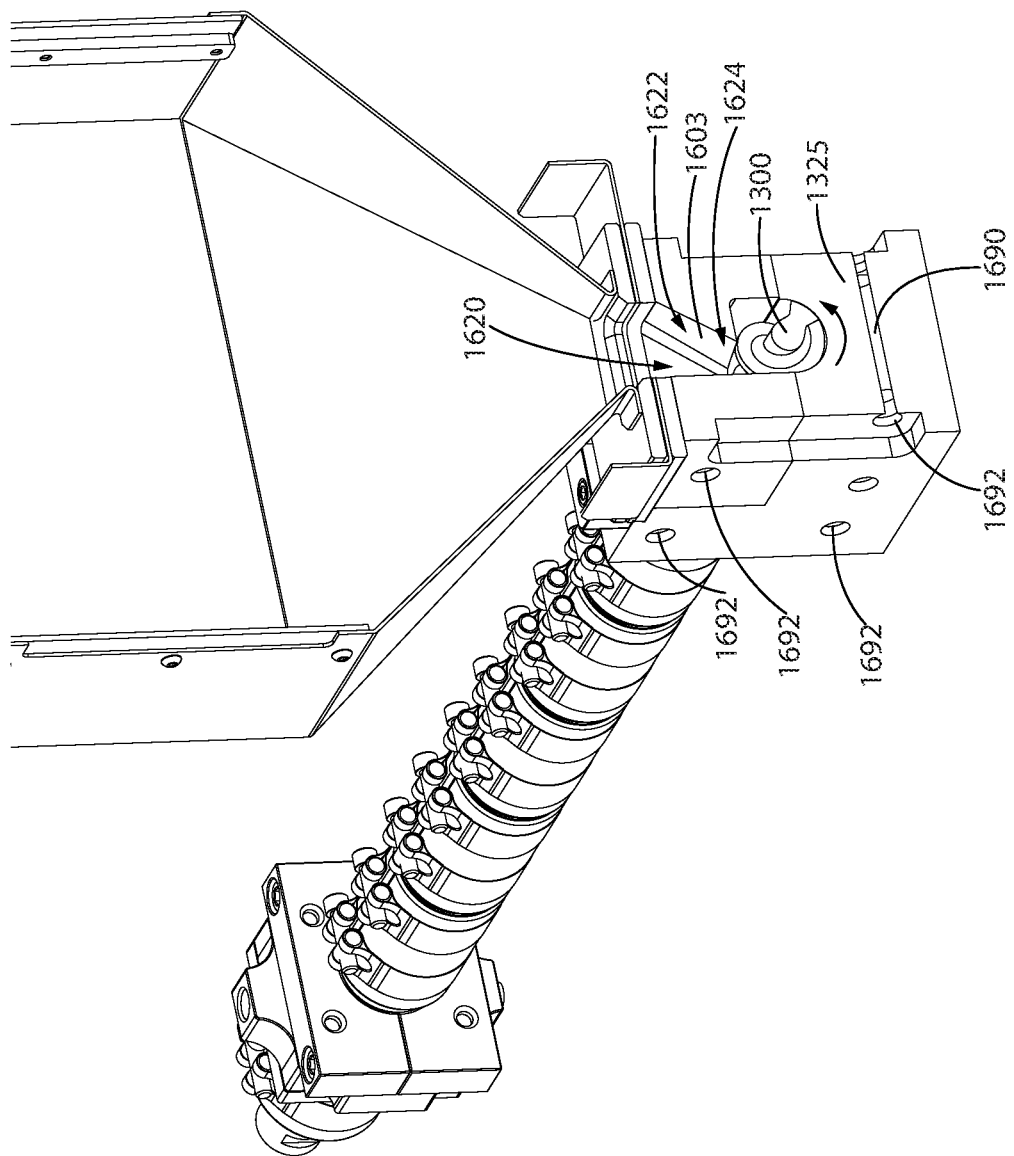
FIG. 13 is a perspective section view of the extruder barrel, feed block, hopper, and output nozzle of the extruder of FIG. 10, taken along line 13-13 in FIG. 10.

In some embodiments, surface 1639 may be angled towards the lower surface 1631 of feed flow passage 1630 such that the height of the feed flow passage $H_{passage}$ may decrease along the length of the feed flow passage in the axial direction 1625 at a substantially constant rate (e.g. as illustrated in FIG. 12B).

Alternatively, surface 1639 may be curved (e.g. a parabolic curve) towards the lower surface 1631 of feed flow passage 1630 such that the height of the feed flow passage $H_{passage}$ may decrease along the length of the feed flow passage in the axial direction at an increasing rate.

Alternatively, or additionally, surface 1639 may have one or more discrete 'step-downs' where the height of the feed flow passage $H_{passage}$ may decrease sharply. For example, in the example illustrated in FIG. 12, a step 1637 is located proximate the inlet end 1102 of barrel 1100. Optionally, step 1637 (or any other step-down along surface 1639) may be chamfered, beveled, or curved to decrease the sharpness of the transition.

Alternatively, or additionally, the shape of the outlet of the feeder in a vertical plane located at the interface of the feeder and the barrel may be adjusted to provide a reduced clearance between the screw and the outlet along a downstream portion of the upper end of the outlet. For example, as perhaps best seen in the example illustrated in FIGS. 24 and 25, the inner surface 1639 may have a generally planar portion 1643 and a radially curved portion 1641. Curved portion 1641 results in the radial gap between the outer diameter of screw 1300 and the inner surface 1639 to decrease in the direction of rotation 1325 of the screw 1300. This arrangement may result in increasing tangential compression of input material as it is conveyed towards the extrusion barrel by the rotating screw.

For an extrusion screw and barrel used in typical extrusion or injection molding machines, the radial gap between the outer screw flight diameter and the inner surface of the extruder barrel is relatively small, for example, between about 0.001" and 0.002". This relatively stringent tolerance may be required to maintain an increased compression of the material being extruded (e.g. to facilitate shear heating), and/or to prevent mixing at the barrel wall, which may be considered undesirable in a typical extrusion process.

In contrast, in extruder 1000, the radial gap between the outer diameter of screw 1300 and the inner surface 1106 of extrusion barrel 1100 may be between 0.002" to 0.125", optionally from between 0.004" and 0.045", and optionally about 0.006 to 0.020".

In the downstream or undercut portion 1634 of feed flow passage 1630, the gap between the outer diameter of the upper portion of screw 1300 and the inner surface 1639 is preferably between 0.020 to 0.750" more preferably from between 0.060 and 0.375", and most preferably about 0.125 to 0.250". Accordingly, the radial volume between the screw 1300 and the inner surface of the surrounding feed block is greater than the radial volume between the screw 1300 and the inner surface 1106 of extrusion barrel 1100. As a result, the input material may be compressed radially inwardly as it is conveyed by the screw through the feed block 1600 towards the extrusion barrel 1100.

Adjusting the feed flow passage in one or more of the ways exemplified here may result in less hold-up of the material and a more even flow into the barrel.

Increasing the compaction and/or compression of the input material within the feed block may result in increased shear heating of the material. While shear heating is effective at raising the temperature of the feedstock (e.g. plastic) material, there may be one or more disadvantages. For example, excessive shearing of the plastic material may lead to a physical and/or chemical degradation of the polymer molecules within the plastic material. It will be appreciated that while the barrel is optionally of a thin wall design as discussed herein, the feeder and feed block insert may have thicker wall to enable shearing of the feedstock prior to its introduction to the barrel.

Also, if the temperature of feedstock material within feed block increases too much, there may be a decrease in the mass flow rate for a given screw RPM. Without intending to be bound by theory, excessive heating of the material may result in liquefied material with a lower viscosity, which may negatively affect the screw's ability to convey the material efficiently through the barrel and may damage the molecular structure of the material.

For example, for an ABS feedstock material, the material in the feed block may preferably have a temperature of between about 10° C. and 35° C. At temperatures of between about 40° C. and 50° C., the mass flow rate for a given screw RPM may decrease, and at temperatures above about 55° C., the flow rate may decrease substantially. It is preferred to maintain a feed block temperature of 0° C. and 50° C., more preferably 5° C. and 40° C. and most preferably 10° C. and 35° C.

For example, for a Polyether ether ketone (PEEK) feedstock material, the material in the feed block may preferably have a temperature of between about 10° C. and 50° C. At temperatures of between about 65° C. and 75° C., the mass flow rate for a given screw RPM may decrease, and at temperatures above about 85° C., the flow rate may decrease substantially. It is preferred to maintain a feed block temperature of 0° C. and 70° C., more preferably 5° C. and 60° C. and most preferably 10° C. and 50° C.

Optionally, to regulate the temperature of feedstock material that is compressed as it travels through the feed flow passage, feed block 1600 may include a cooling system. Accordingly, a cooling member may be provided. The cooling member may comprise one or more flow channels provided in the feeder.

As exemplified in FIG. 12, the cooling system includes a number of conduits or coolant flow channels 1690 extending through the feed block. Flow channels 1690 extend between inlet and/or outlet ends 1692, and are configured to allow the circulation of a cooling fluid through the coolant flow channels 1690. As exemplified, coolant flow channels 1690 may be each generally linear, and may extend generally transverse to the material flow direction 1625. It will be appreciated that any suitable configuration of coolant flow channels may be provided in one or more alternative embodiments.

Optionally, the cooling system may include one or more pumps (not shown) to circulate cooling fluid through the coolant flow channels. The cooling system may also optionally include one or more heat sinks or other passive or active heat exchangers (not shown) through which the cooling fluid may be circulated to remove heat from the fluid before recirculating it through the coolant flow channels.

In the example illustrated in FIGS. 10 to 22, feed block 1600 includes a main feed block body 1610 and feed block insert 1605. With reference to FIGS. 17 to 20, feed block insert is preferably removably mounted in a feed throat 1062 of the feed block body 1610. In the illustrated example, feed block insert 1605 is secured to main feed block body 1610 using a plurality of bolts 1698. However, any other securing means or removable securing means may be used.

Referring to FIGS. 23 to 26, feed block insert 1605 has a downstream end 1654, an upstream end 1652, and a lower mounting surface 1653 that is configured to be secured against main feed block body 1610. Optionally, one or more sealing members (not shown) may be positioned between main feed block body 1610 and feed block insert 1605.

Figure 24:
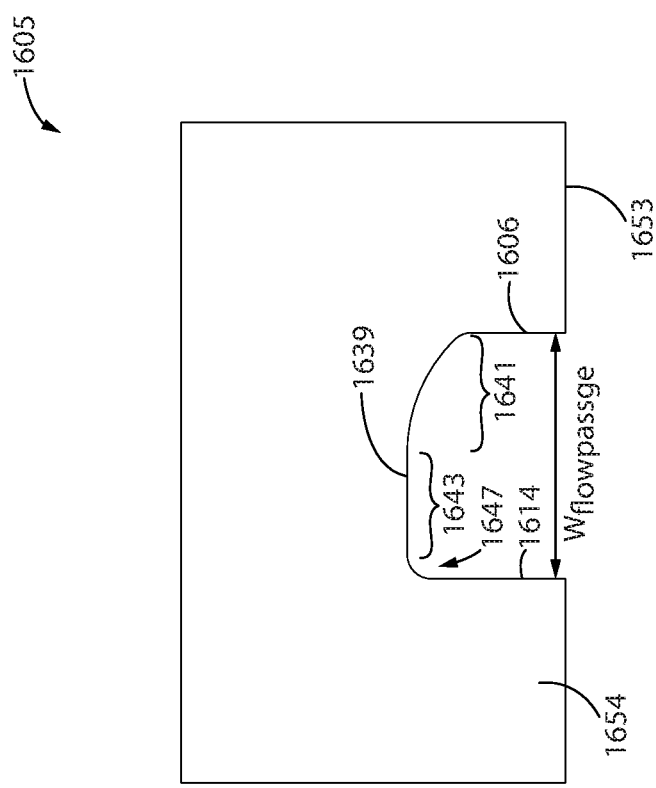
FIG. 24 is an end view of the barrel facing end of the feed block insert of FIG. 21.
Figure 25:
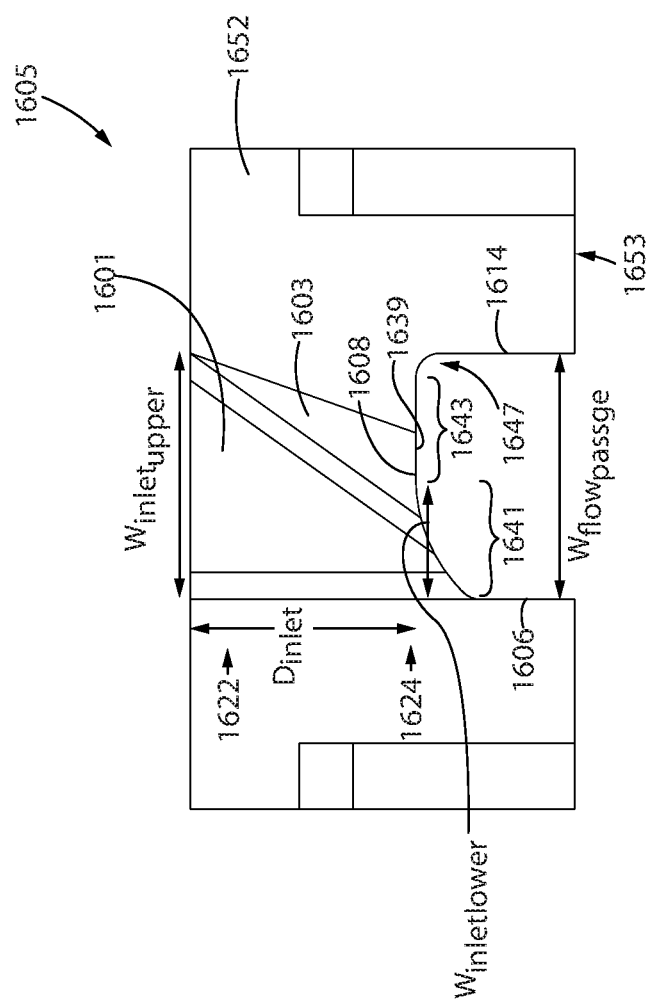
FIG. 25 is an end view of the end opposite the barrel facing end of the feed block insert of FIG. 21.
Figure 26:
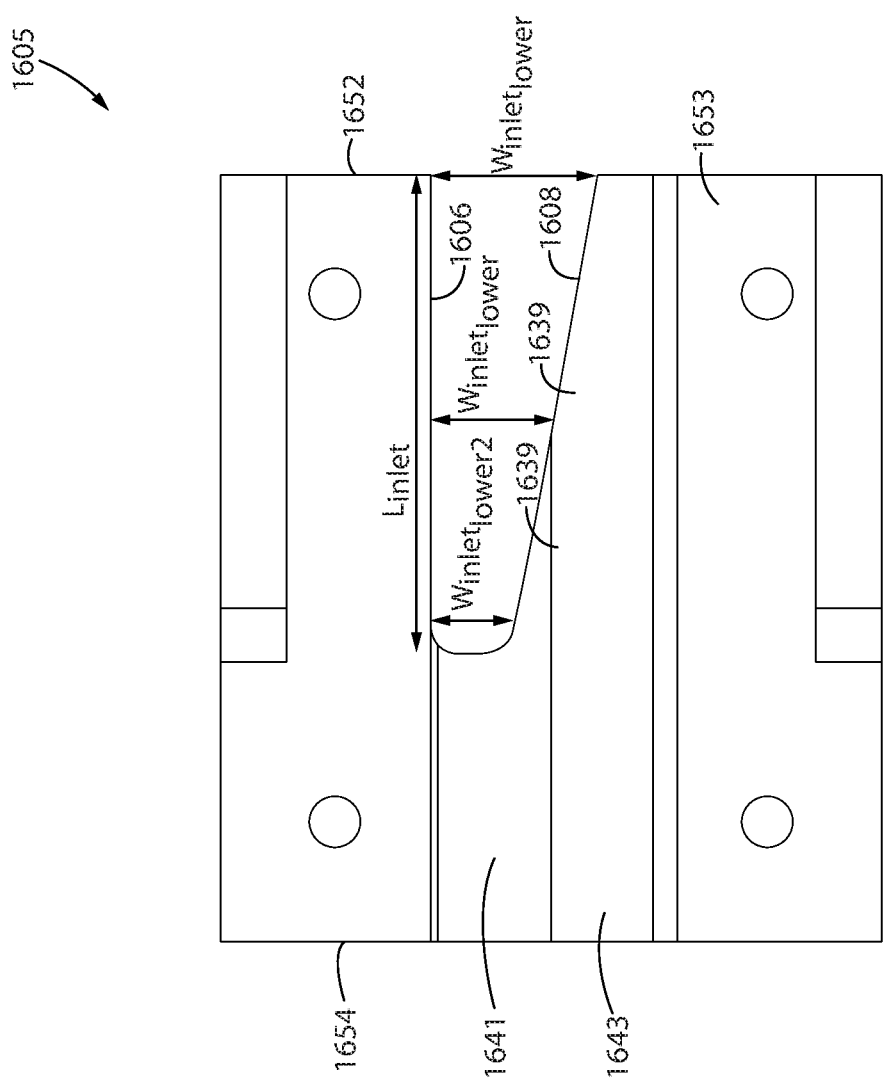
FIG. 26 is a bottom view of the feed block insert of FIG. 21.

As perhaps best seen in FIGS. 24 and 25, surface 1639 has a substantially planar portion 1643 and a curved portion 1641. As discussed above, curved region 1641 may result in the radial gap between the outer diameter of screw 1300 and the inner surface 1639 decreasing in the direction of rotation 1325 of the screw, which may promote increased tangential compression of input material in and/or proximate this region.

Figure 18:
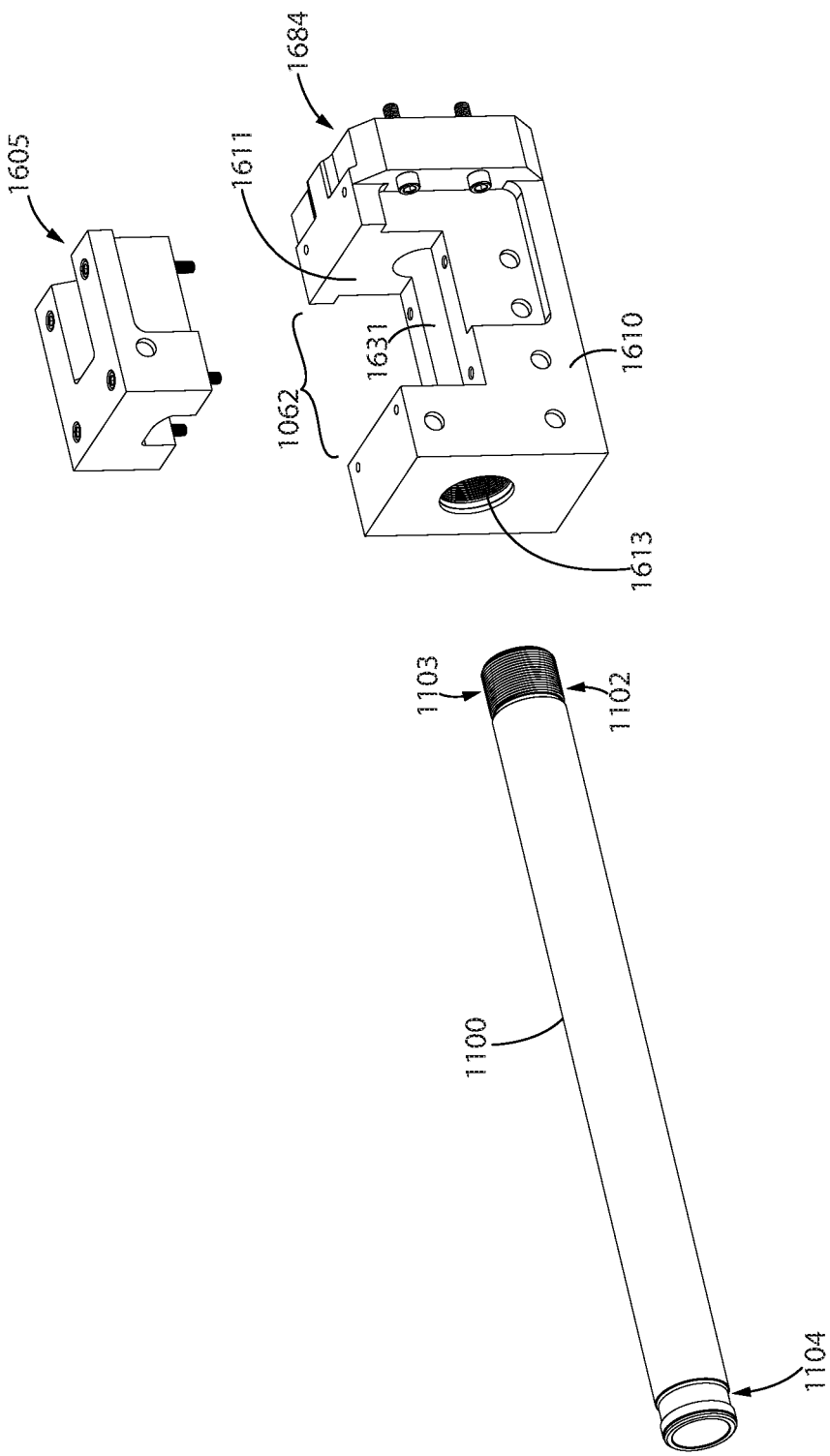
FIG. 18 is an exploded view of the extruder barrel, feed block, and feed block insert of FIG. 17.
Figure 19:
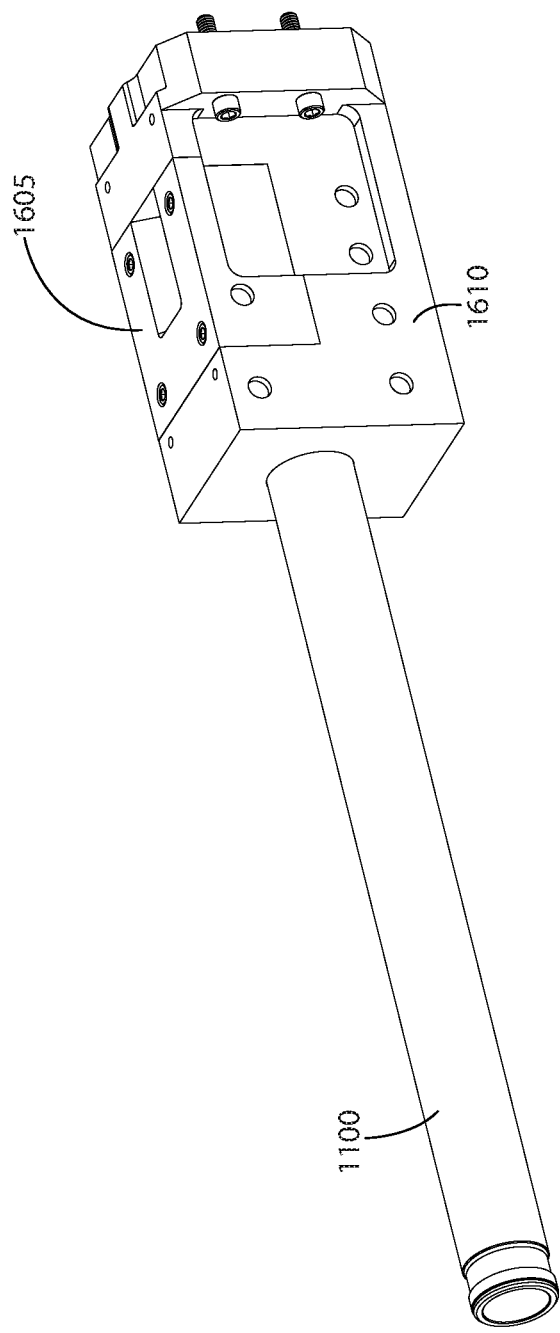
FIG. 19 is a perspective view of the extruder barrel, feed block, and feed block insert of FIG. 18.
Figure 20:
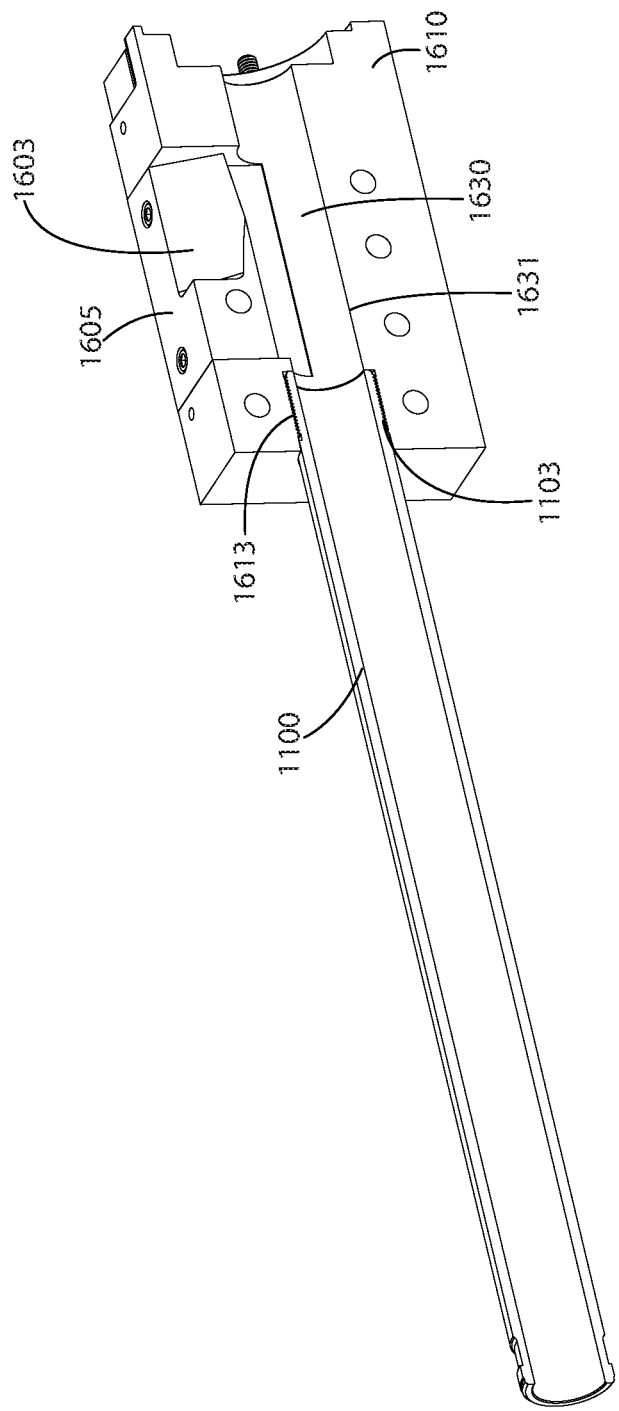
FIG. 20 is a perspective cross-section view of the extruder barrel, feed block, and feed block insert of FIG. 19.

Referring to FIGS. 18 and 20, the main feed block body 1610 includes a channel defining a lower surface 1631 of feed flow passage 1630. When feed block insert 1605 is mounted to the main feed block body 1610, this channel and feed block insert 1605 may cooperatively define at least a portion of the feed flow passage 1630. Alternatively, the feeder block may define the entire feed flow passage 1630.

In the illustrated example, the inlet passage 1620 of feeder 1600 is defined by feed block insert 1605 and a surface 1611 of feed throat 1062. An advantage of this design is that different feed block inserts 1605 may have inlet passages with different geometries. For example, a first feed block insert 1605 may have an inlet passage 1620 having a first length $L_{inlet}$, a first width $W_{inlet}$, a first depth $D_{inlet}$ (see e.g. FIG. 25) and one side of the inlet passage may be at a first angle ø to the opposite side. A second feed block insert may have a length $L_{inlet}$ that is different than the first length $L_{inlet}$, a width $W_{inlet}$ that is different than the first width $W_{inlet}$, a depth $D_{inlet}$ that is different from the first depth $D_{inlet}$, and/or one side of the inlet passage may be at an angle ø to the opposite side that is different than the first angle ø.

Providing feed block inserts 1605 with different geometries may have one or more advantages. For example, this may allow the geometries of the feed flow passage 1630 and/or the feeder inlet 1620 of a feed block 1600 to be reconfigured by simply replacing the feed block insert with a different feed block insert.

Optionally, the geometry of a feed block insert 1605 may be designed to provide improved and preferably optimized performance for a particular feed stock material (e.g. plastic composition, particle size, particle shape, elasticity in solid form, etc.) and/or process condition (e.g. screw RPM). Accordingly, a particular feed block insert 1605 may be selected and mounted to feed block body 1610 based on the extrusion process to be performed. For instance, a feed stock material that is provided in the form of a flat flake may feed better when the distance between the outer diameter of the upper portion of screw 1300 and the inner surface 1639 is reduced to 0.080 to 0.165" and the arc towards the side wall may be reduced at a greater rate to improve feeding. Conversely, a feed stock material that is provided in irregular pieces from 0.002 to 0.375" (e.g. typical of regrind material) may feed better when the distance between the outer diameter of the upper portion of screw 1300 and the inner surface 1639 is increased to 0.300 to 0.425" and the arc towards the side wall may be reduced at a lesser rate to improve feeding.

It will be appreciated that some of the embodiments disclosed herein may not use any of the features of the feed block insert disclosed herein and that, in those embodiments, a feed block of any kind known in the art may be used.

Use of Multiple Extruders

In accordance with another aspect of this disclosure, which may be used with one or more of the aspects of an extruder disclosed herein, two or more extruders may be used concurrently to fill a mold in a molding process or with an extrusion die.

In accordance with this aspect, the plastic material output from a plurality (i.e. two or more) extruders, which is in a flowable or melted state, is directed into a common mold, either directly or via a manifold, which may be a longitudinally flow conduit, connected to the mold and to at least some of the extruders.

As discussed above, flowable plastic material may exit each extruder 1000 at a relatively low pressure compared to the typical pressures used in commercial extruders, e.g., typically below 650 psi for filling molds, below 1,250 psi for packing molds, whereas typical injection molding machines typically inject at 2,500 to 20,000 psi and pack at 2,500 to 20,000 psi.

As discussed above, a flowable plastic material may exit extruder 1000 at a relatively low pressure, typically below 2,500 psi for producing extruded profiles, sheets or films through a die, and preferably below 1,500 psi, whereas typical machines operate at 3,500 to 20,000 psi for producing extruded profiles, sheets or films through a die.

A further advantage of 'ganging' two or more extruders together, preferably about one extruder per foot of width of sheet material that is to be formed, is that it may reduce the operating pressure within the system enabling lighter, smaller, lower cost dies and molds and reducing the material shearing within nozzles, gates, runners and other die or mold areas, thereby minimizing material degradation and minimizing retrained stress within the final material or part. For example, a typical "coat hanger die" to make a 4 foot wide sheet will be large and complex and the pressures to operate it will be in excess of 5,000 psi because of the long distance that the material must travel within the die, whereas an extrusion die with one extruder per foot of die length (product width) can operate at 1,500 psi or lower and enables a smaller, far less complex die, faster startup and shut down of the process, less material shearing within the nozzles, gates, runners and die, thereby minimizing material degradation and minimizing retained stress within the final material or part.

Figure 27:
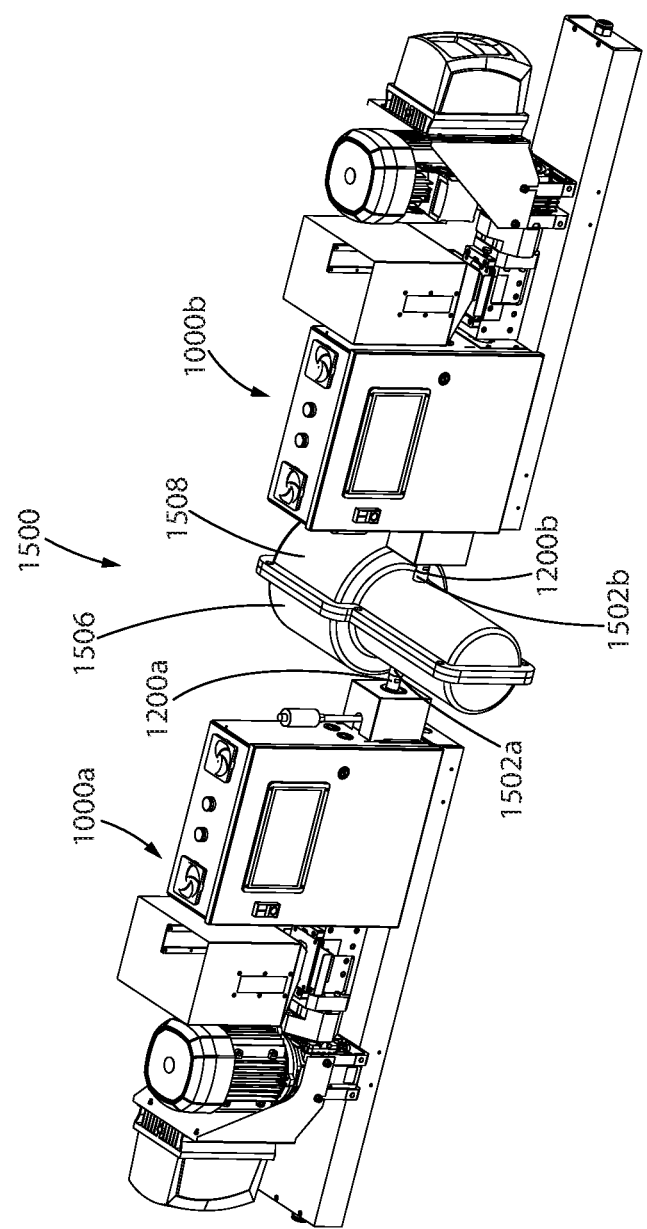
FIG. 27 is a perspective view of two extruders coupled to a common mold, in accordance with one embodiment.

In the example illustrated in FIG. 27, extruders 1000a and 1000b are each in fluid communication with a single mold 1500. More specifically, the output ends of the nozzles 1200a, 1200b are each fluidically coupled to a mold inlet port 1502a, 1502b. Mold inlet ports 1502 each provide fluid communication to at least one interior mold cavity within mold 1500, which in the illustrated example is defined by opposing mold halves 1506 and 1508.

In the example illustrated in FIG. 27, the extruder nozzles 1200a, 1200b are positioned on opposite sides of mold 1500. Alternatively, the extruder nozzles 1200 may be positioned on opposite ends of mold 1500. For example, as shown in FIG. 28, mold inlet ports 1502 are each positioned proximate the junction of the opposing mold halves 1506 and 1508.

Figure 28:
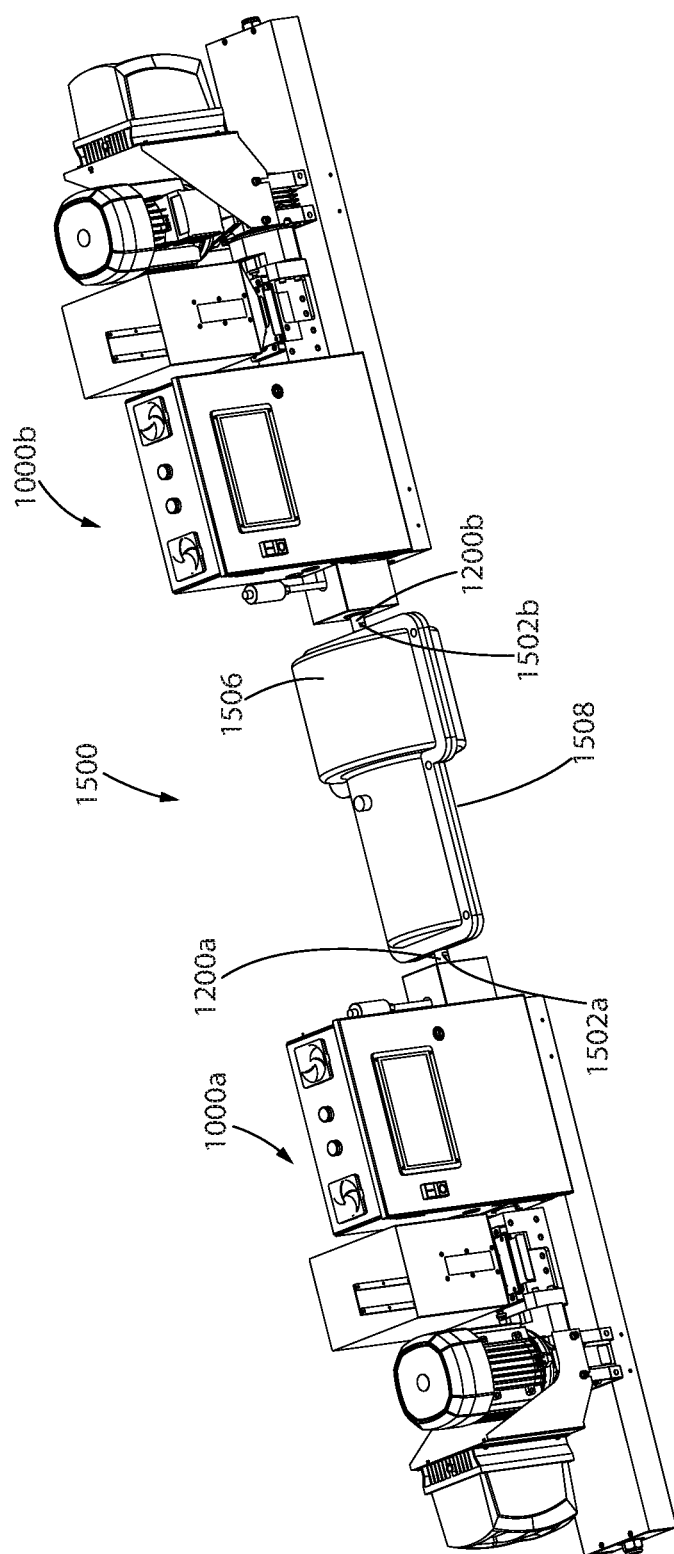
FIG. 28 is a perspective view of two extruders coupled to a common mold, in accordance with another embodiment.

In the examples illustrated in FIGS. 27 and 28, extruders are positioned on opposite sides of mold 1500. Alternatively, two or more extruders may be positioned on the same side of a common mold.

Positioning two or more extruders on the same side of a common mold may pose one or more challenges. For example, depending on the size of the mold, it may be preferable to have two or more mold inlet ports positioned in relatively close proximity to each other. However, positioning multiple extruders in close proximity to each other (so that their respective output nozzles are in close proximity to each other) may present one or more challenges. For example, the overall widths of the extruders may prevent their respective output nozzles from being in relatively close proximity to each other. Additionally, or alternatively, positioning three or more extruders in a side-by-side-by-side arrangement may inhibit or prevent access to the 'middle' extruder(s).

In one embodiment, extruders having the same length may be utilized wherein the feeders are staggered. Using extruders having the same length may permit the use of identical extruders that are used in unison. In such a case, one or more of the extruders may be provided with an extension conduit 1700 on the output nozzle 1200 such that each extruder may communicate with the common mold or extrusion die. In such a case, it will be appreciated that the extension conduit 1700 may be heated to maintain the fluidity of the plastic therein.

Figure 29:
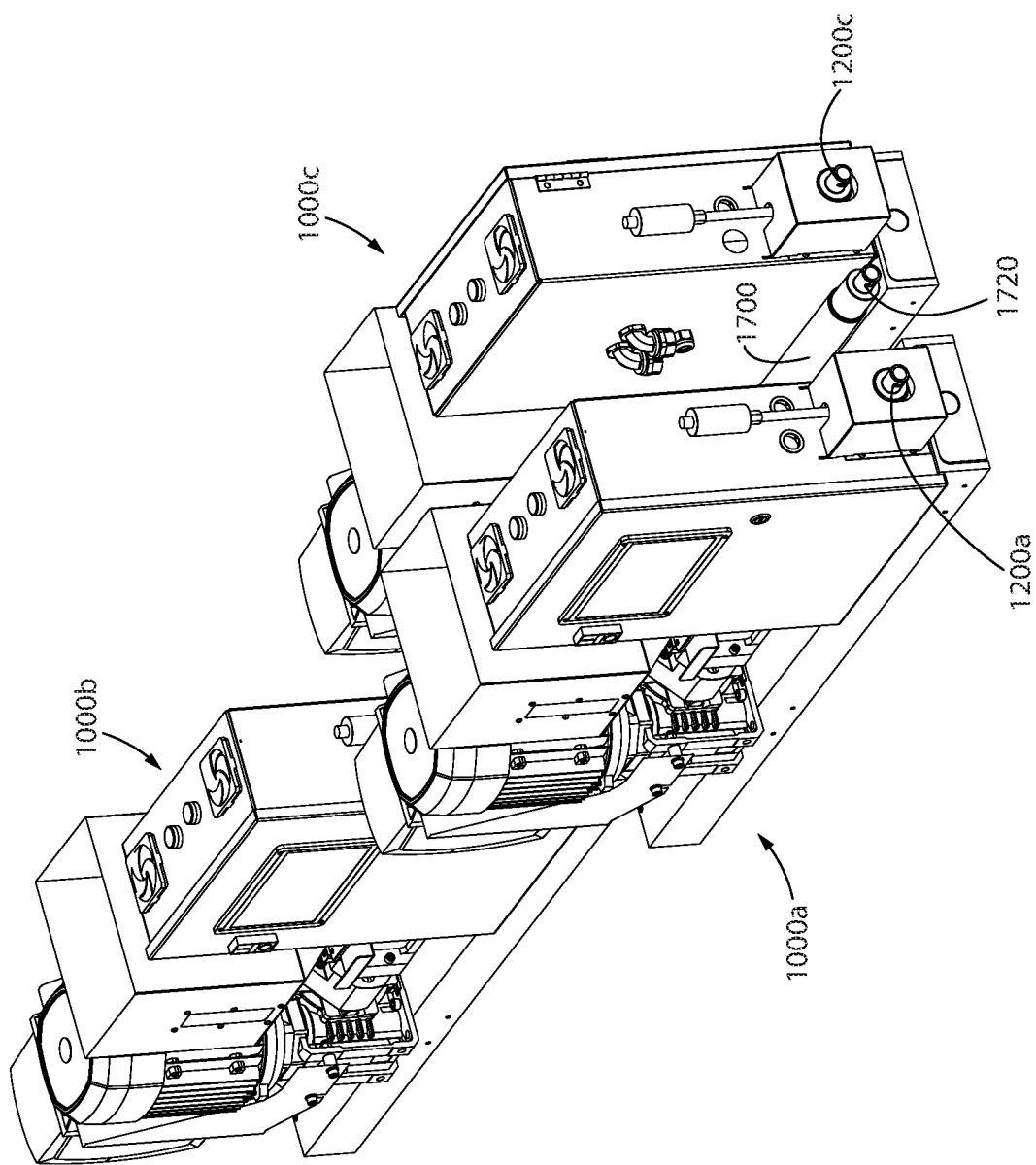
FIG. 29 is a perspective view of the output ends of three extruders, in accordance with one embodiment.
Figure 30:
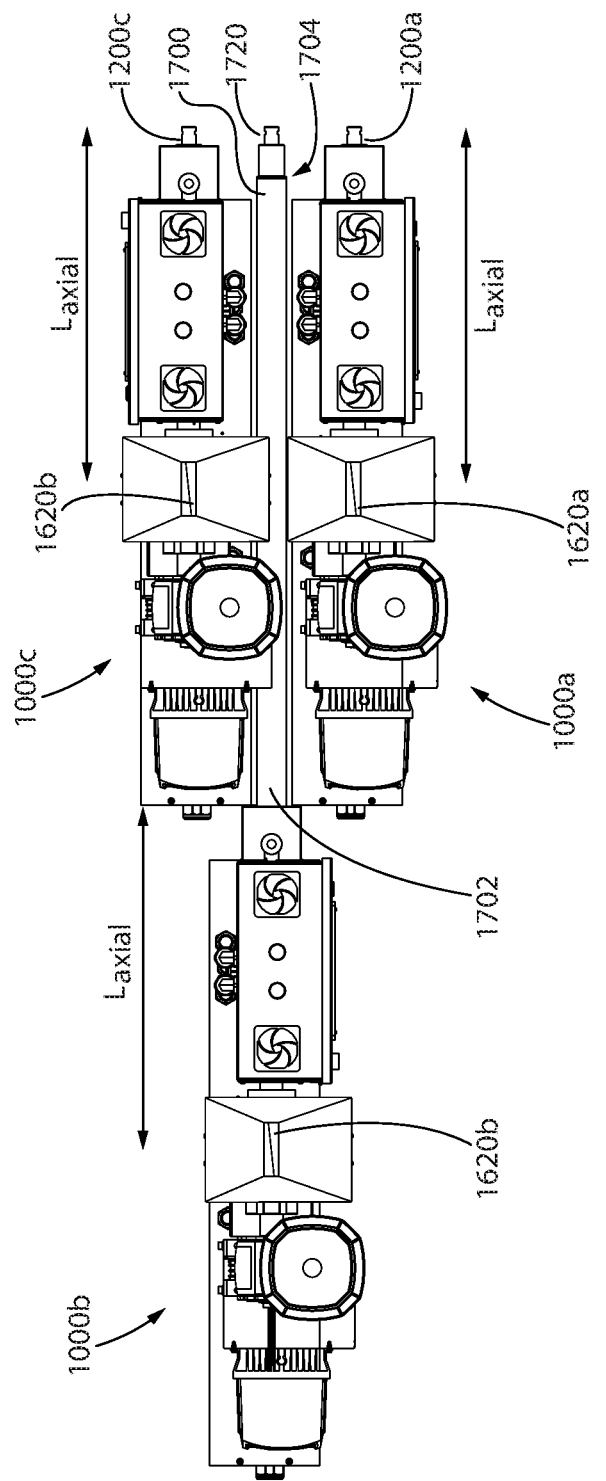
FIG. 30 is a top view of the extruders of FIG. 29.

For example, as exemplified in FIGS. 29 and 30, extruders 1000a, 1000b, and 1000c, each having substantially the same axial length $L_{Axial}$ between their feed inlet 1620 and their output nozzle 1200, are positioned relative to each other such that extruders 1000a and 1000c are positioned side-by-side, and extruder 1000b is offset rearwardly in an axial direction from extruders 1000a and 1000c. In the illustrated example, the output of extruder 1000b feeds into an inlet end 1702 of an extension conduit 1700 positioned between extruders 1000a and 1000c. In this arrangement, a nozzle 1720 at the output end 1704 of extension conduit 1700 is axially and vertically aligned with the outputs 1200*a*, 1200*c* of extruders 1000*a* and 1000*c*. This may facilitate the connection of the outputs 1200*a*, 1200*c*, and 1720 to a common mold (not shown).

Extension conduit 1700 is optionally configured to maintain the temperature of flowable material traveling through the conduit from the output nozzle 1200*b* of extruder 1000*b* to the nozzle or output 1720 of extension conduit 1700. Optionally, the extension conduit 1700 is thermally insulated, and may optionally include one or more heating or cooling elements to control the temperature of material within the conduit 1700.

In an alternative embodiment, the extruders may be of different lengths to enable the feeders to be at staggered locations. In such a case, an extension conduit 1700 may not be utilized.

Figure 31:
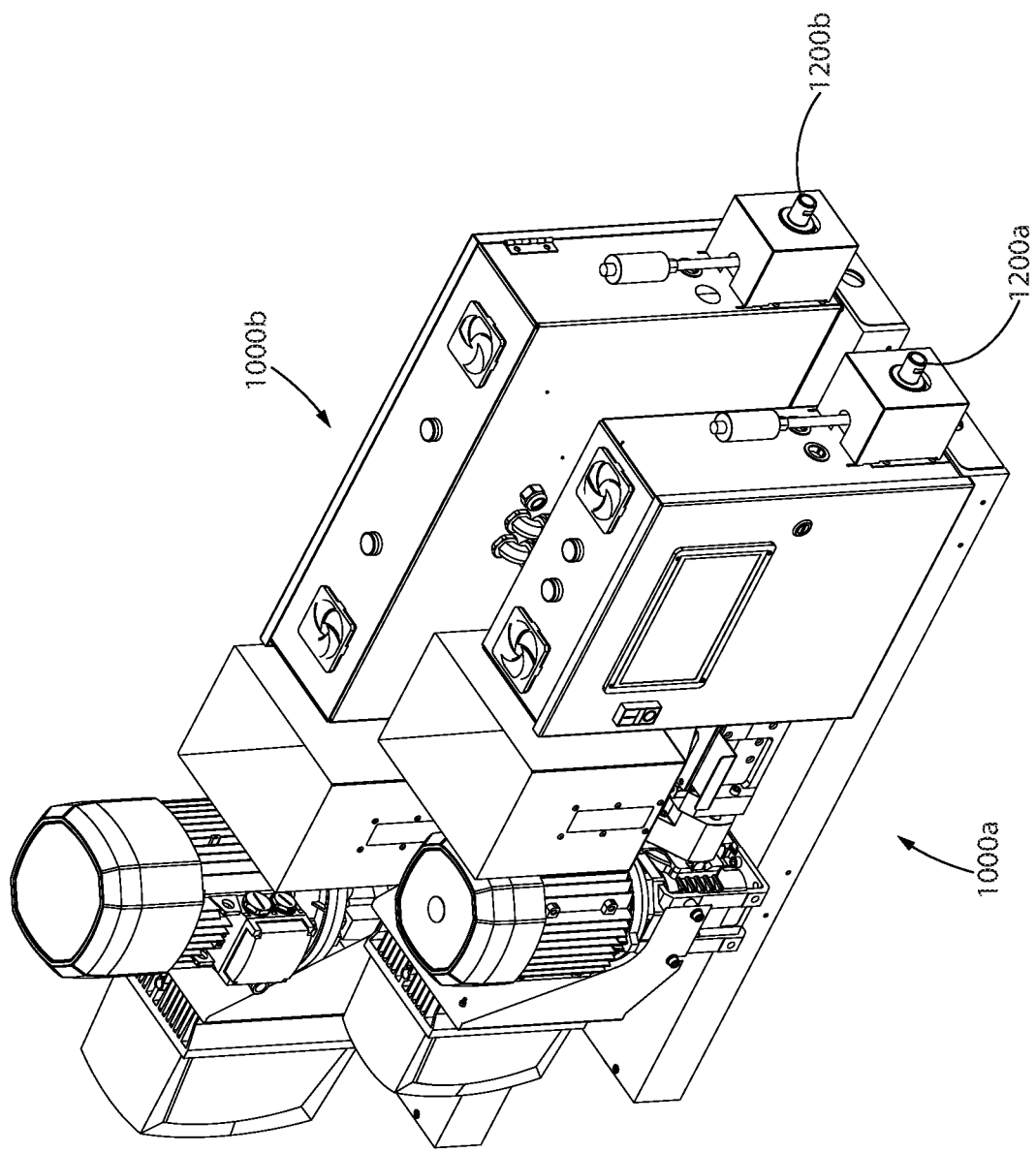
FIG. 31 is a perspective view of the output ends of two extruders, in accordance with one embodiment.
Figure 32:
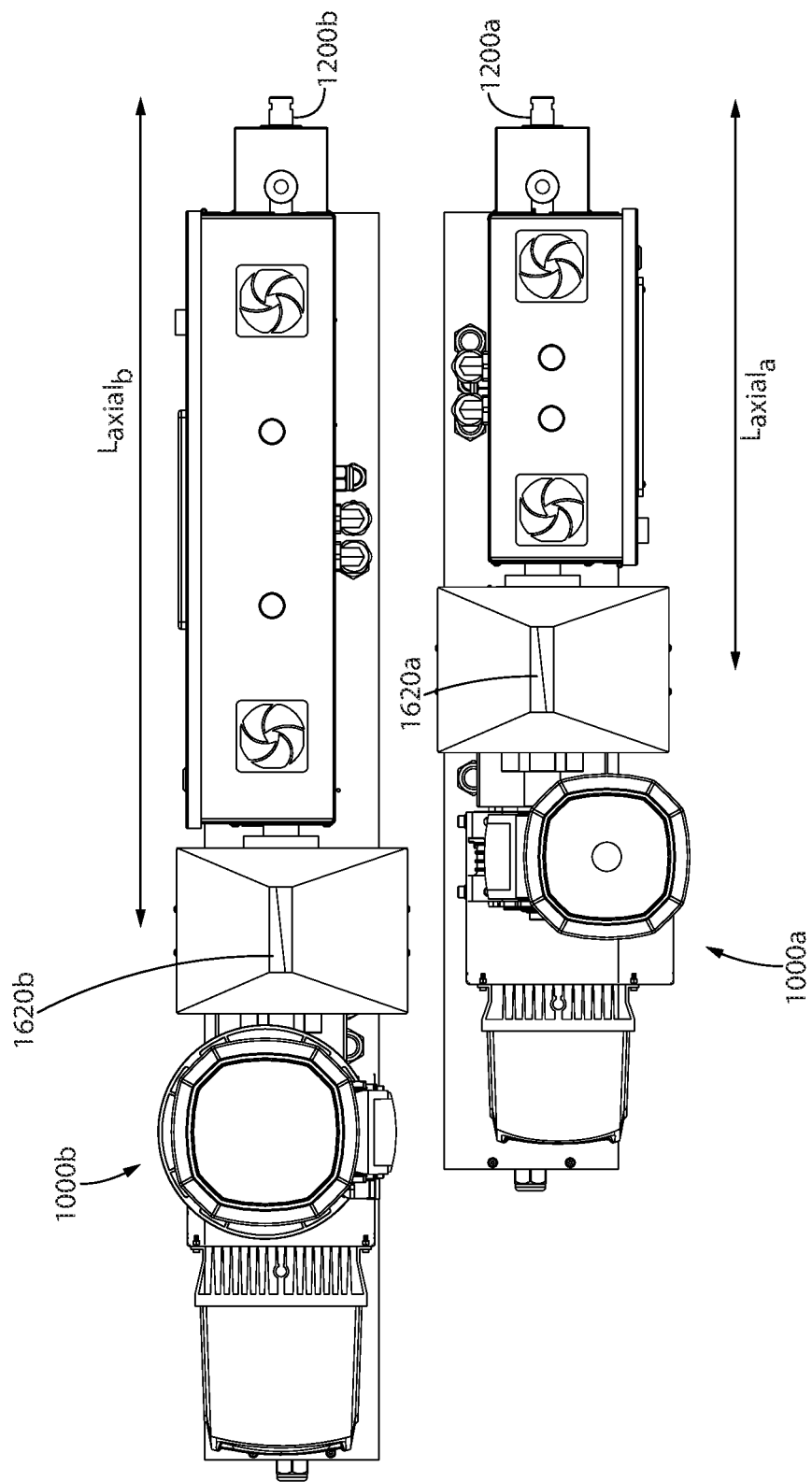
FIG. 32 is a top view of the extruders of FIG. 31.
Figure 33:
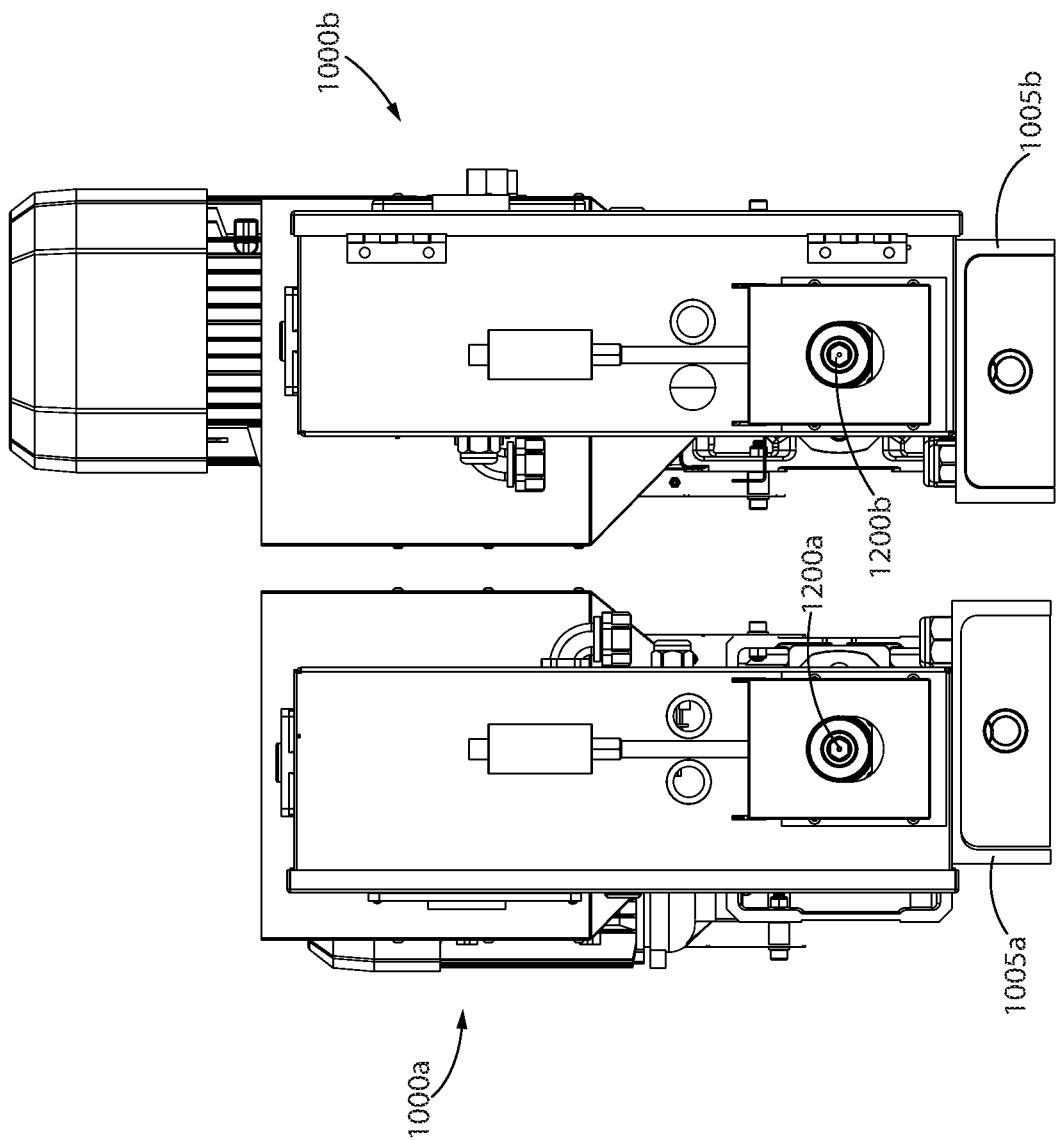
FIG. 33 is an end view of the output ends of the extruders of FIG. 31.
Figure 34:
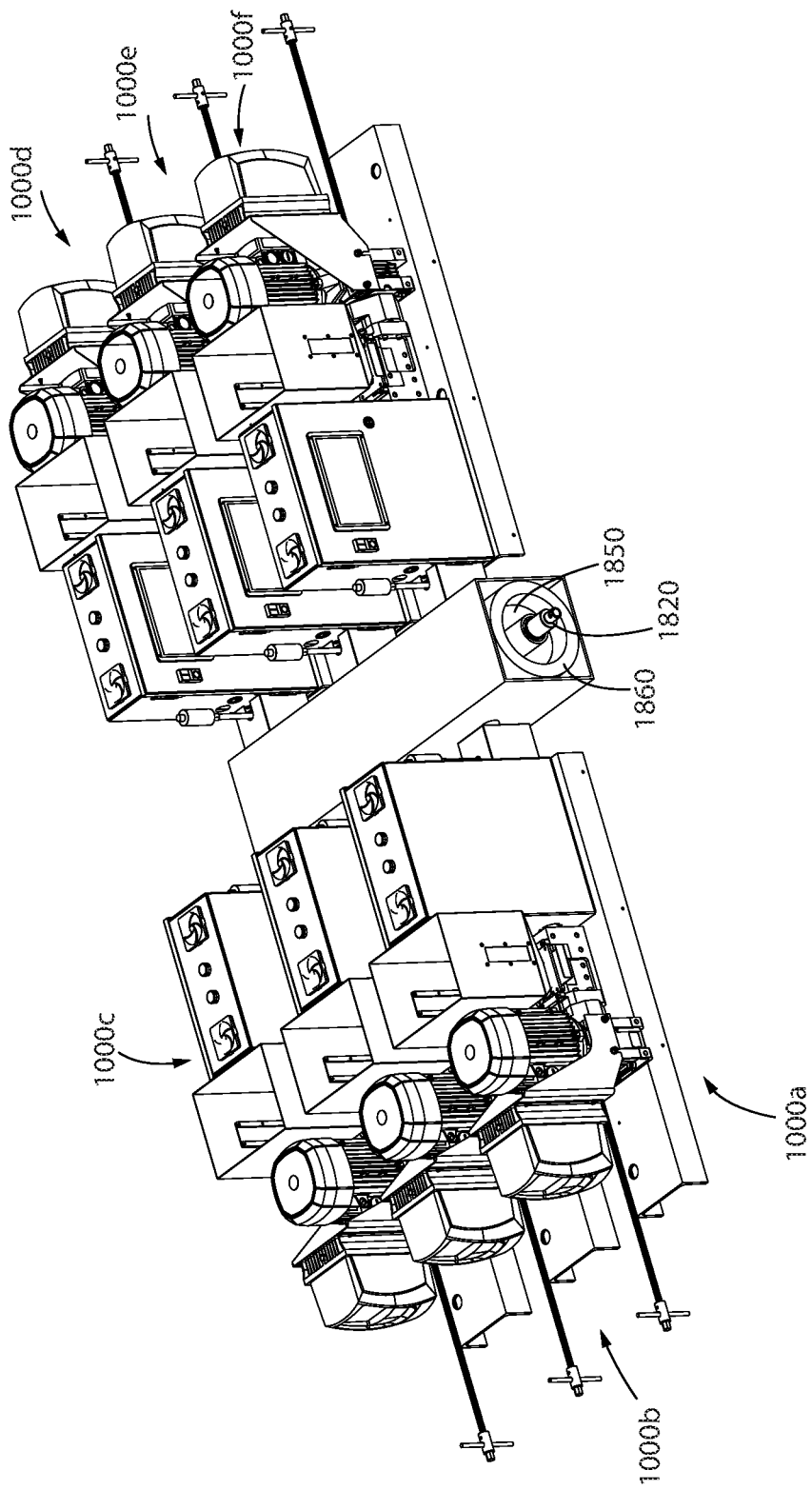
FIG. 34 is a perspective view of six extruders connected to a heated conduit in accordance with one embodiment.
Figure 35:
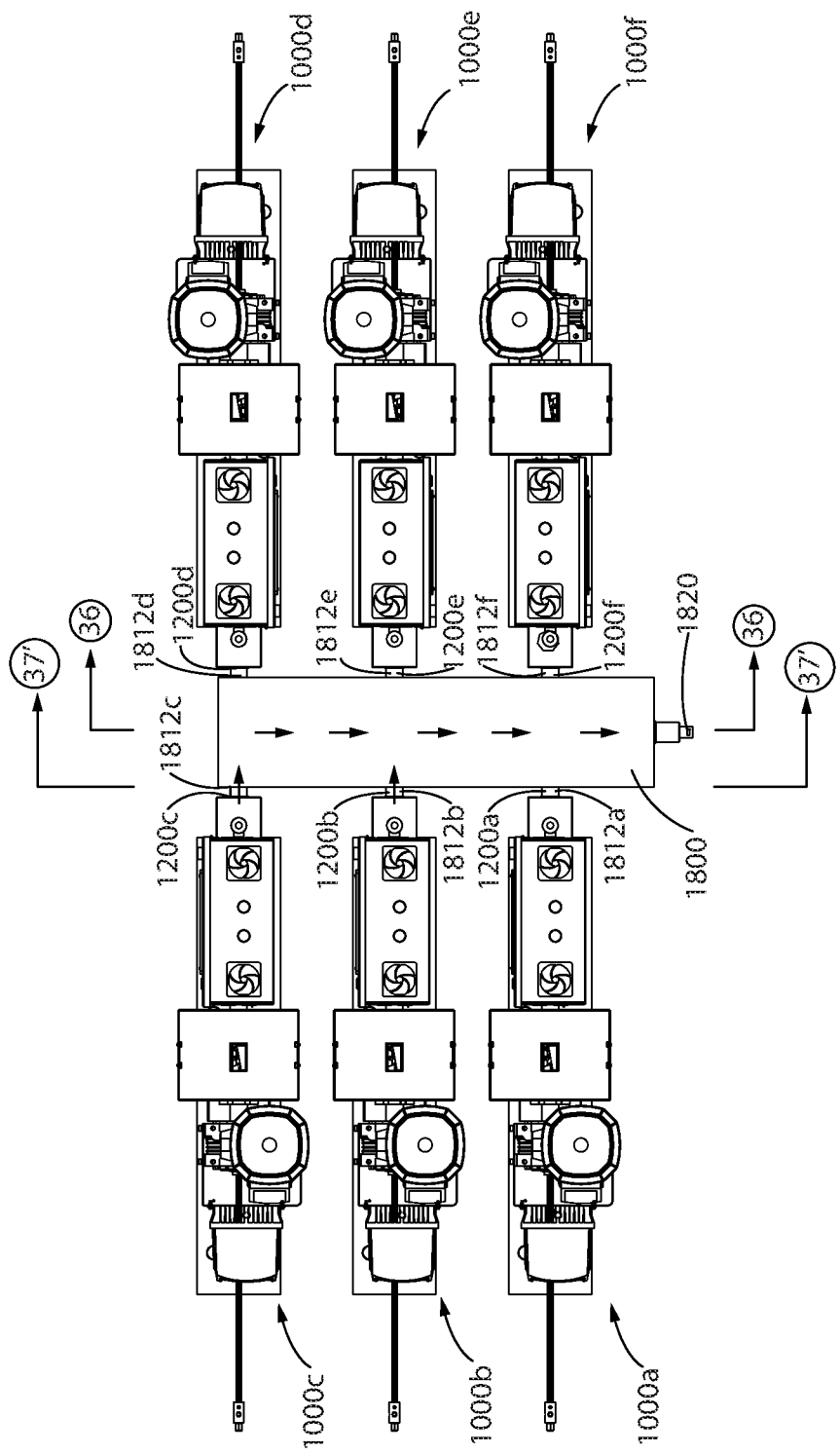
FIG. 35 is a top view of the six extruders and heated conduit of FIG. 34.
Figure 36:
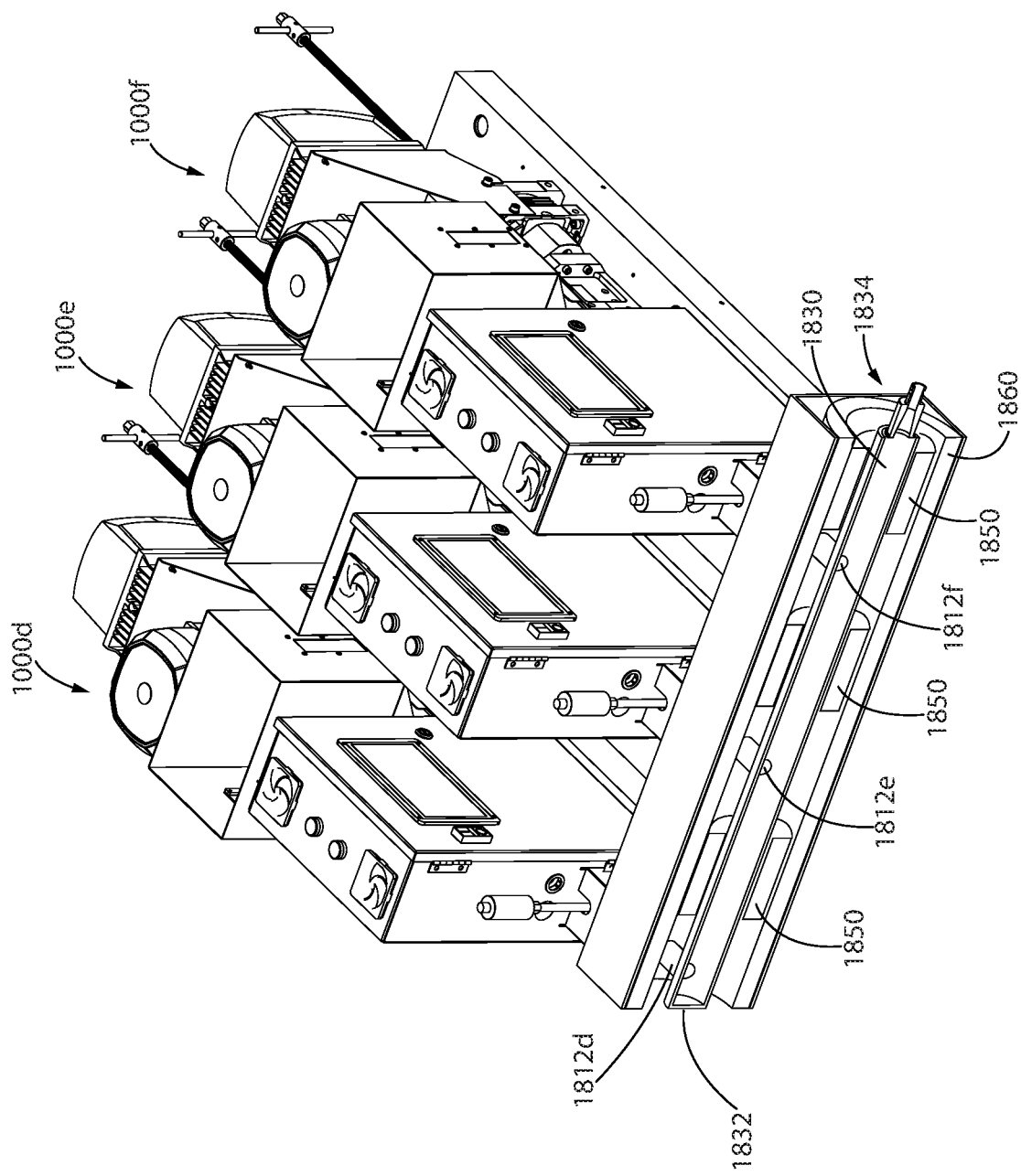
FIG. 36 is a perspective section view of the heated conduit of FIG. 34, taken along line 36-36 in FIG. 35.
Figure 37:
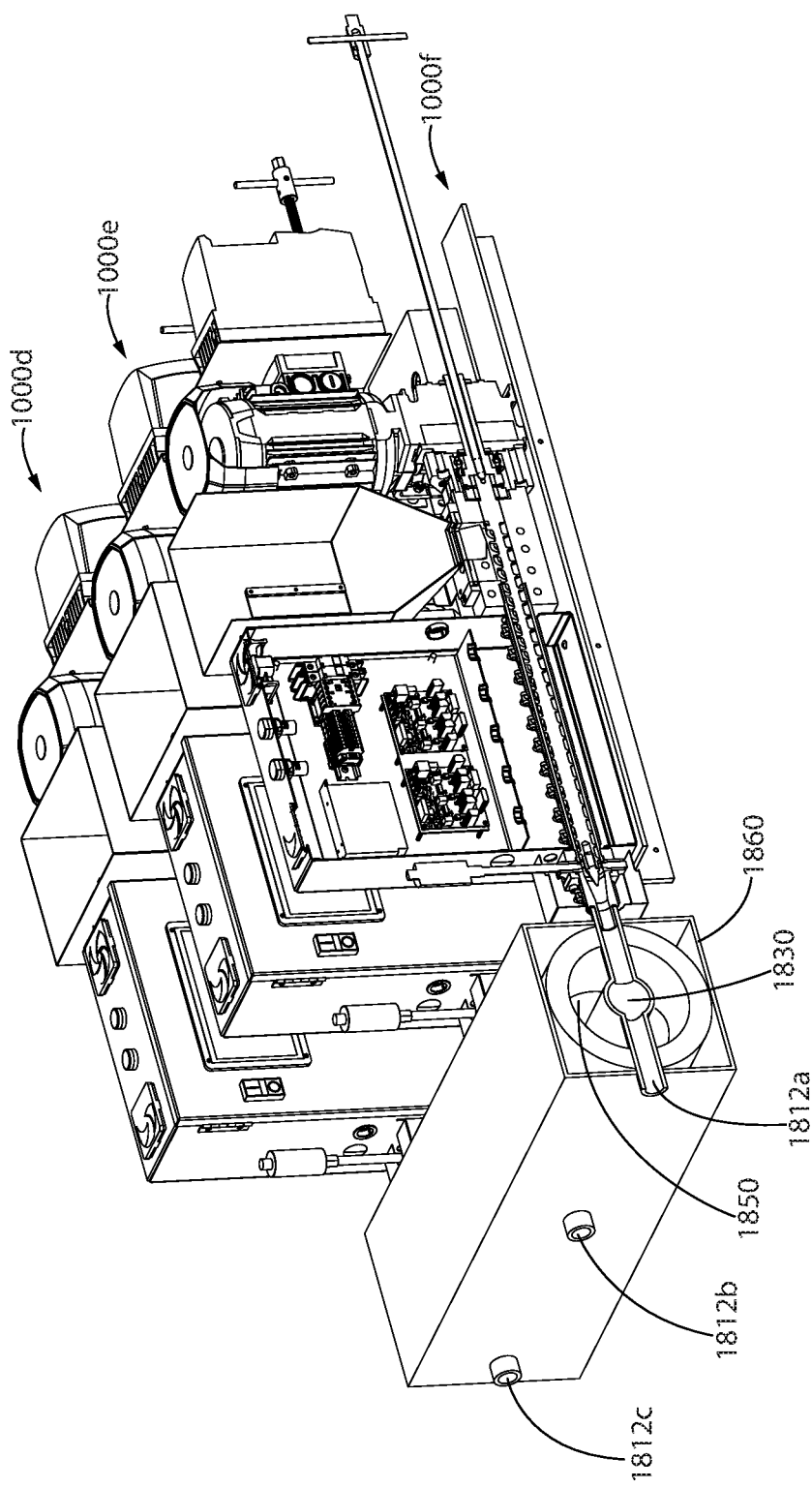
FIG. 37 is a perspective section view of one of the extruders and the heated conduit of FIG. 34, taken along lines 37-37 and 37'-37' in FIG. 35.

For example, as exemplified in FIGS. 31 to 33, two extruders 1000*a*, 1000*b*, with different axial lengths $L_{Axial}$ between their feed inlet 1620 and their output nozzle 1200, are positioned side-by-side. In this arrangement, the outputs 1200*a*, 1200*b* of the extruders are axially and vertically aligned with each other. This may facilitate the connection of the outputs 1200*a*, 1200*b* to a common mold (not shown).

Alternatively, or in addition to staggering the position of the feeders, with or without using an extension conduit 1700, the plastic material output from a plurality (i.e. two or more) of extruders, which is in a flowable or melted state, may be directed into a heated manifold, which may itself be connected to a mold.

For example, as exemplified in FIGS. 34 to 37, six extruders 1000*a-f* are each in fluid communication with a common manifold 1800. As exemplified, the output 1820 of the common manifold 1800 is directly connected to a common mold (not shown). Thus, each of the six extruders 1000*a-f* may be in fluid communication with a common mold via common manifold 1800.

More specifically, the output ends of the nozzles 1200*a-f* are each fluidically coupled to a respective manifold inlet port 1812*a-f*. Manifold inlet ports 1812*a-f* each provide fluid communication to at least one interior conduit 1830 within manifold 1800, which in the illustrated example is perhaps best shown in FIGS. 36 and 37.

In the illustrated example, the extruders 1000*a-f* are arranged relative to the common manifold 1800 such that the direction of flow of material through the extruder barrels is approximately perpendicular to the direction of flow of material through the manifold 1800. In other words, with reference to FIG. 35, the angle θ between the direction of material flow 1625 through extruder 1000*b* and the axial direction of material flow 1825 through manifold 1800 is about 90°. Alternatively, one or more extruders may be arranged relative to the manifold 1800 such that the angle θ is an acute angle (e.g. between about 80° to 10°, or between about 60° to 30°, or between about 50° to 40°, or about) 45°. Providing an acute angle θ between an extruder 1000 and manifold 1800 may have one or more advantages. For example, this allows the flowing material to undergo a change of direction of less than 90°, which may reduce backpressure through the manifold conduit 1830 and/or the extruder barrel 1100.

Using a manifold 1800 with the extruders positioned along part or all of the length of the manifold enables the extruders to be spaced apart for ease of maintenance. In addition, it permits the feeders to be spaced apart such that each may have a separate hopper or, as discussed subsequently, it may permit some of the feeders to use a common hopper.

Manifold 1800 is optionally configured to maintain the temperature of flowable material traveling through the one or more conduits 1830. As the plastic material exiting the extruders 1000 is in a flowable state due to its elevated temperature, if the flowable material is allowed to cool, it will begin to solidify, which may not be desirable.

Accordingly, manifold 1800 optionally includes one or more heating elements 1850 that are operable to maintain the flowable plastic material within the manifold at an elevated temperature (which may be the same or different than the temperature at which the material exits the extruder(s) 1000) so that the plastic material remains in a flowable state until it exits the manifold. In the example illustrated in FIGS. 36 and 37, band heaters 1850 are positioned along the length of conduit 1830.

Also, the manifold 1800 is optionally thermally insulated. In the example illustrated in FIGS. 36 and 37, an insulating layer 1860 is positioned around the length of conduit 1830 and the band heaters 1850.

In the illustrated examples, flow through the heated conduit 1830 is induced by the pressure of the flowable plastic material exiting each of the extruders 1000. Optionally, the conduit 1830 may be provided with one or more ejection assist members to increase the pressure and/or flow for material flowing through the conduit.

For example, a rotatable delivery screw (e.g. similar to screw 1300) may be provided within conduit 1830, and rotation of such the delivery screw may assist in advancing flowable plastic material towards the output 1820 of the conduit 1830.

Alternatively, or in addition, a retractable piston or plunger may be provided within conduit 1830 (e.g. at the end 1832 of the conduit 1830 opposite the conduit output end 1834). Advancement of such a plunger towards the conduit output 1834 (e.g. via one or more mechanical, hydraulic, or pneumatic actuators) may increase the pressure of material in conduit 1830 (e.g. by reducing the effective volume of conduit 1830).

Providing conduit 1830 with an ejection assist member may have one or more advantages. For example, once a cavity of a mold connected to the output of conduit 1830 is filled (or almost filled) with flowable plastic material (e.g., 75%, 80%, 85%, 90%, 95% or more filled), the ejection assist member may be actuated to increase the pressure of material in conduit 1830, which may increase the pressure of the material in the mold. Such an arrangement may allow for large and/or complex mold cavities to be filled using a relatively low-pressure output from an extruder, and subsequently subjected to higher pressures that may be required or desirable to properly fill the mold and/or to compress the flowable material within the mold cavity to improve one or more physical properties of the molded component.

Another possible advantage of this approach relates to the production of molded components with relatively complicated geometries, and/or the production of relatively large molded components. In this respect, since the molding process outlined above does not rely on the output or operating pressure of the extrusion barrels to provide the maximum pressure on the flowable material within the mold cavity (instead relying on one or more ejection assist members within the conduit 1830), such a molding process may be 'scaled up' to provide higher molding pressures (e.g. for use with molds with relatively complex internal cavities and/or with molds for relatively large molded components) without having to 'scale up' the operating pressure of the extruders.

In some embodiments, where multiple extruders are in communication with a common mold (e.g. via a heated manifold or conduit 1830), the input material for each extruder may be the same. For example, pelletized feedstock of the same polymer may be fed in to each extruder, such that the output from each extruder and the output from the common manifold generally has the same composition.

Optionally, one or more extruders in communication with a common manifold may be provided with a different input material than the other extruder(s). For example, one or more extruders may be fed a different polymer feedstock than one or more of the other extruders. This can enable the production of an inner core of material with a glass filed material for strength and an outer layer without any filler to create a lubricious outer surface. Similarly, one extruder can provide a colour for a stripe of a product while the second extruder provides the core colour for the product. Additionally, or alternatively, one or more extruders may be concurrently fed with both a polymer feedstock and one or more additives (e.g. a color dye, a stabilizing agent, an antioxidant, a flame retardant, etc.) while one or more of the other extruders may only be fed with a polymer feedstock.

Providing an apparatus that allows an additive to be provided in one or more extruders may have one or more advantages. For example, providing color dye(s) in only some of the extruders in communication with a common manifold may result in an aesthetically different molded or extruded component than if the output from each extruder was similarly dyed (e.g. the color of the material output from the conduit may not be homogenous). As another example, if an additive is no longer used (e.g. if the apparatus is transitioned to produce different components), only the extruder(s) in which the additive was used may need to be cleaned out before transitioning to the new input material.

Optionally, a mechanical mixing or blending member (not shown) may be provided in flow communication between the heated manifold 1800 and a mold to be filled by the material exiting the heated manifold. For example, a static mixer and/or a driven gear mixer (not shown) may be provided at the output end 1834 of the conduit 1830, either upstream or downstream of output nozzle 1820.

Providing a mechanical mixer downstream of the output of each extruder connected to the common manifold 1800 may have one or more advantages. For example, such a mixer may promote a relatively homogenous output material from the conduit 1830, even where some of the extruders 1000 connected to the common manifold are provided with a different input materials and/or additives.

If two or more extruders are utilized, then a common hopper may be used for at least two of the feeders. For example, extruders that have feeders positioned proximate each other may use a common hopper. An advantage of such a design is that it may maintain a common head pressure of material above the different screws so as to maintain a more consistent feed rate. Also, it may make filing of the system easier.

For example, as exemplified in FIGS. 34 to 37, input material is loaded into the inlet hopper 1020 of each extruder 1000. However, the 'middle' extruders 1000*b* and 1000*e*—and particularly their inlet hoppers 1020*b* and 1020*e*—may be at least somewhat challenging to access, particularly as compared to the inlet hoppers of extruders 1000*a*, 1000*c*, 1000*d*, and 1000*f*. Optionally, the feed inlets of two or more extruders may be connected to a common feed hopper.

Figure 38:
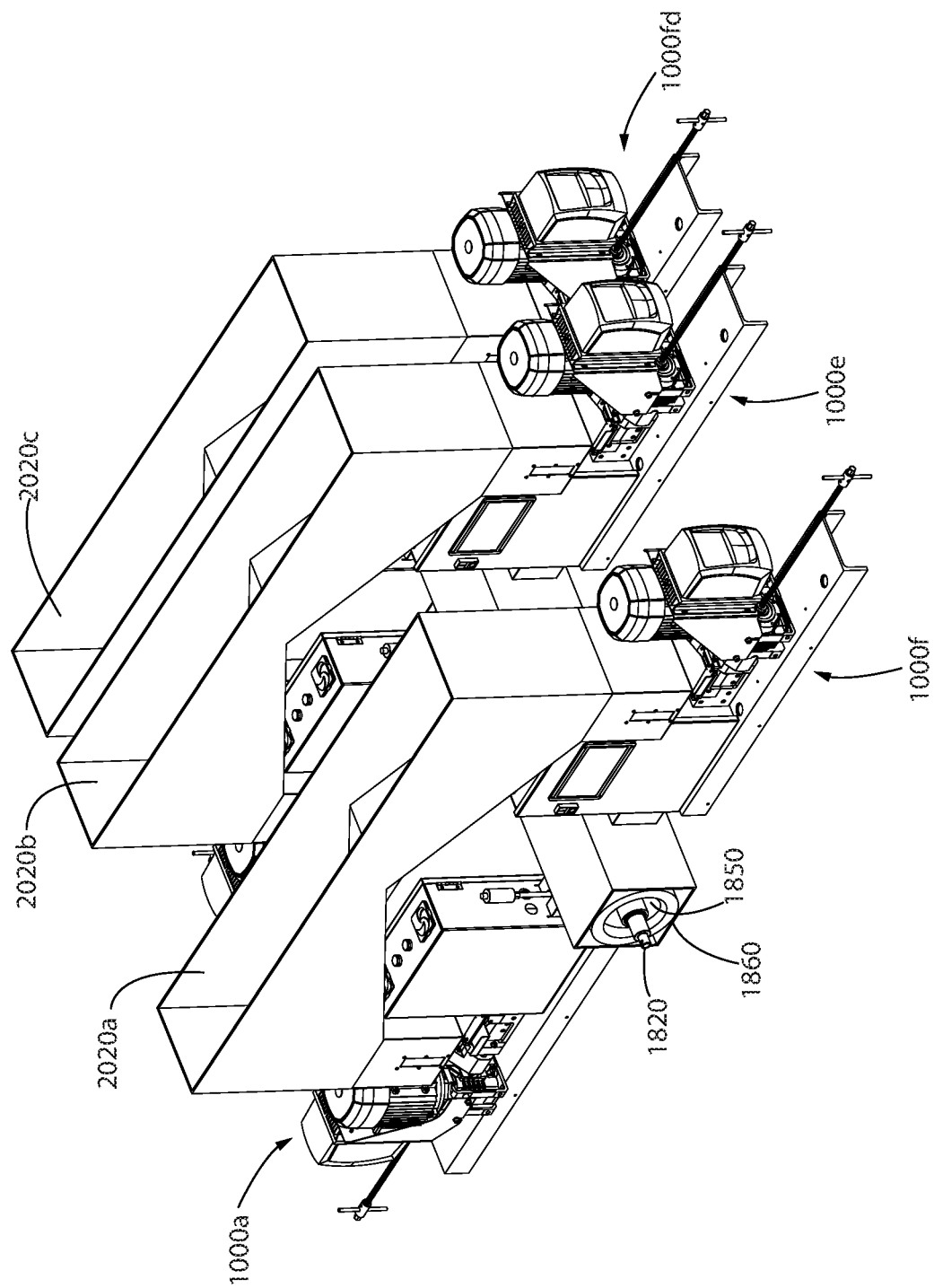
FIG. 38 is a perspective view of six extruders connected to a heated conduit in accordance with another embodiment.
Figure 39:
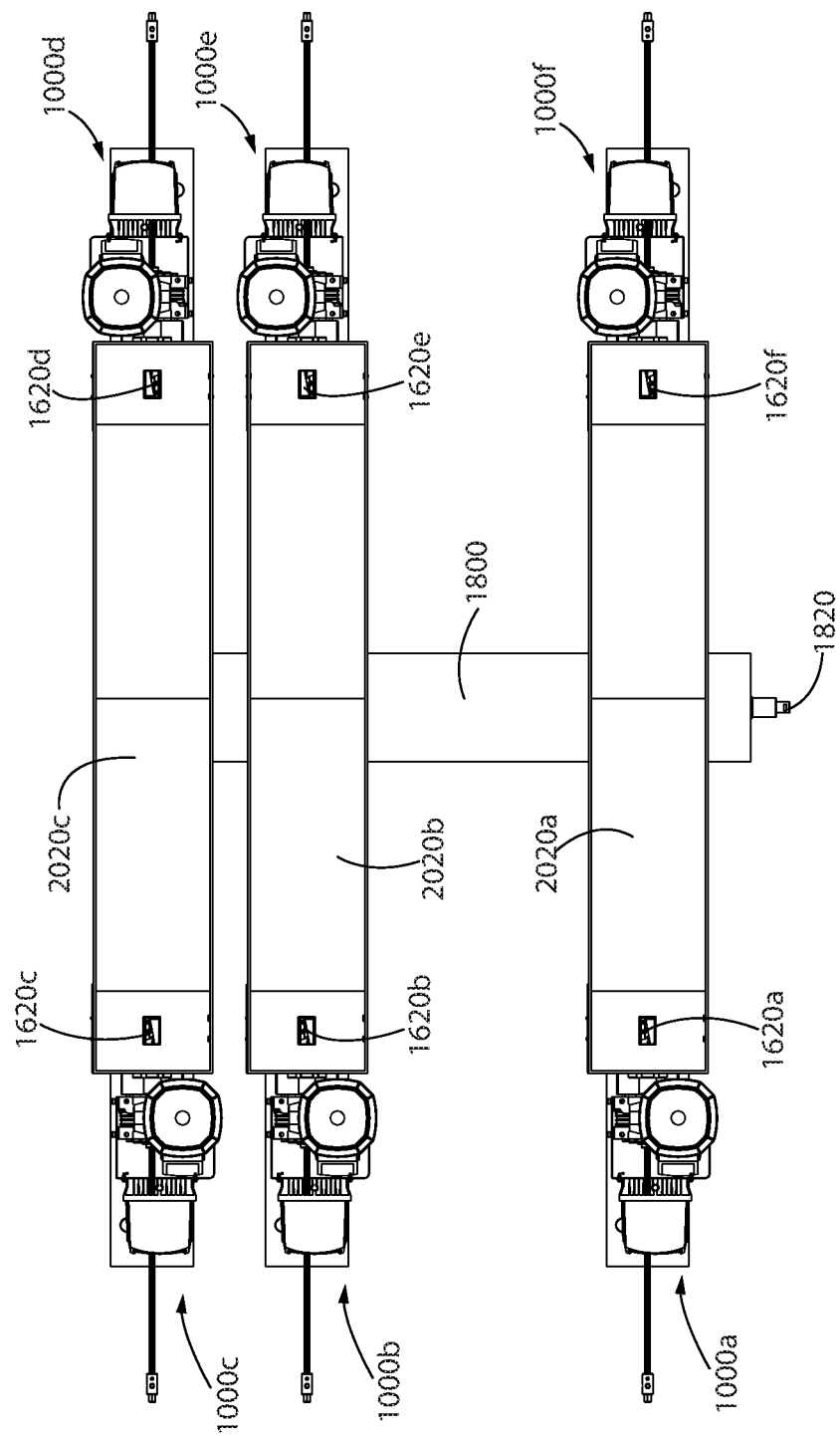
FIG. 39 is a top view of the six extruders and heated conduit of FIG. 38.

FIGS. 38 and 39 illustrate an example apparatus in which pairs of extruders 1000 provided on an opposite side of a manifold are provided with a common feed hopper. In the illustrated example, a common hopper 2020*a* is connected to the inlet passages 1620*a*, 1620*f* of extruders 1000*a*, 1000*f*, such that input material loaded into the common hopper 2020*a* may be directed to one of the two extruders 1000*a*, 1000*f*. Also, a common hopper 2020*b* is connected to the inlet passages 1620*b*, 1620*e* of extruders 1000*b*, 1000*e*, and a common hopper 2020*c* is connected to the inlet passages 1620*c*, 1620*d* of extruders 1000*c*, 1000*d*.

Figure 40:
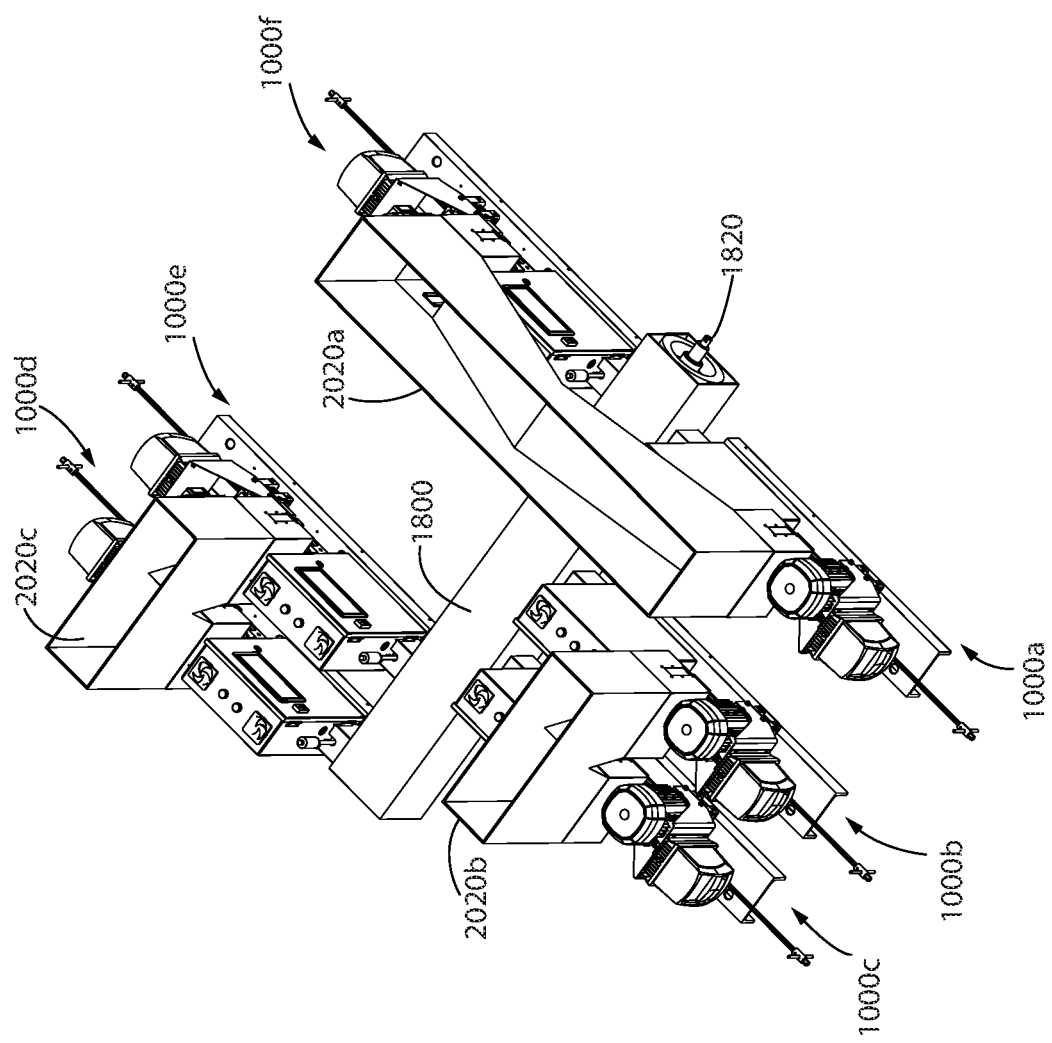
FIG. 40 is a perspective view of six extruders connected to a heated conduit in accordance with another embodiment; and, FIG. 41 is a top view of the six extruders and heated conduit of FIG. 40.
Figure 41:
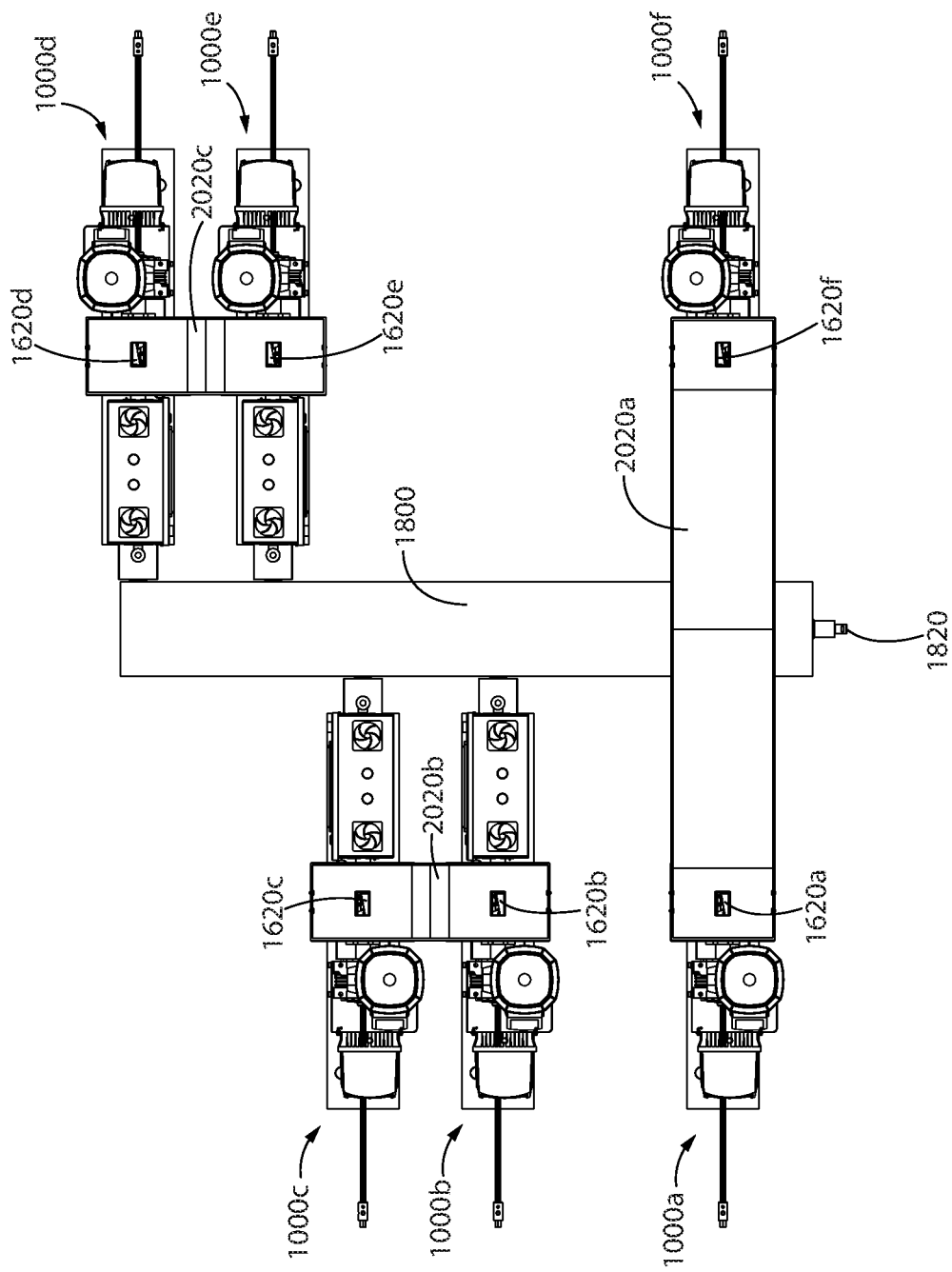

FIGS. 40 and 41 illustrate an example apparatus in which pairs of extruders 1000 on the same side of a manifold are provided with common feed hoppers. In the illustrated example, a common hopper 2020*a* is connected to the inlet passages 1620*a*, 1620*f* of extruders 1000*a*, 1000*f*, a common hopper 2020*b* is connected to the inlet passages 1620*b*, 1620*c* of extruders 1000*b*, 1000*c*, and a common hopper 2020*c* is connected to the inlet passages 1620*d*, 1620*e* of extruders 1000*d*, 1000*e*.

Providing a common hopper for two or more extruders may have one or more advantages. For example, it may allow two extruders to be loaded from a single feed location.

It will be appreciated that some of the embodiments disclosed herein may not use any of the features of the heated conduit disclosed herein and that, in those embodiments, a conduit of any kind known in the art may be used.

Modular Extruder

In accordance with another aspect of this disclosure, a bench scale extruder as disclosed herein may be of a modular design. Using modular components that are readily assemblable and disassemblable permits an extruder to be shipped as individual components and assembled on site without the need of a skilled tradesperson. These features may be used by themselves or in any combination or sub-combination with any other feature or features described herein.

In accordance with this aspect, an extruder 1000 may be assembled from (and preferably disassembled into) a relatively low number of parts or modules. A modular extruder design may have one or more advantages. For example, assembly of such an extruder may be relatively simple, which may reduce time and/or cost required to install the extruder on site.

Optionally, in some embodiments, extruder 1000 includes at least four modular components. Specifically, a modular extruder may include an extruder barrel module, an extruder feeder module, a screw motor module, and an electronics module. Advantageously, a design including these modular components may allow one or more of these modular components to be provided in different variations, which may allow a large number of extruder configurations to be provided by selecting desired combinations of modular components. For example, a different screw motor module (e.g. a module with a 5 hp motor, or a module with a 2.5 hp motor, etc.) may be selected based on a desired operating speed and/or torque of the feed screw 1300 of extruder 1000. As another example, a different barrel length (e.g. 36", or 48", etc.) may be selected based on the material to be extruded. By providing at least these four main components of extruder 1000 in a modular configuration, a number of possible extruder configurations may be assembled.

Figure 9:
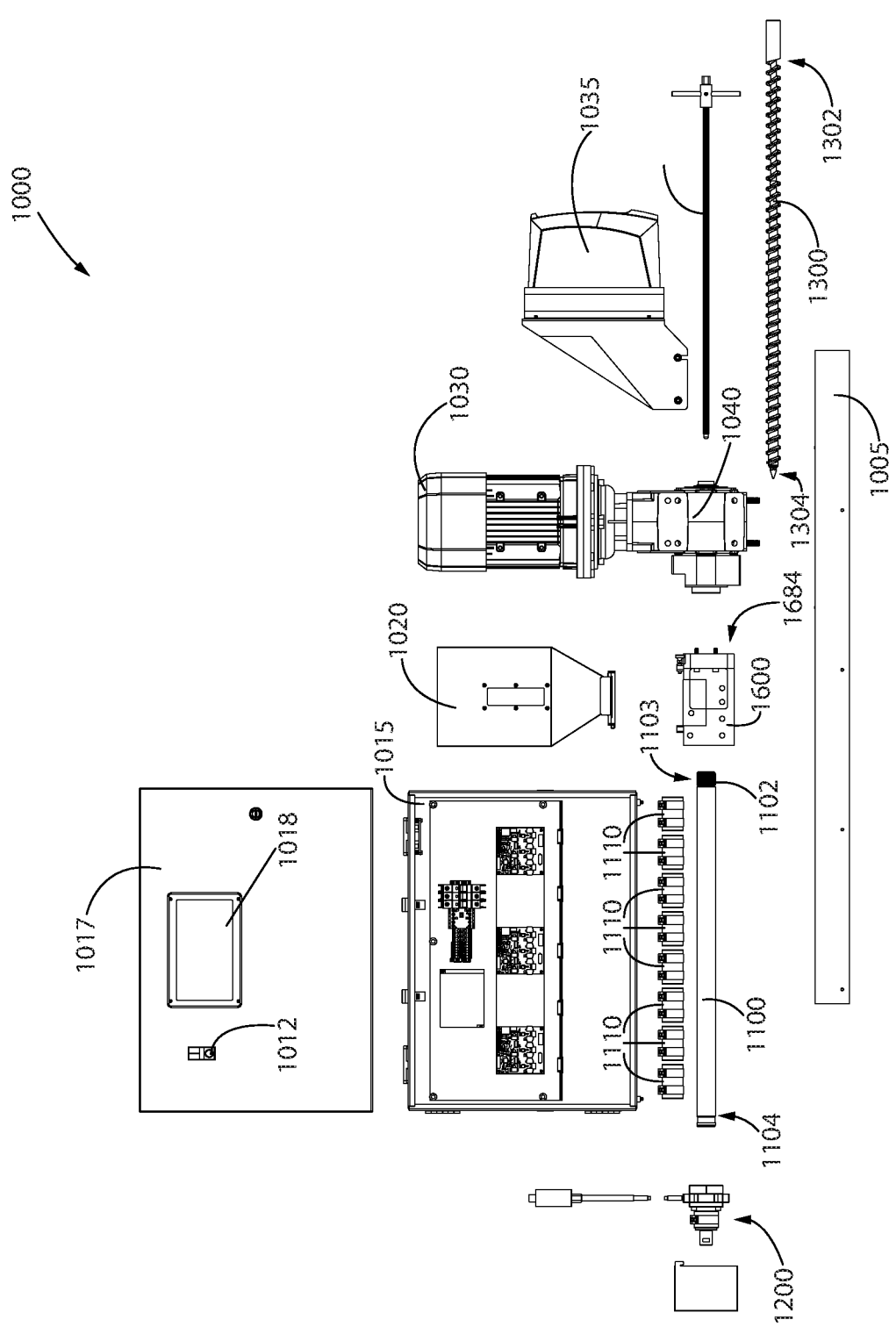
FIG. 9 is a front view of components of the extruder of FIG. 1 in a partially disassembled configuration.

With reference to FIG. 9, in the illustrated example extruder 1000 is shown in a partially disassembled configuration. A barrel module may comprise barrel heaters 1110 and output nozzle assembly 1200 that are provided on barrel 1100. Optionally, the screw 1300 may be part of the barrel module or may be a separate element. For example, if the screw 1300 extends into the flow passage of the feeder and the barrel, then the screw may be part of the barrel module, the feeder module, the screw motor module, or a separate component.

Barrel module is removably connectable to an extruder feeder module to provide flow communication between the interior of barrel 1100 and an internal flow passage 1630 of the feed block 1600. As exemplified in FIG. 9, extruder 1000 includes a feed block 1600 (which, as discussed above, may optionally include a feed block insert 1605), and a hopper 1020. In this example, feed block 1600 may be characterized as an extruder feeder module. Alternatively, the hopper 1020 may be secured to feed block 1600, and the combined hopper and feed block may be characterized as an extruder feeder module.

The barrel module may be coupled, and optionally releasably coupled, to the extruder feeder module using a threaded connection. Specifically, barrel 1100 may have an external threaded section 1103 at the inlet end 1102 and extruder feed block 1600 may include a threaded port 1613 positioned at the outlet end 1604 of the internal flow passage 1630 of the feed block 1600. Threaded port 1613 is configured to receive the threaded barrel end 1103.

An extruder feeder module may also be removably connectable to a screw motor module. The screw motor module is the module that provides motive force to the screw 1300 and, optionally, may include the screw 1300. As exemplified in FIG. 9, extruder 1000 includes a combined or integrated gear box 1040 and drive motor 1030, and an adjustable-speed drive 1035. In this example, the gearbox 1040 and motor 1030 may be characterized as a screw motor module. Alternatively, adjustable-speed drive 1035 may be secured to the combined gear box 1040 and drive motor 1030, and the combined motor drive, motor, and gearbox may be characterized as a screw motor module.

Figure 17:
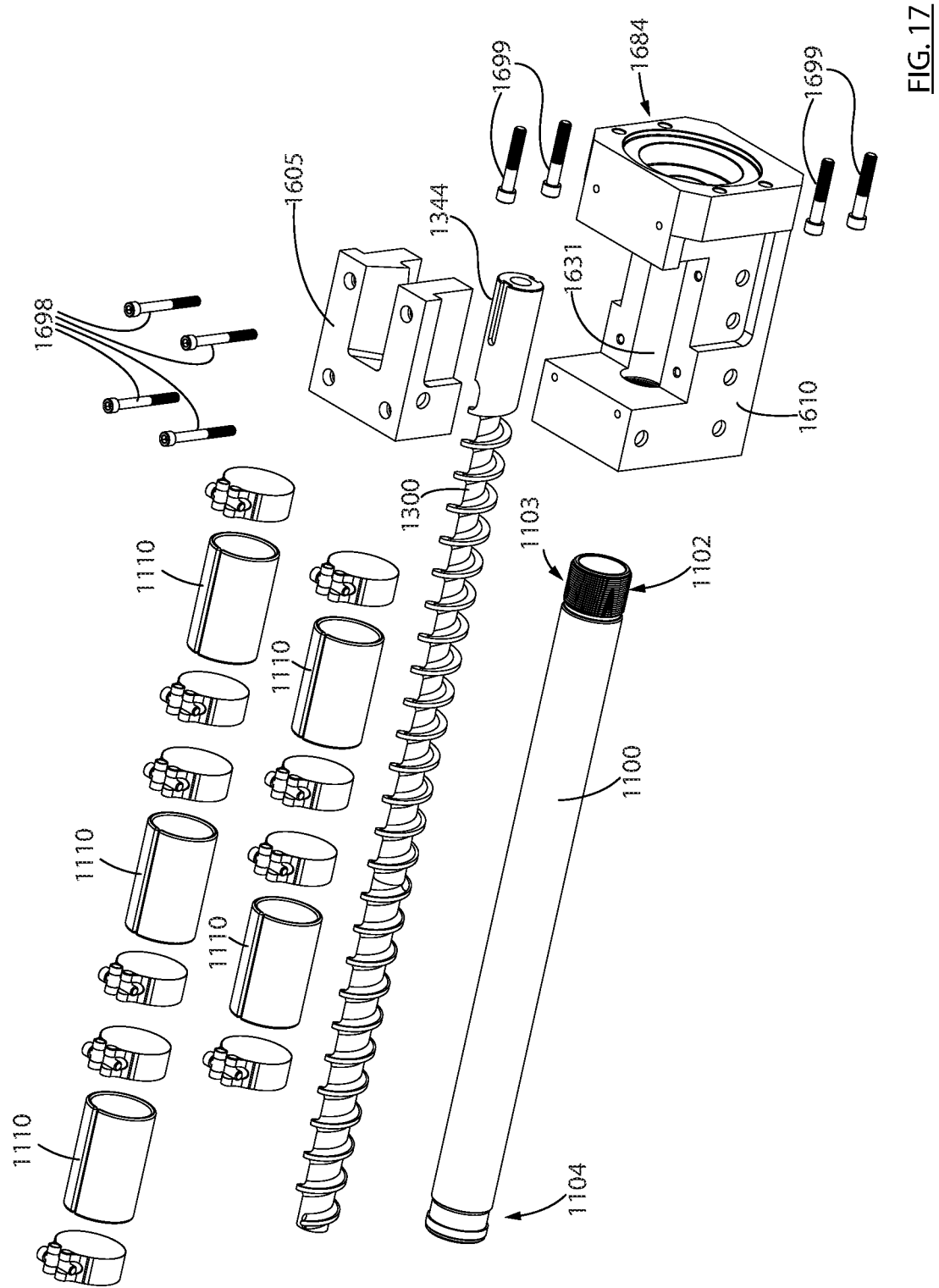
FIG. 17 is an exploded view of the extruder barrel, feed block, feed block insert, and extrusion screw of FIG. 16.
Figure 22:
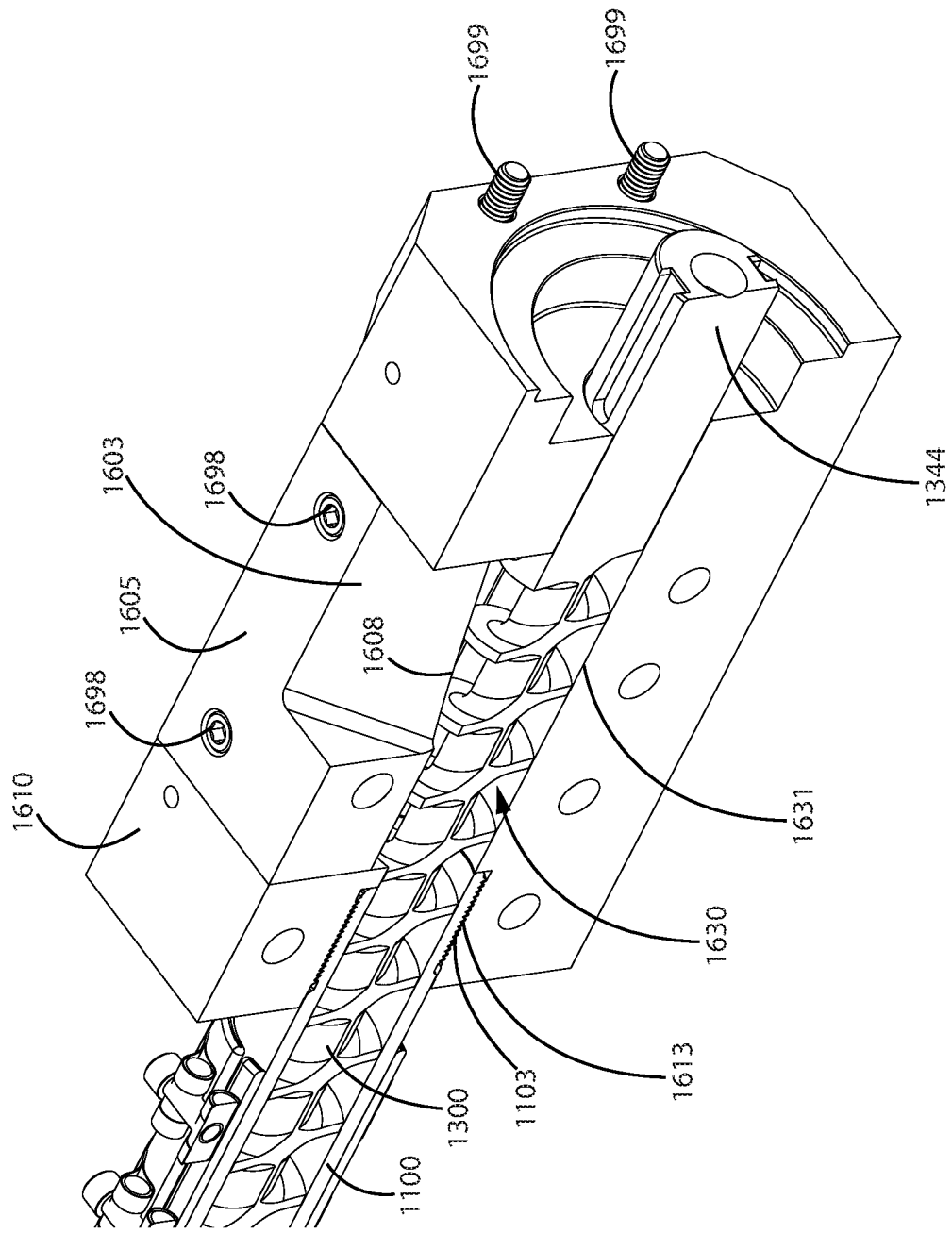
FIG. 22 is a perspective section view of the feed block, feed block insert, extruder barrel, and extrusion screw of FIG. 21, taken along line 22-22 in FIG. 21.
Figure 23:
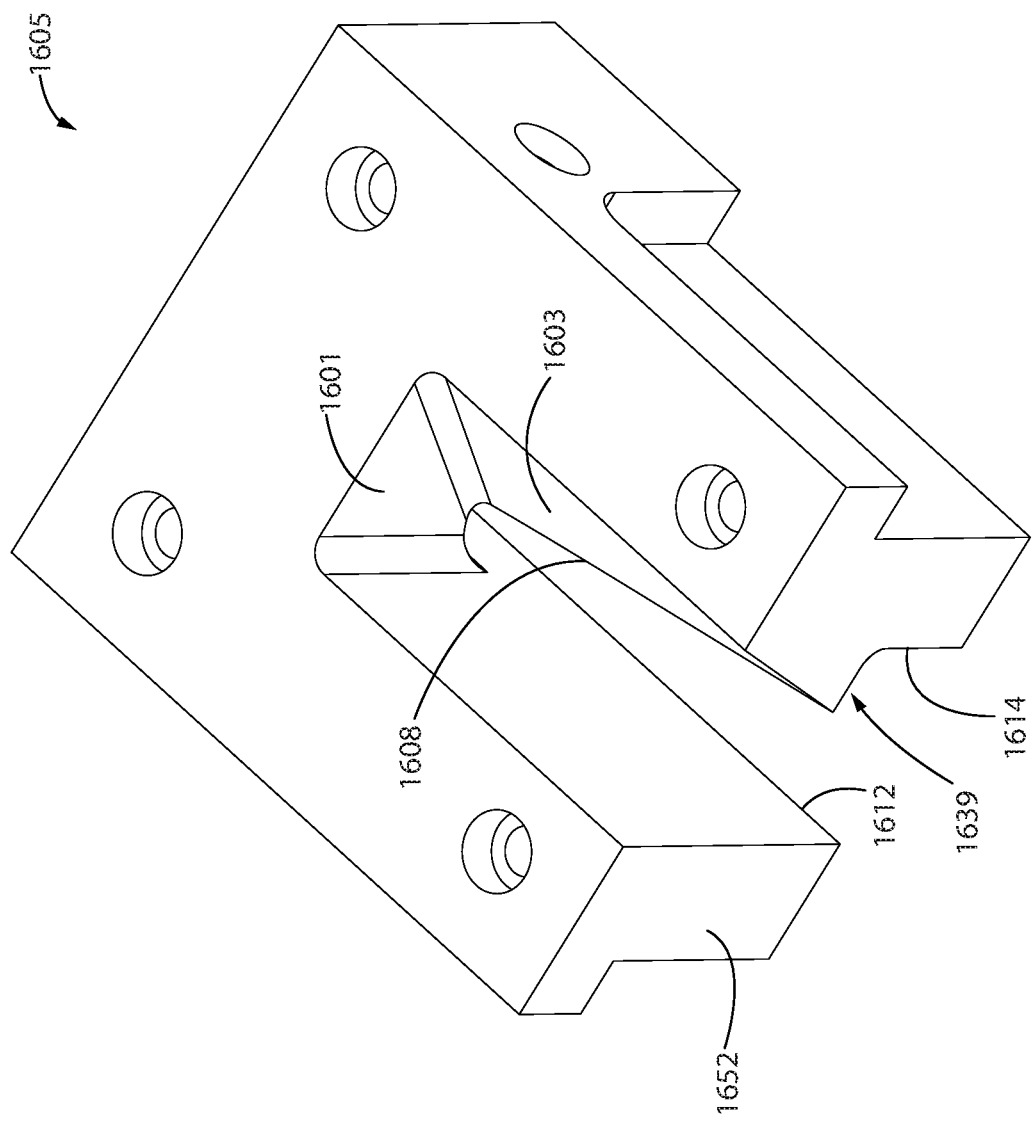
FIG. 23 is a rear perspective view of the feed block insert of FIG. 21.

In the illustrated example, a screw motor module may be coupled to an extruder feeder module using a plurality of bolts 1699 (see e.g. FIGS. 17, 21, and 22). Optionally, with reference to FIGS. 12 and 22, screw 1300 may be positioned in the internal flow passage 1630 of the feed block 1600 such that a drive engaging end 1344 of the screw 1300 is accessible from the motor mounting end 1684 of the extruder feeder module. The drive engaging end 1344 of screw 1300 may be coupled to a screw motor module using any suitable method known in the art, such as a threaded coupling, a keyed joint, and the like.

As exemplified in FIG. 9, extruder 1000 includes user input devices and/or control electronics enclosed in a control housing or cabinet 1010. In this example, housing 1010 and the control electronics housed therein may be characterized as an electronics module. In the illustrated example, the electronics module may be mechanically secured to one or more other modules and/or to an extruder base 1005 (as discussed subsequently), and may be configured to 'straddle' the extruder barrel 1100. Notably, in the illustrated example this allows lower portions of housing 1010 to act as a housing or shroud for barrel 1100.

The electronics module is optionally electrically connectable with the barrel module, e.g. to power and/or control the operation of band heaters 1110. The electronics module is also optionally electrically connectable with the screw motor module (e.g. with drive motor 1030 and/or adjustable-speed drive 1035) to control the operation of motor 1030, thereby controlling the rotation of screw 1300. Optionally, the electronics module may be indirectly electrically connectable with the screw motor module via electrical wiring associated with the extruder feeder module (e.g. a wiring harness mounted internally or externally to feed block 1600).

Optionally, the electronics module may be automatically electrically connectable with the barrel module and/or the screw motor module (e.g. with drive motor 1030 and/or with adjustable-speed drive 1035) when the electronics module is mounted as part of the extruder 1000.

For example, an electrical connector (not shown) operatively connected to electronic components of the screw motor module may be provided adjacent the mounting location between the screw motor module and the extruder feeder module. A mating electrical connector (not shown) operatively connected to the electronics module may also be provided adjacent this mounting location. In such an arrangement, aligning and mechanically coupling the extruder feeder module and the screw motor module may result in engagement of the electrical connectors of the screw motor module and the extruder feeder module (e.g., one connector may be 'female', and the other may be 'male'). Aligning and mechanically coupling the electronics module to the extruder feeder module may result in engagement of the electrical connectors of the electronics module and the extruder feeder module and, indirectly, connect the electronics module with the screw motor module.

Additionally, or alternatively, the barrel module may be automatically electrically connected to the feeder module in a similar way. Aligning and mechanically coupling the electronics module to the barrel module may result in engagement of the electrical connectors of the electronics module and the barrel module and, indirectly, connect the electronics module with the screw motor module via the feeder module.

The extruder 1000 may be secured to any base. For example, the extruder 1000 may be mechanically secured to an extruder base 1005, which in the illustrated example is a length of C channel steel. This may facilitate the installation of extruder 1000 within a workplace. For example, base 1005 may be secured to a floor surface or other mounting location, and the modular components of extruder may be installed on the base. It will be appreciated that one or more of the modules, e.g., the barrel module, may be secured to base 1005 (with the other modules being secured directly or indirectly to the module(s) that are secured to the base 1005), and base 1005 may subsequently be secured to a floor surface or other mounting location.

Optionally, screw 1300 may be a single integrally formed screw. Alternatively, an extrusion screw 1300 may be made from two or more parts. For example, an extrusion screw 1300 may include a feeder screw body section and a barrel screw body section. Feeder and barrel screw body sections may be joined using any suitable method, such as a threaded coupling, a keyed joint, welding and the like. In such embodiments, a feeder screw body section may be secured to extruder feed block 1600 or to the screw motor module, and a barrel screw body section may be coupled to the feeder screw body section before, after, or concurrently to coupling the barrel module to the extruder feeder module.

Providing a multi-part screw with a feeder screw body section secured to an extruder feeder module or to a screw motor module may have one or more advantages. For example, such an arrangement may facilitate proper alignment of screw 1300 within feed flow passage 1630 and/or barrel 1100, and/or reduce the time needed to assemble extruder 1000. It may also permit the screw to be shipped internal of the modules and thereby be protected during shipment.

As noted above, a modular extruder design may have one or more advantages. For example, the overall weight and dimensions of each module may result in their being shippable by a commercial courier company (e.g. FedEx, UPS, etc.) without excessive overweight and/or oversize surcharges. For example, each module may weigh less than under 175 lbs, 150 lbs, 135 lbs, or 100 lbs.

It will be appreciated that some of the embodiments disclosed herein may not use any of the features of the modular extruder disclosed herein and that, in those embodiments, an extruder of any suitable construction may be used.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An extruder comprising:
(a) an axially extending extruder barrel module having a feedstock inlet end and a feedstock outlet end axially spaced from the feedstock inlet end in a direction of flow through the extruder barrel module, the extruder barrel module comprising an axially extending barrel in which an extruder screw is removably receivable;
(b) an axially extending extruder feeder module removably connectable to the feedstock inlet end of the extruder barrel module, the extruder feeder module comprising a hopper and an axially extending flow passage aligned with the direction of flow when the extruder feeder module is connected to the barrel module, the axially extending flow passage having a feedstock outlet end and a screw motor module mounting end axially spaced from the feedstock outlet end of the extruder feeder module in a direction of flow through the axially extending flow passage;
(c) a screw motor module removably connectable to the screw motor module mounting end of the extruder feeder module, the screw motor module having a motor drivingly connectable with the screw in the flow passage of the extruder feeder module; and,
(d) an electronics module electrically connectable with the screw motor module and mechanically removably mounted as a separate part of the extruder, wherein, when assembled, the electronics module is positioned beside the hopper and overlies the extruder barrel module.

2. The extruder of claim 1 wherein each module is shippable by a commercial courier company.

3. The extruder of claim 1 wherein each module weighs under 175 lbs, 150 lbs, 135 lbs, or 100 lbs.

4. The extruder of claim 1 wherein the flow passage has a screw portion therein and is drivingly connectable with the extruder screw when the extruder is assembled.

5. The extruder of claim 4 wherein the electronics module is also electrically connectable with the extruder feeder module.

6. The extruder of claim 4 wherein the screw portion in the flow passage and the extruder screw comprise a single integrally formed extruder screw.

7. The extruder of claim 6 wherein the screw in the flow passage and the extruder screw are removable as a unitary member from the extruder barrel module and the extruder feeder module.

8. The extruder of claim 1 wherein the electronics module is also electrically connectable with the extruder barrel module.

9. The extruder of claim 1 wherein the electronics module is also electrically connectable with the extruder feeder module.

10. The extruder of claim 1 wherein the electronics module is automatically electrically connectable with the screw motor module when the electronics module is mounted as part of the extruder.

11. An extruder comprising:
(a) an axially extending extruder barrel module having a feedstock inlet end and a feedstock outlet end axially spaced from the feedstock inlet end in a direction of flow through the extruder barrel module, the extruder barrel module comprising an axially extending barrel in which an extruder screw is removably receivable;
(b) an axially extending extruder feeder module removably connectable in flow communication with the feedstock inlet end of the extruder barrel module, the extruder feeder module comprising a hopper and an axially extending flow passage aligned with the direction of flow when the extruder feeder module is connected in flow communication with the barrel module, the axially extending flow passage having a feedstock outlet end and a screw motor module end axially spaced from the feedstock outlet end of the extruder feeder module in a direction of flow through the axially extending flow passage;
(c) a screw motor module removably drivingly connectable to an end of the screw located at the screw motor module end of the extruder feeder module: and,
(d) an electronics module electrically connectable with the screw motor module and mechanically removably mounted as a separate part of the extruder, wherein, when assembled, the electronics module is positioned beside the hopper and overlies the extruder barrel module.

12. The extruder of claim 11 wherein each module weighs under 175 lbs, 150 lbs, 135 lbs, or 100 lbs.

13. The extruder of claim 11 wherein the flow passage has a screw portion therein and is drivingly connectable with the extruder screw when the extruder is assembled.

14. The extruder of claim 13 wherein the screw portion in the flow passage and the extruder screw comprise a single integrally formed extruder screw.

15. The extruder of claim 14 wherein the screw in the flow passage and the extruder screw are removable as a unitary member from the extruder barrel module and the extruder feeder module.

16. The extruder of claim 15 wherein the electronics module is also electrically connectable with the extruder feeder module.

17. The extruder of claim 11 wherein the electronics module is also electrically connectable with the extruder barrel module.

18. The extruder of claim 11 wherein the electronics module electrically is also electrically connectable with the extruder feeder module.

\* \* \* \* \*